(12) United States Patent
Oh

(10) Patent No.: US 9,194,566 B2
(45) Date of Patent: Nov. 24, 2015

(54) LAMP UNIT AND VEHICLE LAMP APPARATUS USING THE SAME

(71) Applicant: Nam Seok Oh, Seoul (KR)

(72) Inventor: Nam Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 233 days.

(21) Appl. No.: 13/684,708

(22) Filed: Nov. 26, 2012

(65) Prior Publication Data

US 2013/0329444 A1     Dec. 12, 2013

(30) Foreign Application Priority Data

Jun. 8, 2012    (KR) .......................... 10-2012-0061758

(51) Int. Cl.
| | |
|---|---|
| *F21V 21/00* | (2006.01) |
| *F21V 13/04* | (2006.01) |
| *B60Q 1/00* | (2006.01) |
| *B60Q 1/26* | (2006.01) |
| *F21S 8/10* | (2006.01) |
| *F21Y 103/00* | (2006.01) |
| *F21Y 105/00* | (2006.01) |

(52) U.S. Cl.
CPC .............. *F21V 21/00* (2013.01); *B60Q 1/0041* (2013.01); *B60Q 1/2696* (2013.01); *F21S 48/212* (2013.01); *F21S 48/215* (2013.01); *F21S 48/22* (2013.01); *F21S 48/232* (2013.01); *F21V 13/04* (2013.01); *F21Y 2103/003* (2013.01); *F21Y 2105/005* (2013.01)

(58) Field of Classification Search
CPC ........ B60Q 1/0058; B60Q 1/072; B60Q 1/16; B60Q 1/0041; B60Q 1/2696; F21S 4/005; F21S 4/006; F21S 4/007; F21S 48/10; F21S 48/11; F21S 48/115; F21S 48/1154; F21S 48/1159; F21S 48/212; F21S 48/1163; F21S 48/215; F21V 23/004; F21V 23/005; F21V 23/006
USPC ............... 362/192, 249.02–249.04, 494, 507, 362/509, 521–523, 525, 531–545
See application file for complete search history.

(56) References Cited

U.S. PATENT DOCUMENTS

| | | |
|---|---|---|
| 3,780,462 A | 12/1973 | Pregel et al. |
| 5,099,401 A | 3/1992 | Kondo et al. |
| 5,249,104 A | 9/1993 | Mizobe |

(Continued)

OTHER PUBLICATIONS

United States Office Action dated Dec. 3, 2014 issued in U.S. Appl. No. 13/912,701.

(Continued)

*Primary Examiner* — Peggy Neils
*Assistant Examiner* — Zheng Song
(74) *Attorney, Agent, or Firm* — KED & Associates, LLP

(57) ABSTRACT

A lamp device including a surface light source and a vehicle lamp apparatus including the lamp device are provided. The lamp device may include a substrate including a plurality of supporting portions each having a light source mounted thereon, and connecting portions disposed between neighboring supporting portions. Each of the supporting portions may support a corresponding light source on a supporting surface thereof, with a perpendicular line passing through the supporting surface of the supporting portion forming an angle with respect to a reference line facing a predetermined reference direction. Multiple supporting portions each having light sources mounted thereon may form respective angles, and may be arranged so as to produce a desired level and pattern of light emission.

19 Claims, 41 Drawing Sheets

(56) References Cited

U.S. PATENT DOCUMENTS

| | | | |
|---|---|---|---|
| 5,404,282 A * | 4/1995 | Klinke et al. | 362/249.06 |
| 5,436,809 A | 7/1995 | Brassier et al. | |
| 5,455,747 A * | 10/1995 | Aoyama | 362/545 |
| 5,490,049 A * | 2/1996 | Montalan et al. | 362/240 |
| 5,519,596 A * | 5/1996 | Woolverton | 362/249.01 |
| 6,299,337 B1 | 10/2001 | Bachl et al. | |
| 6,543,923 B2 * | 4/2003 | Tamai | 362/521 |
| 7,458,714 B2 | 12/2008 | Chang | |
| 7,478,913 B2 | 1/2009 | Epstein et al. | |
| 7,708,438 B2 * | 5/2010 | Yajima et al. | 362/494 |
| 7,806,567 B2 | 10/2010 | Chen | |
| 7,806,580 B2 | 10/2010 | Lin | |
| 2003/0147253 A1 | 8/2003 | Shy | |
| 2004/0223327 A1 | 11/2004 | Kuan et al. | |
| 2004/0223328 A1 * | 11/2004 | Lee et al. | 362/249 |
| 2005/0195074 A1 | 9/2005 | Kano | 340/475 |
| 2005/0225994 A1 * | 10/2005 | Rodriguez Barros et al. | 362/494 |
| 2005/0237760 A1 * | 10/2005 | Tsukamoto et al. | 362/545 |
| 2006/0092658 A1 * | 5/2006 | Scholz | 362/545 |
| 2006/0133104 A1 * | 6/2006 | Okubo et al. | 362/545 |
| 2007/0201225 A1 * | 8/2007 | Holder et al. | 362/227 |
| 2008/0030994 A1 | 2/2008 | Chang | |
| 2009/0073709 A1 | 3/2009 | Yajima et al. | 362/494 |
| 2010/0008088 A1 * | 1/2010 | Koizumi et al. | 362/235 |
| 2010/0157595 A1 | 6/2010 | Lin et al. | 362/235 |
| 2010/0214799 A1 * | 8/2010 | Ohmi et al. | 362/545 |
| 2010/0232173 A1 * | 9/2010 | Ohno et al. | 362/538 |
| 2010/0277666 A1 * | 11/2010 | Bertram et al. | 349/61 |
| 2010/0290241 A1 * | 11/2010 | Tsukamoto | 362/519 |
| 2011/0170307 A1 * | 7/2011 | Ishikawa et al. | 362/516 |
| 2011/0228536 A1 * | 9/2011 | Im et al. | 362/249.06 |
| 2012/0039084 A1 | 2/2012 | Eckhardt et al. | |
| 2012/0182731 A1 * | 7/2012 | Kretschmann et al. | 362/235 |
| 2012/0182755 A1 * | 7/2012 | Wildner | 362/555 |
| 2012/0287628 A1 | 11/2012 | Markell | |
| 2013/0265791 A1 | 10/2013 | Dassanayake et al. | |

OTHER PUBLICATIONS

U.S. Office Action issued in a co-pending U.S. Appl. No. 13/739,188 dated Mar. 23, 2015.

U.S. Office Action issued in a co-pending U.S. Appl. No. 13/912,701 dated Mar. 23, 2015.

U.S. Office Action dated Aug. 13, 2015 issued in U.S. Appl. No. 13/912,701.

Final Office Action dated Sep. 3, 2015 issued in U.S. Appl. No. 13/739,188.

* cited by examiner

LAMP UNIT AND VEHICLE LAMP APPARATUS USING THE SAME

CROSS-REFERENCE TO RELATED APPLICATION(S)

This application claims priority under 35 U.S.C. §119 to Korean Application No. 10-2012-0061758 filed on Jun. 8, 2012, whose entire disclosure is hereby incorporated by reference.

BACKGROUND

1. Field

Embodiments relate to a lamp unit including a surface light source and a vehicle lamp apparatus using the same.

2. Background

Generally, a lamp supplies or adjusts light for a specific purpose. An incandescent lamp, fluorescent lamp, neon lamp and the like may be used as a light source of the lamp. A light emitting diode (LED) may also be used as the light source of the lamp. An LED may convert an electric signal into infrared rays or light using characteristics of a compound semiconductor. Unlike the fluorescent lamp, the LED does not use a noxious material, such as mercury. Also, the LED may also have a longer lifespan than the incandescent lamp, fluorescent lamp, and neon lamp, and LED power consumption may be lower than that of the incandescent lamp, fluorescent lamp, and neon lamp. In addition, the LED exhibits excellent visibility and low glare due to its high color temperature. A lamp including such an LED may be used in a backlight, display device, lighting, indicator lights for vehicles, head lamps, and various other applications.

BRIEF DESCRIPTION OF THE DRAWINGS

The embodiments will be described in detail with reference to the following drawings in which like reference numerals refer to like elements wherein.

Arrangements and embodiments may be described in detail with reference to the following drawings in which like reference numerals refer to like elements and wherein.

DETAILED DESCRIPTION

Hereinafter, embodiments will be described with reference to the annexed drawings. It will be understood that when an element is referred to as being 'on' or "under" another element, it can be directly on/under the element, and one or more intervening elements may also be present. When an element is referred to as being 'on' or 'under', 'under the element' as well as 'on the element' can be included based on the element.

Figure 1:
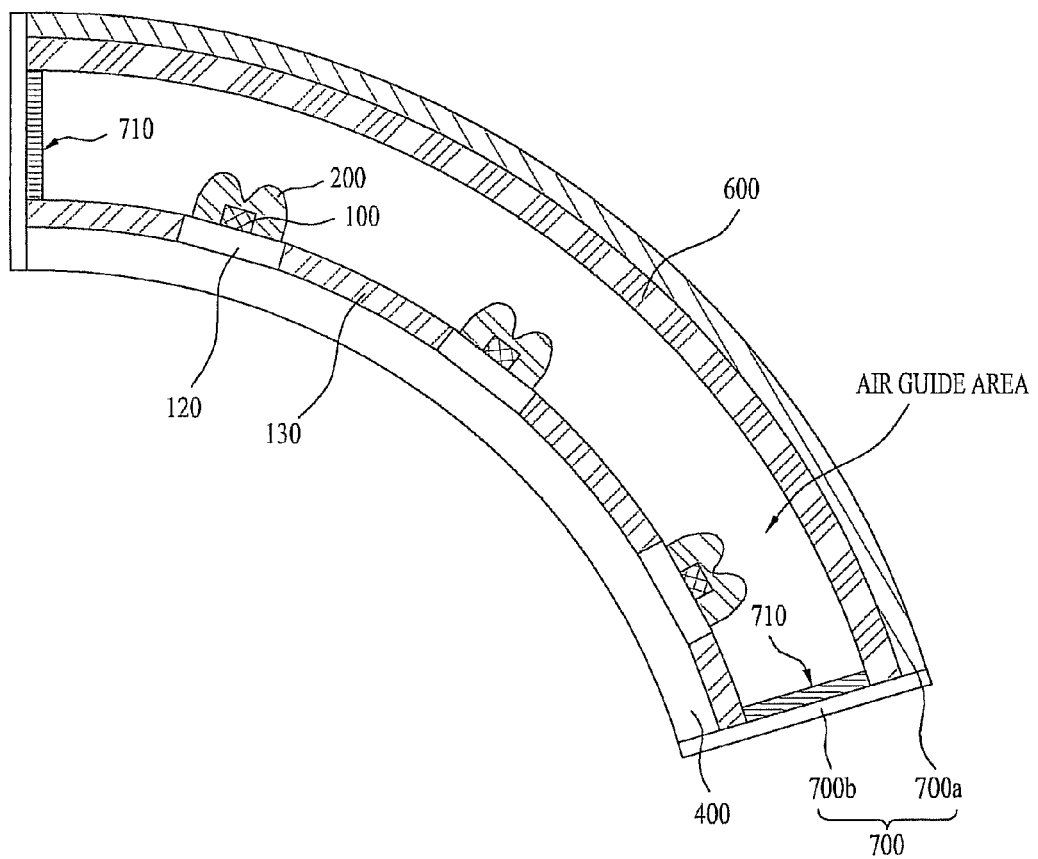
FIG. 1 is a sectional view of a lamp unit in accordance with an embodiment as broadly described herein.
Figure 2A:
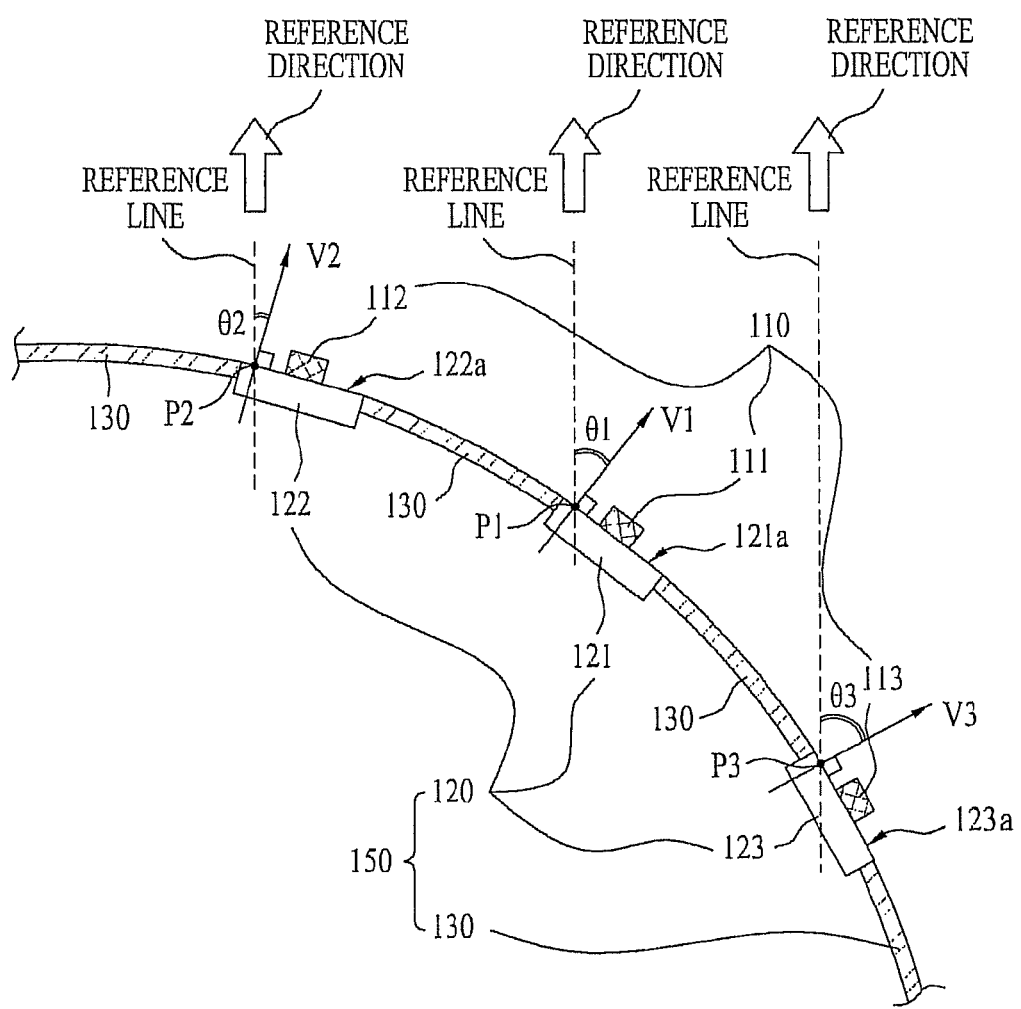
FIGS. 2A and 2B are sectional views of a light source module according to a first embodiment.
Figure 2B:
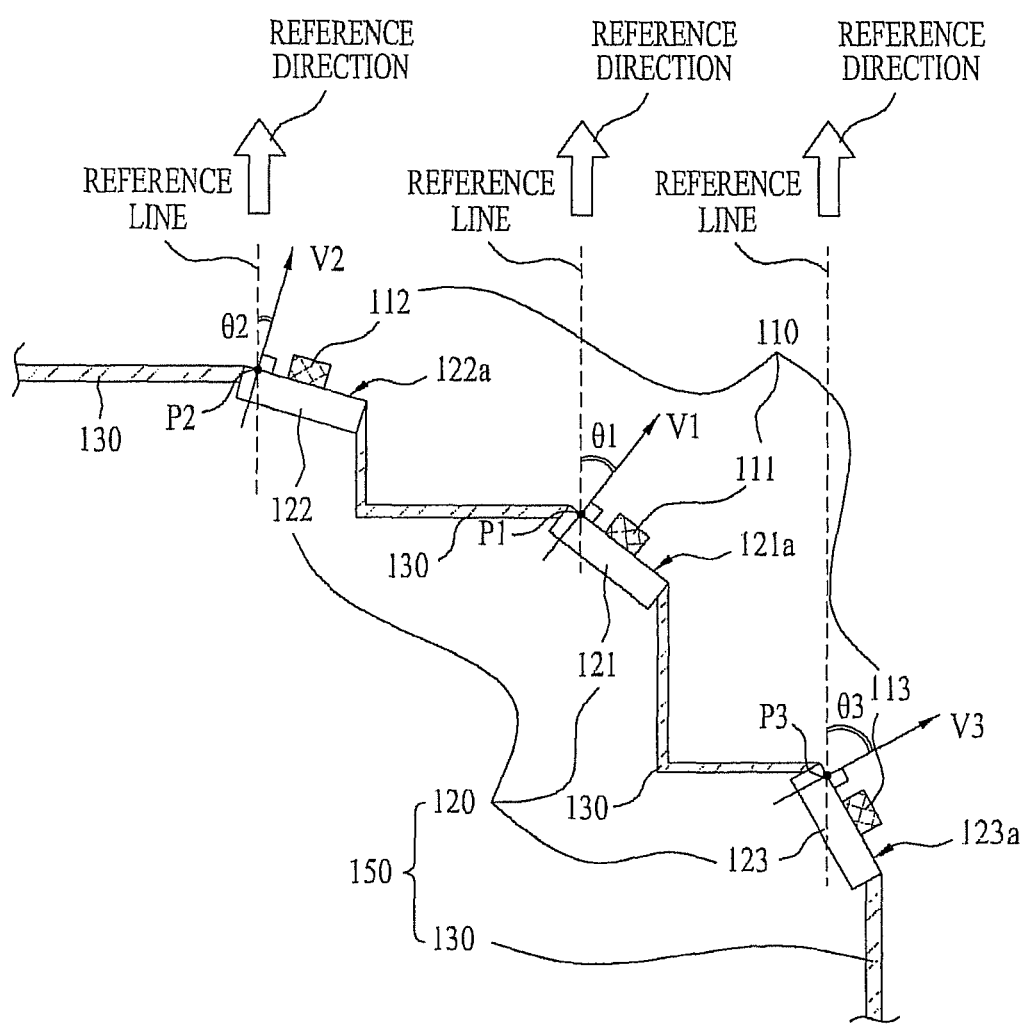

As shown in FIGS. 1, 2A and 2B, the lamp unit as embodied and broadly described herein may include a light source module including a substrate 150 and light sources 110, an optical member 600, and a cover member 700. The light source module may include a substrate 150 having an electrode pattern and a plurality of light sources 110 arranged on the substrate 150. The substrate 150 of the light source module may include a plurality of supporting portions 120 disposed so as to correspond to the respective light sources 110 and a plurality of connecting portions 130 disposed between neighboring supporting portions 120.

The substrate 150 of the light source module may be manufactured so as to exhibit flexibility. The substrate 150 of the light source module may be a printed circuit board (PCB) made of any one selected from among polyethylene terephthalate (PET), glass, polycarbonate (PC), silicon (Si), polyimide, and epoxy. The substrate 150 of the light source module may be formed in a film shape. Also, a single layer PCB, multi layer PCB, ceramic substrate, or metal core PCB may be selectively used as the substrate 150 of the light source module.

The entirety of the substrate 150 of the light source module may be formed of the same material. According to circumstances, a portion of the substrate 150 may be formed of a material different from that of the remaining portion of the substrate 150. For example, in certain embodiments, the supporting portions 120 and the connecting portions 130 of the substrate 150 may be formed of the same material. As an example, the supporting portions 120 and the connecting portions 130 of the substrate 150 may each include a base member and a circuit pattern disposed on at least one surface of the base member. The base member may be formed of a film, such as polyimide or epoxy (for example, FR-4), exhibiting flexibility and insulating properties.

In alternative embodiments, the supporting portions 120 of the substrate 150 and the connecting portions 130 of the substrate 150 may be formed of different materials. For example, the supporting portions 120 of the substrate 150 may be conductors, and the connecting portions 130 of the substrate 150 may be nonconductors. Also, the supporting portions 120 of the substrate 150 may be formed of a hard material which is not flexible to support the respective light sources 110, and the connecting portions 130 of the substrate 150 may be formed of a soft material which is flexible. Consequently, the substrate 150 of the light source module may be manufactured so as to be applied to an object having curvature.

As described above, the substrate 150 of the light source module may be formed of the soft material, and therefore, the substrate 150 may be curved. However, the substrate 150 of the light source module may be curved due to structural deformation thereof.

For example, the supporting portions 120 of the substrate 150 may have a first thickness, and the connecting portions 130 of the substrate 150 may have a second thickness. The first thickness may be different from the second thickness so that the substrate 150 may be curved.

As an example, if a thickness of the connecting portions 130 of the substrate 150 is less than a thickness of the supporting portions 120 of the substrate 150, the substrate 150 may be curved due to the connecting portions 130 of the substrate 150, and therefore, the substrate 150 of the light source module may be applied to an object having curvature.

Also, a reflective coating film or reflective coating material layer may be formed at the substrate 150 of the light source module to reflect light generated by the light sources 110 toward the optical member 600.

The reflective coating film or reflective coating material layer may contain a metal, such as aluminum (Al), silver (Ag), or gold (Au), exhibiting high reflectance or a metal oxide, such as titanium oxide (TiO2), exhibiting high reflectance.

In certain embodiments, a plurality of heat dissipation pins to dissipate heat generated from the light sources 110 may be arranged at the substrate 150 of the light source module. For example, the heat dissipation pins may be disposed at the entire area of the substrate 150 including the supporting portions 120 and the connecting portions 130 or only at the supporting portions 120 of the substrate 150 supporting the light sources 110.

Conductive patterns to apply current to drive the light sources 110 may be disposed at the substrate 150 of the light source module. For example, the conductive patterns may be disposed at the entire area of the substrate 150 including the supporting portions 120 and the connecting portions 130, only at the supporting portions 120 of the substrate 150 supporting the light sources 110, or only at the connecting portions 130 of the substrate 150 interconnecting neighboring supporting portions 120 to electrically interconnect neighboring light sources 110.

Also, the substrate 150 of the light source module may be disposed at a predetermined angle with respect to a reference line facing a predetermined reference direction. For example, in a case in which the lamp unit is applied to an object having curvature, the surface of the substrate 150 of the light source module may include areas having various angles with respect to the reference line facing the predetermined reference direction. On the other hand, in a case in which the lamp unit is applied to an object having no curvature, i.e. a flat object, the surface of the substrate 150 of the light source module may include only areas having the same angle to the reference line facing the predetermined reference direction.

The predetermined reference direction may be a direction in which the amount or intensity of light generated from the light sources 110 is measured. In a case in which a predetermined condition, such as the amount or intensity of light emitted in a specific direction, is required in an object, to which the lamp unit is applied, the lamp unit must be designed according to the required condition.

Figure 33:
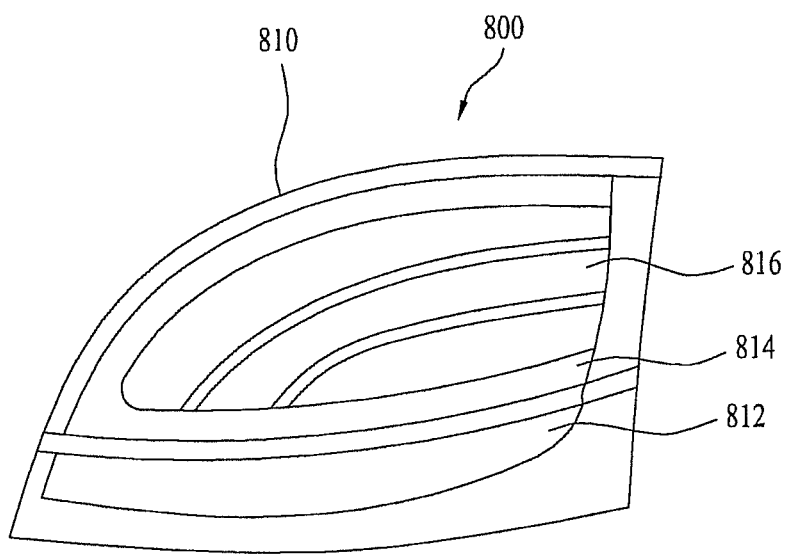
FIG. 33 is a view showing a taillight for vehicles including the lamp unit as embodied and broadly described herein.
Figure 34:
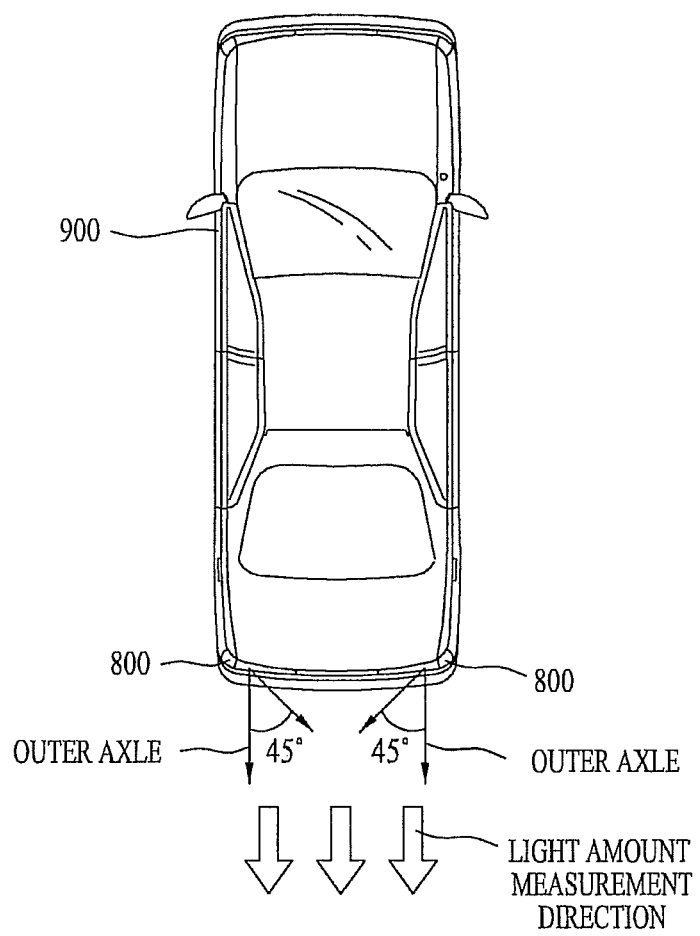
FIG. 34 is a plan view showing a vehicle including a lamp unit as embodied and broadly described herein.

For example, in a case in which the lamp unit is applied to a tail light 800 of a vehicle 900, as shown in FIGS. 33 and 34, certain safety standards may apply. For example, when viewed at a horizontal angle of an outer axle of the vehicle of 45 degrees from the central point of light, a projected area may be greater than or equal to about 12.5 cm2, and, for example, the brightness of a braking lamp may be about 40 to 420 candela (cd). Consequently, the entirety of the lamp unit may be designed taking the predetermined reference direction into consideration.

For example, the supporting portions 120 of the substrate 150 may be designed such that each supporting portion 120 of the substrate 150 has a surface perpendicular to a normal line connected to a point on the surface of the optical member 600, and the normal lines corresponding to the respective supporting portions 120 of the substrate 150 have the same length.

In certain embodiments, the supporting portions 120 of the substrate 150 may be designed such that a perpendicular line passing through a point on the surface of each supporting portion 120 facing a corresponding one of the light sources 110 is at a predetermined angle with respect to the reference line facing the predetermined reference direction, and the intensity of light from the light sources 110 disposed at the supporting portions 120 having an angle between a perpendicular line passing through a point on the surface of each supporting portion 120 facing a corresponding one of the light sources 110 and the reference line facing the predetermined reference direction of 0 to 45 degrees is greater than that of light from the light sources 110 disposed at the supporting portions 120 having an angle between a perpendicular line passing through a point on the surface of each supporting portion 120 opposite a corresponding one of the light sources 110 and the reference line facing the predetermined reference direction of 45.1 to 90 degrees.

In another case, the supporting portions 120 of the substrate 150 may be designed such that a perpendicular line passing through a point on the surface of each supporting portion 120 facing a corresponding one of the light sources 110 is at a predetermined angle with respect to the reference line facing the predetermined reference direction, and the density of the light sources 110 disposed at the supporting portions 120 having an angle between a perpendicular line passing through a point on the surface of each supporting portion 120 facing a corresponding one of the light sources 110 and the reference line facing the predetermined reference direction of 0 to 45 degrees is greater than that of the light sources 110 disposed at the supporting portions 120 having an angle between a perpendicular line passing through a point on the surface of each supporting portion 120 opposite a corresponding one of the light sources 110 and the reference line facing the predetermined reference direction of 45.1 to 90 degrees.

In a further case, the supporting portions 120 of the substrate 150 may be designed such that a perpendicular line passing through a point on the surface of each supporting portion 120 facing a corresponding one of the light sources 110 is at a predetermined angle with respect to the reference line facing the predetermined reference direction, and an orientation angle of light from the light sources 110 disposed at the supporting portions 120 having an angle between a perpendicular line passing through a point on the surface of each supporting portion 120 facing a corresponding one of the light sources 110 and the reference line facing the predetermined reference direction of 0 to 45 degrees is less than that of the light sources 110 disposed at the supporting portions 120 having an angle between a perpendicular line passing through a point on the surface of each supporting portion 120 opposite a corresponding one of the light sources 110 and the reference line facing the predetermined reference direction of 45.1 to 90 degrees.

Each light source 110 of the light source module may be a top view type light emitting diode. In certain embodiments, each light source 110 of the light source module may be a side view type light emitting diode.

Each light source 110 of the light source module may be a light emitting diode (LED) chip. The LED chip may be a red LED chip, blue LED chip, or ultraviolet LED chip. Alternatively, the LED chip may be at least one selected from among a red LED chip, green LED chip, blue LED chip, yellow LED chip, and white LED chip, or a combination thereof.

A white LED may be realized by using a yellow phosphor on a blue LED or simultaneously using a red phosphor and green phosphor on a blue LED. Also, a white LED may be realized by simultaneously using a yellow phosphor, red phosphor, and green phosphor on a blue LED.

For example, in a case in which the lamp unit is applied to a taillight of a vehicle, each light source 110 of the light source module may be a vertical light emitting chip, such as a red light emitting chip. However, embodiments are not limited thereto.

Each light source 110 of the light source module may include a lens 200. The lens 200 may include a groove disposed at a position corresponding to the central area of a light emission surface of each light source 110.

In certain embodiments, a groove may be provided in the lens 200, for example, at the bottom of the lens 200, corresponding to each light source 110. The groove may have a conical or trapezoidal cross sectional shape having a wide top and a narrow bottom to widen an orientation angle of light emitted from each light source 110. However, embodiments are not limited thereto, and various types of lenses may be used.

The optical member 600 may be spaced apart from the substrate 150 by a predetermined distance. A light mixing area, or air guide area, may be formed between the substrate 150 and the optical member 600.

In certain embodiments, the cover member 700 may be omitted, and the optical member 600 may function as the cover member 700. In alternative embodiments, the optical member 600 may be omitted, and only the cover member 700 may be provided.

The optical member 600 may include at least one sheet, such as, for example, a diffusion sheet that diffuses light emitted from the light sources 110, a prism sheet that guides the diffused light to a light emission area, and/or brightness enhancement sheet that enhances brightness.

For example, the diffusion sheet may be generally formed of acryl resin, to which, however, the diffusion sheet is not limited. In addition, the diffusion sheet may be formed of a material having a light diffusion function, for example, high-transmissive plastic, such as polystyrene (PS), polymethyl methacrylate (PMMA), cyclic olefin copolymer (COC), polyethylene terephthalate (PET), or resin.

The optical member 600 may also have an uneven pattern formed at the upper surface thereof.

The optical member 600 may diffuse light emitted from the light source module. To improve a diffusion effect, the uneven pattern may be formed at the upper surface of the optical member 600.

The optical member 600 may include a plurality of layers. The uneven pattern may be formed at the surface of the uppermost layer or a specific one of the layers.

The uneven pattern may have a stripe shape arranged in one direction.

The uneven pattern may have protrusions formed at the surface of the optical member 600. Each protrusion may include a first surface and second surface opposite to each other. The angle between the first surface and second surface may be an obtuse angle or acute angle.

In certain embodiments, the optical member 600 may include at least two inclined surfaces having at least one inflection point IP.

The optical member 600 may also include a curved surface having at least one radius of curvature.

The optical member 600 may have a surface having for example, a concave surface, convex surface, flat surface, or a combination thereof according to the shape of the cover member 700 or an object to which the lamp unit is mounted.

A normal line connected to a point on the surface of the optical member 600 may be perpendicular or approximately perpendicular to the surface of each supporting portion 120 of the substrate 150, and all of the normal lines corresponding to the respective supporting portions 120 of the substrate 150 may have the same length or similar lengths.

Also, a normal line connected to a point on the surface of the optical member 600 may be perpendicular or approximately perpendicular to the surface of each supporting portion 120 of the substrate 150, and at least one of the normal lines corresponding to the respective supporting portions 120 of the substrate 150 may be different in length from the others.

For example, when a perpendicular line passing through a point on the surface of each supporting portion 120 of the substrate 150 passes through a point of the optical member 600, the distance between the point of the optical member 600 and the surface of each supporting portion 120 may be about 10 mm or more.

If the distance between the point of the optical member 600 and the surface of each supporting portion 120 is less than about 10 mm, the lamp unit may not exhibit uniform brightness, and a hot spot phenomenon having excessively high brightness at the area at which each light source 110 is located may occur.

A heat dissipation member 400 may be disposed under the substrate 150 of the light source module to dissipate heat generated from the light sources 110. The heat dissipation member 400 may be formed of a material exhibiting high thermal conductivity, such as aluminum, an aluminum alloy, copper, or a copper alloy.

Alternatively, the substrate 150 of the light source module and the heat dissipation member 400 may be integrally formed to constitute a metal core printed circuit board (MCPCB), or an additional heat dissipation member 400 may be disposed at the bottom of the MCPCB.

In a case in which such an additional heat dissipation member 400 is attached to the bottom of the MCPCB, such attachment may be achieved using, for example, an acryl bonding agent.

Generally, when the temperature of each light source 110 is increased by heat generated from each light source 110, the luminous intensity of each light source 110 may be decreased, and the waveform of generated light may be shifted.

In particular, when each light source 110 is a red light emitting diode, the waveform of generated light may be excessively shifted, and the luminous intensity of each light source 110 may be excessively decreased.

On the other hand, when the heat dissipation member 400 is disposed at the bottom of the substrate 150 of the light source module, heat generated from each light source 110 may be more efficiently dissipated, and therefore, the increase in temperature of each light source 110 may be suppressed, thereby preventing the luminous intensity of each light source 110 from being decreased and the waveform of generated light from being shifted.

The cover member 700 may include a top cover 700a and a side cover 700b. The top cover 700a may be formed of a light transmissive material, and the side cover 700b may be formed of a light non-transmissive material.

In certain embodiments, both the top cover 700a and side cover 700b may be formed of a light transmissive material.

The cover member 700 may be formed of a material (for example, acryl) capable of protecting the light source module including the substrate 150 and the light sources 110 from external impact and transmitting light emitted from the light source module.

Also, the cover member 700 may include a curved portion. The substrate 150 of the light source module is flexible and thus may be easily received in the curved cover member 700.

A reflector 710 may be disposed at the inside of the side cover 700b of the cover member 700.

A reflective coating film or reflective coating material layer may be formed at the reflector 710. The reflector 710 may reflect light generated by the light sources 110 toward the optical member 600.

The reflector 710 may contain a metal, such as chrome (Cr), aluminum (Al), silver (Ag), or gold (Au), exhibiting high reflectance or a metal oxide, such as titanium oxide (TiO2), exhibiting high reflectance.

The cover member 700 may contact the optical member 600. In certain embodiments, only a portion of the cover member 700 may contact the optical member 600, and the remaining portion of the cover member 700 may be spaced apart from the optical member 600 by a predetermined distance.

In certain embodiments, the entire surface of the cover member 700 opposite the optical member 600 may contact the optical member 600.

Substantially the entire surface of the cover member 700 opposite the optical member 600 may be spaced apart from the optical member 600 by a predetermined distance.

The distance between the cover member 700 and the optical member 600 may be varied based on desired design characteristics of the apparatus to which the light source module is mounted, to provide uniform brightness throughout.

In this embodiment, as described above, a plurality of light sources having different arrangement directions with respect to the predetermined reference direction is provided, and a light mixing area, or air guide area, may be formed between the light sources and the optical member, thereby realizing a surface light source using a small number of light sources.

A surface light source is a light source that may diffuse light in a surface shape. In this embodiment, a lamp unit may be provided that satisfies a particular condition, such as a particular amount of light emitted in a specific direction, and may embody a surface light source using a small number of light sources.

Also, in this embodiment, a plurality of light sources may be disposed on a flexible substrate, and therefore, the lamp unit may be applied to an object having various shapes, such as a curved shape.

In this embodiment, therefore, it may be possible to improve economy of the lamp unit and a degree of freedom in product design.

FIGS. 2A and 2B are sectional views of light source modules, according to embodiments as broadly described herein.

As shown in FIGS. 2A and 2B, the light source module may include a substrate 150 and a plurality of light sources 110 arranged on the substrate 150. The substrate 150 may include a plurality of supporting portions 120 and a plurality of connecting portions 130. The supporting portions 120 may correspond to the respective light sources 110, and the connecting portions 130 may be disposed between neighboring supporting portions 120. The supporting portions 120 may include a first supporting portion 121, second supporting portion 122, and third supporting portion 123. The second supporting portion 122 may be disposed at one side of the first supporting portion 121. The third supporting portion 123 may be disposed at the other side of the first supporting portion 121. Other arrangements may also be appropriate. The light sources 110 may include a first light source 111, second light source 112, and third light source 113. The first light source 111 may be supported by the first supporting portion 121. The second light source 112 may be supported by the second supporting portion 122. The third light source 113 may be supported by the third supporting portion 123.

The first supporting portion 121 may be disposed such that a first perpendicular line V1 passing through a first point P1 of a surface 121a of the first supporting portion 121 on which the first light source 111 is mounted is at a first angle θ1 with respect to a reference line facing a predetermined reference direction. The predetermined reference direction may be a direction in which the amount or intensity of light generated from the light sources 110 is measured. The second supporting portion 122 may be disposed such that a second perpendicular line V2 passing through a second point P2 of a surface 122a of the second supporting portion 122 on which the second light source 112 is mounted is at a second angle θ2 with respect to the reference line. The third supporting portion 123 may be disposed such that a third perpendicular line V3 passing through a third point P3 of a surface 123a of the third supporting portion 123 on which the third light source 113 is mounted is at a third angle θ3 with respect to the reference line.

The first angle θ1 may be different from the second angle θ2 and/or the third angle θ3. For example, the first angle θ1 may be greater than the second angle θ2 and less than the third angle θ3. Alternatively, the first angle θ1 may be less than the second angle θ2 and greater than the third angle θ3.

In certain embodiments, the first angle θ1 may be equal to the second angle θ2 and/or the third angle θ3. For example, the first angle θ1 may be equal to the second angle θ2 and less than the third angle θ3. Alternatively, the first angle θ1 may be less than the second angle θ2 and equal to the third angle θ3.

As described above, the supporting portions 120 of the substrate 150 may be disposed at predetermined angles with respect to the reference line facing the predetermined reference direction. For example, in a case in which a lamp unit is applied to an object having curvature, the surfaces of the supporting portions 120 of the substrate 150 may include areas having various angles with respect to the reference line facing the predetermined reference direction. On the other hand, in a case in which the lamp unit is applied to an object having no curvature, i.e. a flat object, the surfaces of the supporting portions 120 of the substrate 150 may include only areas having the same angle with respect to the reference line facing the predetermined reference direction.

The predetermined reference direction may be a direction in which the amount or intensity of light generated from the light sources 110 is measured. In a case in which a predetermined condition, such as the amount or intensity of light emitted in a specific direction, is required in an object, to which the lamp unit is applied, the light source module may be disposed according to the required condition.

For example, in a case in which the lamp unit is applied to a taillight of a vehicle, a safety standard of the lamp unit applied to the taillight of the vehicle must satisfy the following condition. That is, when viewed at a horizontal angle of an outer axle of the vehicle of 45 degrees from the central point of light, a projected area may be greater than or equal to about 12.5 cm2, and, for example, the brightness of a braking lamp may be about 40 to 420 candela (cd).

Consequently, the entirety of the light source module may be designed based on the predetermined reference direction, and therefore, the supporting portions 120 of the substrate 150 may be disposed at predetermined angles with respect to the reference line, facing the predetermined reference direction.

Figure 3A:
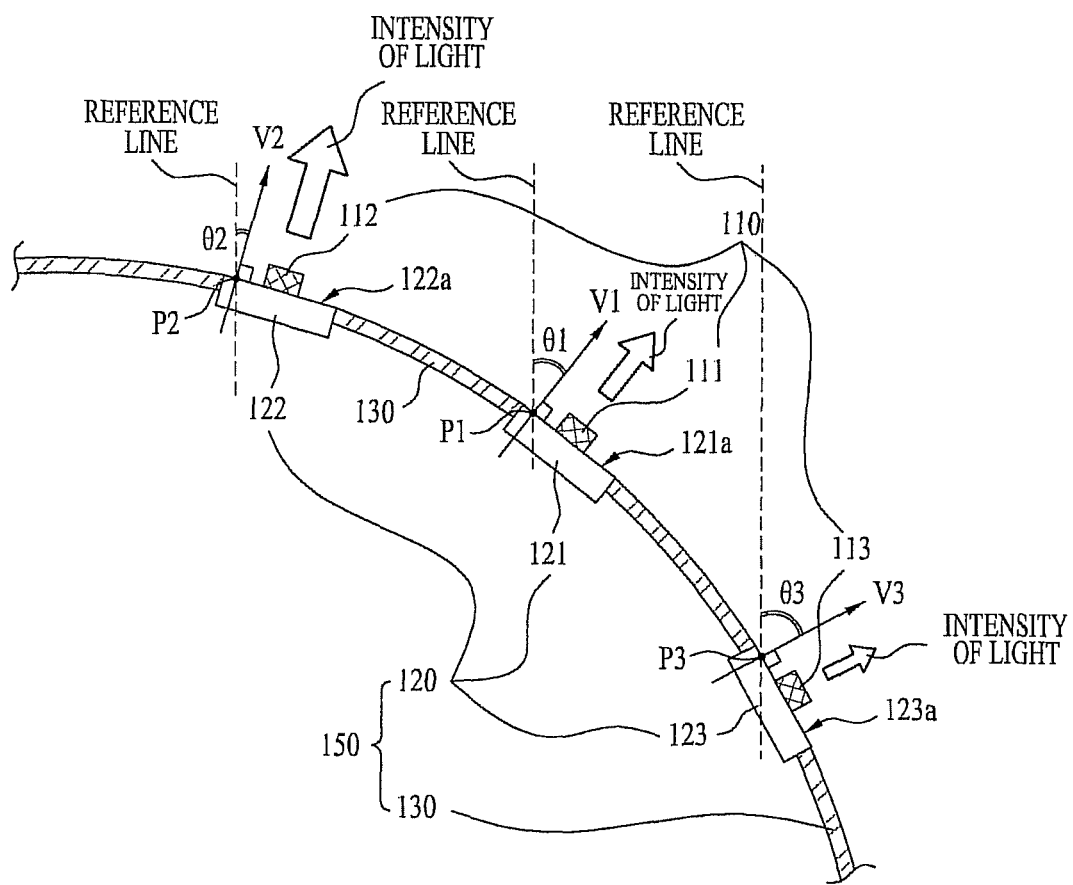
FIGS. 3A and 3B are sectional views showing arrangement of a light source module according to a second embodiment.
Figure 3B:
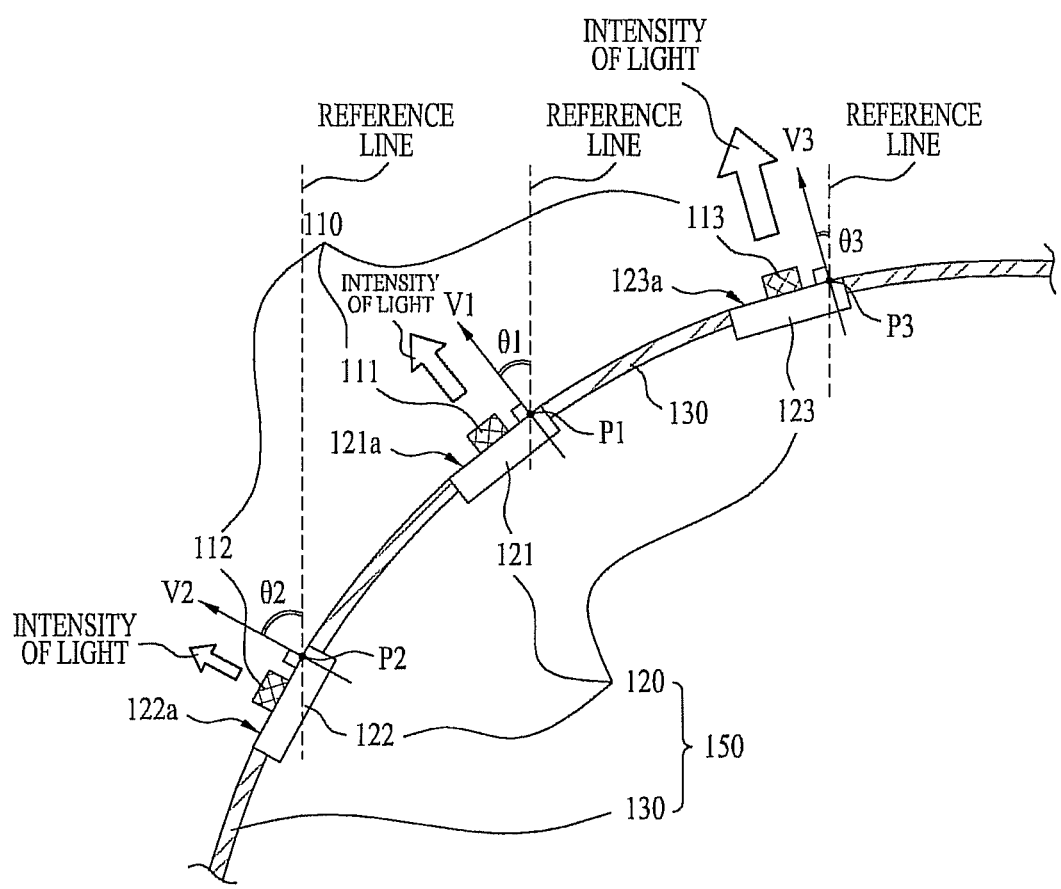

FIGS. 3A and 3B are sectional views of a light source module according to a second embodiment.

As shown in FIGS. 3A and 3B, the light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. The supporting portions 120 may include a first supporting portion 121, second supporting portion 122, and third supporting portion 123. The second supporting portion 122 may be disposed at one side of the first supporting portion 121. The third supporting portion 123 may be disposed at the other side of the first supporting portion 121. The light sources 110 may include a first light source 111 supported by the first supporting portion 121, a second light source 112 supported by the second supporting portion 122, and a third light source 113 supported by the third supporting portion 123.

The first supporting portion 121 may be disposed such that a first perpendicular line V1 passing through a first point P1 of a surface 121a of the first supporting portion 121 facing the first light source 111 is at a first angle θ1 with respect to a reference line facing a predetermined reference direction. The predetermined reference direction may be a direction in which the amount or intensity of light generated from the light sources 110 is measured. The second supporting portion 122 may be disposed such that a second perpendicular line V2 passing through a second point P2 of a surface 122a of the second supporting portion 122 on which the second light source 112 is mounted is at a second angle θ2 with respect to the reference line.

The third supporting portion 123 may be disposed such that a third perpendicular line V3 passing through a third point P3 of a surface 123a of the third supporting portion 123 on which the third light source 113 is mounted is at a third angle θ3 with respect to the reference line.

When the second angle θ2 of the second supporting portion 122 is less than the first angle θ1 of the first supporting portion 121 and the third angle θ3 of the third supporting portion 123, as shown in FIG. 3A, the intensity of light emitted from the second light source 112 supported by the second supporting portion 122 may be greater than that of light emitted from the first light source 111 and the third light source 113.

On the other hand, when the second angle θ2 of the second supporting portion 122 is greater than the first angle θ1 of the first supporting portion 121 and the third angle θ3 of the third supporting portion 123, as shown in FIG. 3B, the intensity of light emitted from the second light source 112 supported by the second supporting portion 122 may be less than that of light emitted from the first light source 111 and the third light source 113.

For example, the intensity of light from the light sources 110 disposed at the supporting portions 120 having an angle between a perpendicular line passing through a point on the surface of each supporting portion 120 opposite a corresponding one of the light sources 110 and the reference line facing the predetermined reference direction of about 0 to 45 degrees may be greater than that of light from the light sources 110 disposed at the supporting portions 120 having an angle between a perpendicular line passing through a point on the surface of each supporting portion 120 opposite a corresponding one of the light sources 110 and the reference line facing the predetermined reference direction of about 45.1 to 90 degrees.

As described above, the supporting portions 120 of the substrate 150 may be disposed at predetermined angles with respect to the reference line facing the predetermined reference direction. Light sources 110 having high intensity of light may be disposed at the supporting portions 120 having a small angle between a perpendicular line passing through a point on the surface of each supporting portion 120 and the reference line facing the predetermined reference direction. Light sources 110 having low intensity of light may be disposed at the supporting portions 120 having a large angle between a perpendicular line passing through a point on the surface of each supporting portion 120 and the reference line facing the predetermined reference direction.

The light sources 110 may be disposed as described above to transmit a large amount of light in the predetermined reference direction, and in particular, to optimize or maximize an amount of light transmitted in a particular direction.

The predetermined reference direction may be a direction in which the amount or intensity of light generated from the light sources 110 is measured. In a case in which a predetermined condition, such as the amount or intensity of light emitted in a specific direction, is required by an apparatus to which the light source module is applied, light sources 110 having different intensities of light may be disposed in order to satisfy the required condition.

For example, in a case in which a lamp unit is applied to a taillight of a vehicle, certain safety standards may apply. That is, as shown in FIG. 34, when viewed at a horizontal angle of an outer axle of the vehicle of 45 degrees from the central point of light, a projected area may be greater than or equal to about 12.5 cm2, and, for example, the brightness of a braking lamp may be about 40 to 420 candela (cd).

Consequently, light sources 110 having relatively high intensity may be disposed at the supporting portions 120 having a small angle between a perpendicular line passing through a point on the surface of each supporting portion 120 and the reference line, and light sources 110 having relatively low intensity may be disposed at the supporting portions 120 having a large angle between a perpendicular line passing through a point on the surface of each supporting portion 120 and the reference line so that the light source module satisfies the predetermined condition, such as the amount or intensity of light, transmitted in the predetermined reference direction.

Figure 4A:
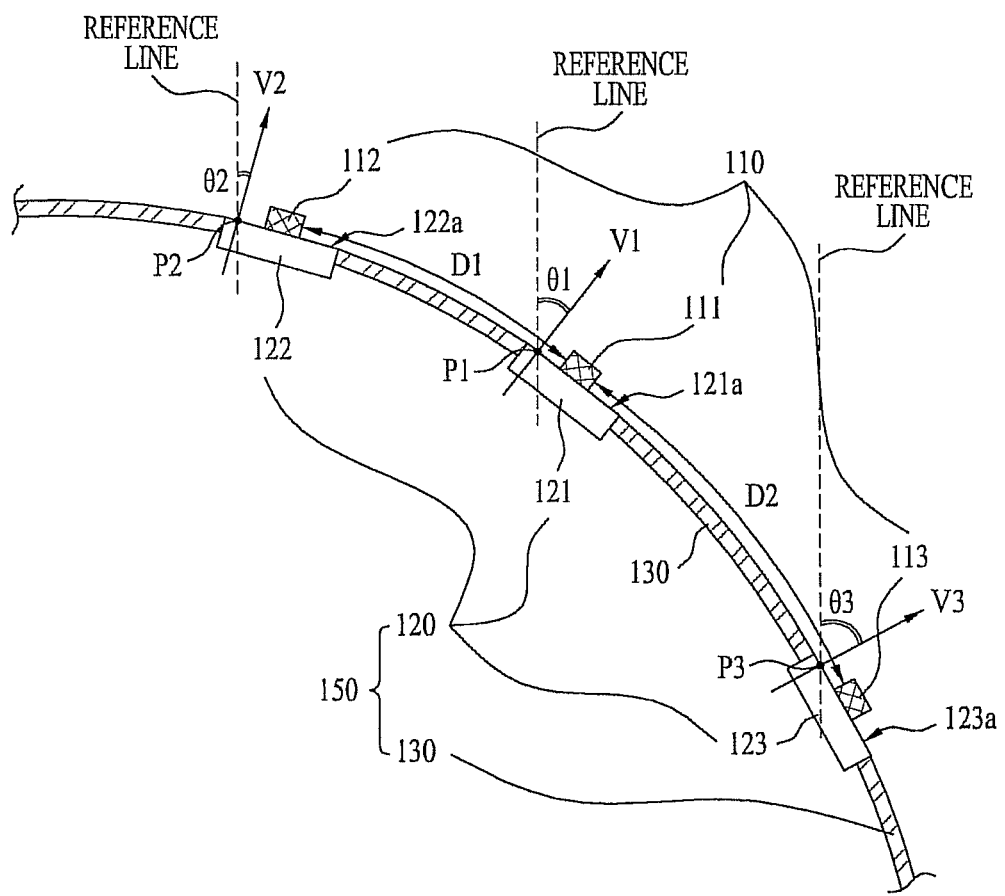
FIGS. 4A and 4B are sectional views showing arrangement of a light source module according to a third embodiment.
Figure 4B:
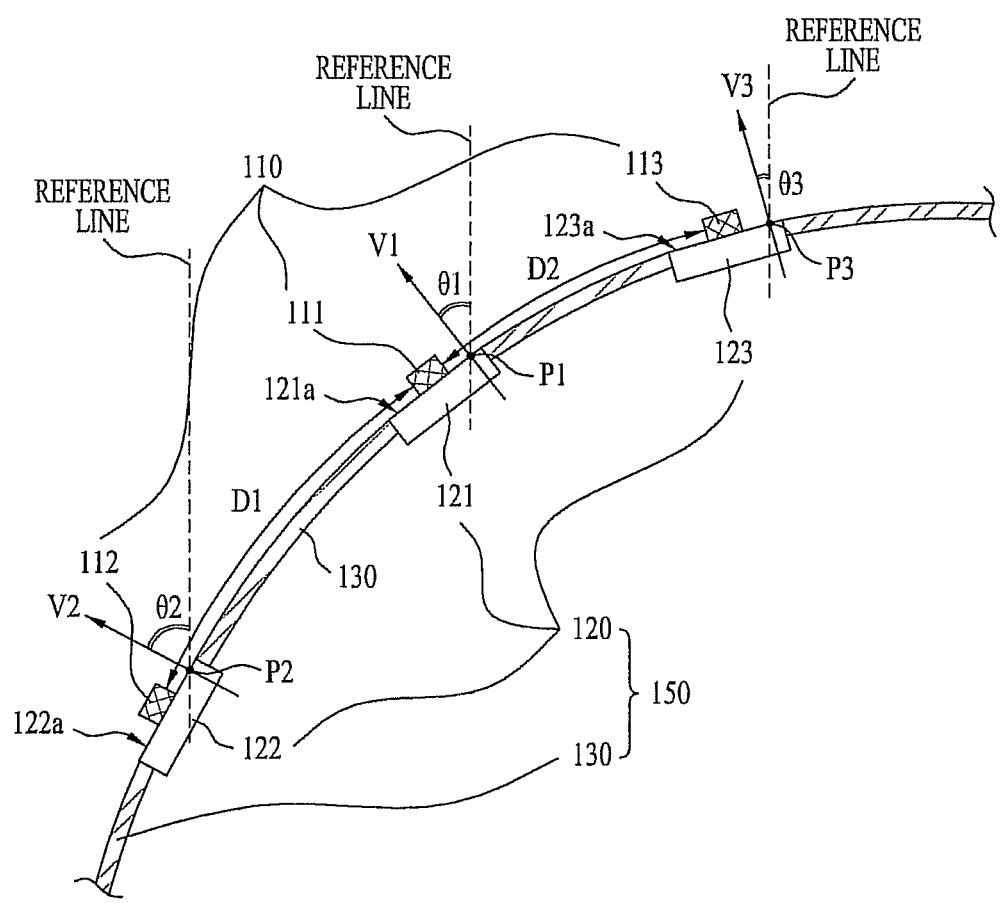

FIGS. 4A and 4B are sectional views of a light source module according to a third embodiment.

As shown in FIGS. 4A and 4B, the light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. The supporting portions 120 may include a first supporting portion 121, second supporting portion 122, and third supporting portion 123. The second supporting portion 122 may be disposed at one side of the first supporting portion 121. The third supporting portion 123 may be disposed at the other side of the first supporting portion 121. The light sources 110 may include a first light source 111, second light source 112, and third light source 113. The first light source 111 may be supported by the first supporting portion 121. The second light source 112 may be supported by the second supporting portion 122. The third light source 113 may be supported by the third supporting portion 123.

The first supporting portion 121 may be disposed such that a first perpendicular line V1 passing through a first point P1 of a surface 121a of the first supporting portion 121 on which the first light source 111 is mounted is at a first angle θ1 with respect to a reference line facing a predetermined reference direction. The predetermined reference direction may be a direction in which the amount or intensity of light generated from the light sources 110 is measured. The second supporting portion 122 may be disposed such that a second perpendicular line V2 passing through a second point P2 of a surface 122a of the second supporting portion 122 on which the second light source 112 is mounted is at a second angle θ2 with respect to the reference line. The third supporting portion 123 may be disposed such that a third perpendicular line V3 passing through a third point P3 of a surface 123a of the third supporting portion 123 on which the third light source 113 is mounted is at a third angle θ3 with respect to the reference line.

When the second angle θ2 of the second supporting portion 122 is less than the first angle θ1 of the first supporting portion 121 and the third angle θ3 of the third supporting portion 123, as shown in FIG. 4A, a first distance D1 between the second light source 112 and the first light source 111 may be less than a second distance D2 between the first light source 111 and the third light source 113.

For example, a ratio of the first distance D1 between the second light source 112 and the first light source 111 to the second distance D2 between the first light source 111 and the third light source 113 may be about 1:1.1 to 1:10.

The length of the connecting portion 130 connected between the first supporting portion 121 and the second supporting portion 122 may be less than that of the connecting portion 130 connected between the first supporting portion 121 and the third supporting portion 123.

On the other hand, when the second angle θ2 of the second supporting portion 122 is greater than the first angle θ1 of the first supporting portion 121 and the third angle θ3 of the third supporting portion 123, as shown in FIG. 4B, the first distance D1 between the second light source 112 and the first light source 111 may be greater than the second distance D2 between the first light source 111 and the third light source 113.

For example, a ratio of the first distance D1 between the second light source 112 and the first light source 111 to the second distance D2 between the first light source 111 and the third light source 113 may be about 1.1:1 to 10:1.

The length of the connecting portion 130 connected between the first supporting portion 121 and the second supporting portion 122 may be greater than that of the connecting portion 130 connected between the first supporting portion 121 and the third supporting portion 123.

That is, the density of the light sources 110 arranged at the supporting portions 120 having an angle between a perpendicular line passing through a point on the surface of each supporting portion 120 on which a corresponding one of the light sources 110 is mounted and the reference line facing the predetermined reference direction of about 0 to 45 degrees may be greater than that of the light sources 110 arranged at the supporting portions 120 having an angle between a perpendicular line passing through a point on the surface of each supporting portion 120 on which a corresponding one of the light sources 110 is mounted and the reference line facing the predetermined reference direction of about 45.1 to 90 degrees.

As described above, the supporting portions 120 of the substrate 150 may be disposed at predetermined angles to the reference line facing the predetermined reference direction. Light sources 110 disposed at the supporting portions 120 having a small angle between a perpendicular line passing through a point on the surface of each supporting portion 120 and the reference line facing the predetermined reference direction may be disposed so as to be adjacent to each other. Light sources 110 disposed at the supporting portions 120 having a large angle between a perpendicular line passing through a point on the surface of each supporting portion 120 and the reference line facing the predetermined reference direction may be disposed so as to be distant from each other.

The light sources 110 may be arranged as described above to transmit a large amount of light in the predetermined reference direction, that is, to transmit the largest amount of light in a given direction with a given set of light sources 110.

The predetermined reference direction may be a direction in which the amount or intensity of light generated from the light sources 110 is measured. In a case in which a predetermined condition, such as the amount or intensity of light emitted in a specific direction, is required by an apparatus to which the lamp unit is applied, the light sources 110 may be disposed so that the light sources 110 have different densities according to the required condition.

For example, in a case in which the lamp unit is applied to a taillight of a vehicle, certain safety standards may apply. That is, as shown in FIG. 34, when viewed at a horizontal angle of an outer axle of the vehicle of 45 degrees from the central point of light, a projected area may be greater than or equal to about 12.5 cm2, and, for example, the brightness of a braking lamp may be about 40 to 420 candela (cd).

Consequently, light sources 110 disposed at the supporting portions 120 having a small angle between a perpendicular line passing through a point on the surface of each supporting portion 120 and the reference line facing the predetermined reference direction may be positioned adjacent to each other, and light sources 110 disposed at the supporting portions 120 having a large angle between a perpendicular line passing through a point on the surface of each supporting portion 120 and the reference line facing the predetermined reference direction may be positioned somewhat distant from each other so that the light source module satisfies the predetermined condition, such as a particular amount or intensity of light transmitted in the predetermined reference direction.

FIGS. 5A to 5D are sectional views showing methods of measuring distances between light sources.

As shown in FIGS. 5A to 5D, a light source module may include a substrate 150 and a plurality of light sources 110 arranged on the substrate 150. The substrate may include a plurality of supporting portions 120 and a plurality of connecting portions 130. The supporting portions 120 may be disposed so as to correspond to the respective light sources 110, and the connecting portions 130 may be disposed between neighboring supporting portions 120. The supporting portions 120 may include a first supporting portion 121, second supporting portion 122, and third supporting portion 123. The second supporting portion 122 may be disposed at one side of the first supporting portion 121. The third supporting portion 123 may be disposed at the other side of the first supporting portion 121. The light sources 110 may include a first light source 111, second light source 112, and third light source 113. The first light source 111 may be supported by the first supporting portion 121. The second light source 112 may be supported by the second supporting portion 122. The third light source 113 may be supported by the third supporting portion 123.

The first light source 111 may include a first side surface 111a and second side surface 111b on opposite sides of the first light source 111. The second light source 112 may include a first side surface 112a and second side surface 112b on opposite sides of the second light source 112. The third light source 113 may include a first side surface 113a and second side surface 113b on opposite sides of the third light source 113.

Figure 5A:
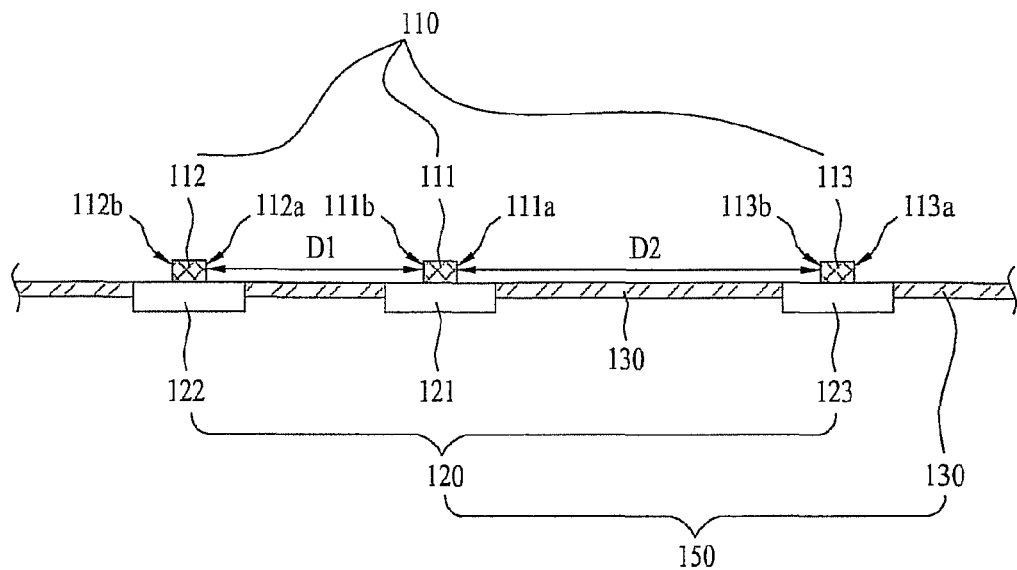
FIGS. 5A to 5D are sectional views showing methods of measuring distances between light sources.

The second side surface 111b of the first light source 111 may face the first side surface 112a of the second light source 112. The first side surface 111a of the first light source 111 may face the second side surface 113b of the third light source 113, as shown in FIG. 5A. Other arrangements may also be appropriate.

When the second angle θ2 of the second supporting portion 122 is less than the first angle θ1 of the first supporting portion 121 and the third angle θ3 of the third supporting portion 123, as shown in FIG. 4A, the first distance D1 between the second light source 112 and the first light source 111 may be less than the second distance D2 between the first light source 111 and the third light source 113.

As shown in FIG. 5A, the first distance D1 may be a distance between the second side surface 111b of the first light source 111 and the first side surface 112a of the second light source 112, and the second distance D2 may be a distance between the first side surface 111a of the first light source 111 and the second side surface 113b of the third light source 113.

Figure 5B:
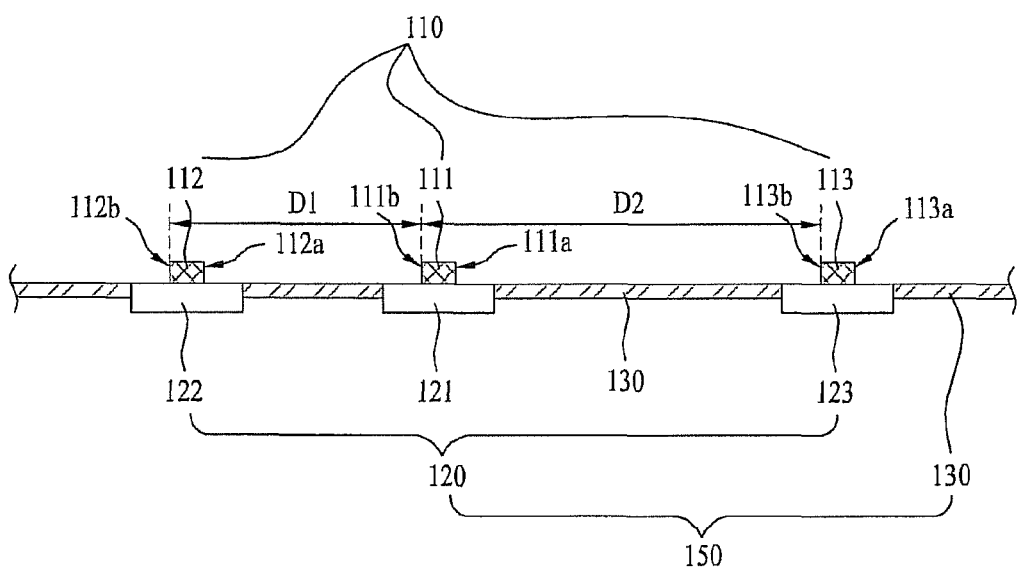

In certain embodiments, as shown in FIG. 5B, the first distance D1 may be a distance between the second side surface 111b of the first light source 111 and the second side surface 112b of the second light source 112, and the second distance D2 may be a distance between the second side surface 111b of the first light source 111 and the second side surface 113b of the third light source 113.

Figure 5C:
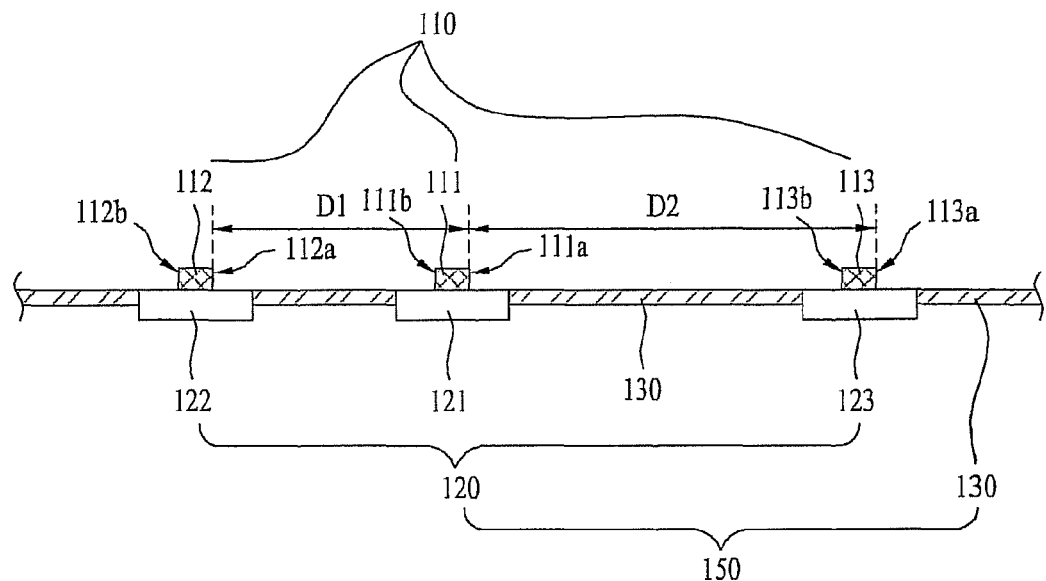

In alternative embodiments, as shown in FIG. 5C, the first distance D1 may be a distance between the first side surface 111a of the first light source 111 and the second side surface 112b of the second light source 112, and the second distance D2 may be a distance between the first side surface 111a of the first light source 111 and the first side surface 113a of the third light source 113.

Figure 5D:
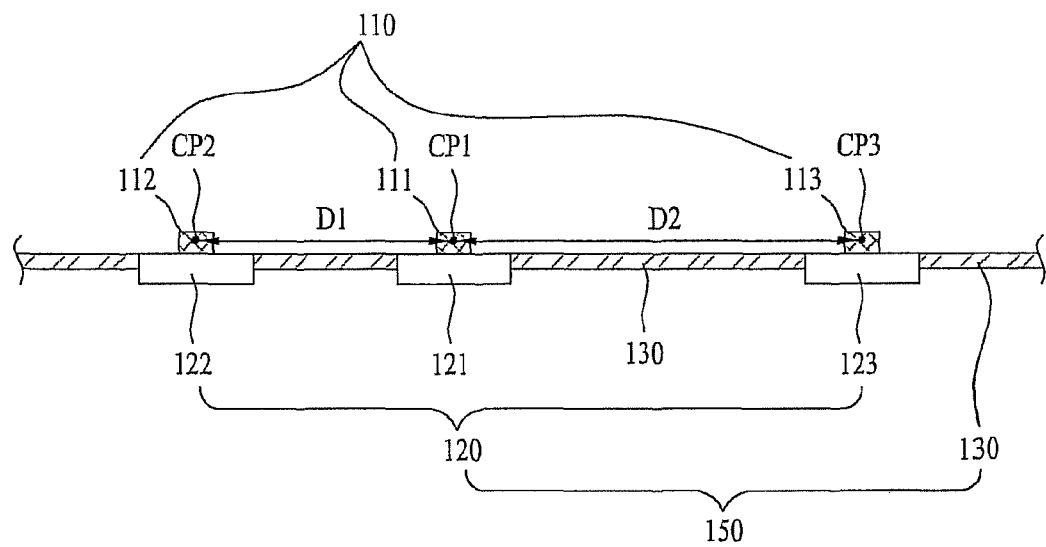

In alternative embodiments, as shown in FIG. 5D, the first distance D1 may be a distance between a central point CP1 of the first light source 111 and a central point CP2 of the second light source 112, and the second distance D2 may be a distance between the central point CP1 of the first light source 111 and a central point CP3 of the third light source 113.

The various methods described above may be applied to measure the first distance D1 and the second distance D2 so that, in a case in which a predetermined condition, such as the amount or intensity of light emitted in a specific direction, is required by an apparatus to which a lamp unit is applied, the lamp unit may be designed to satisfy the required condition.

Consequently, substantially the entirety of the lamp unit may be designed based on the predetermined reference direction, so that certain performance characteristics may be achieved.

FIGS. 6A to 6D are sectional views of supporting portions of a substrate, in accordance with embodiments as broadly described herein.

Figure 6A:
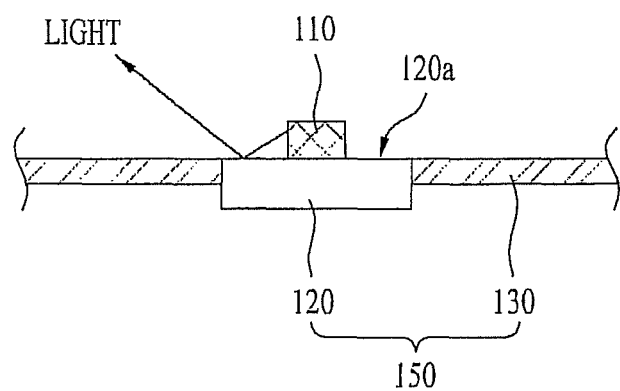
FIGS. 6A to 6D are sectional views showing supporting portions of a substrate.

As shown in FIGS. 6A to 6D, a light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. As shown in FIG. 6A, a surface 120a of each supporting portion 120 facing a corresponding one of the light sources 110 mounted thereon may be a flat surface.

Figure 6B:
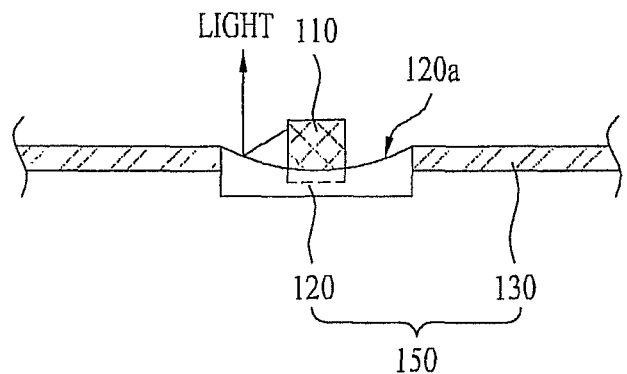
Figure 6C:
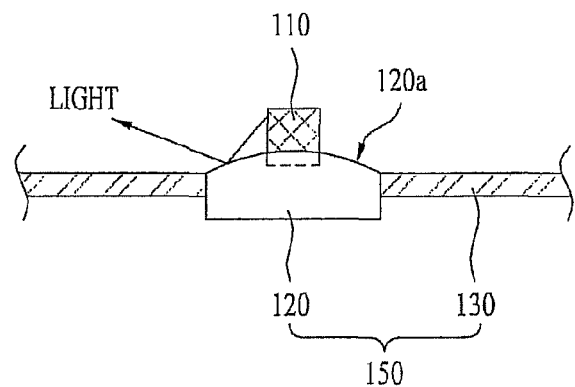

In certain embodiments, as shown in FIG. 6B, the surface 120a of each supporting portion 120 facing a corresponding one of the light sources 110 may be a concave surface. Alternatively, as shown in FIG. 6C, the surface 120a of the supporting portion 120 facing a corresponding one of the light sources 110 may be a convex surface.

Figure 6D:
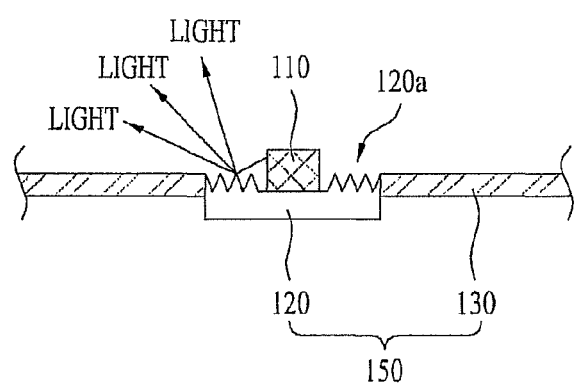

In another embodiment, as shown in FIG. 6D, the surface 120a of the supporting portion 120 facing a corresponding one of the light sources 110 may have an uneven pattern formed thereon.

In certain embodiments, a reflective coating film or reflective coating material layer may be formed at each supporting portion 120 of the substrate 150 to reflect light generated by the light sources 110 toward the optical member 600. The reflective coating film or reflective coating material layer may contain a metal, such as, for example, chrome (Cr), aluminum (Al), silver (Ag), gold (Au), or other metal exhibiting relatively high reflectance or a metal oxide, such as, for example, titanium oxide (TiO2), or other material exhibiting relatively high reflectance.

As described above, the shape or contour or surface finish of the surface of each supporting portion 120 of the substrate 150 may be varied based on a design condition of the light source module required by an apparatus to which the light source module is mounted, to provide uniform brightness throughout. The supporting portions 120 may all be flat, or all concave, or all convex, or all patterned, or a combination thereof, as appropriate for a particular application.

FIGS. 7A to 7D are sectional views of connecting portions of a substrate, in accordance with embodiments as broadly described herein.

As shown in FIGS. 7A to 7D, a light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120.

Figure 7A:
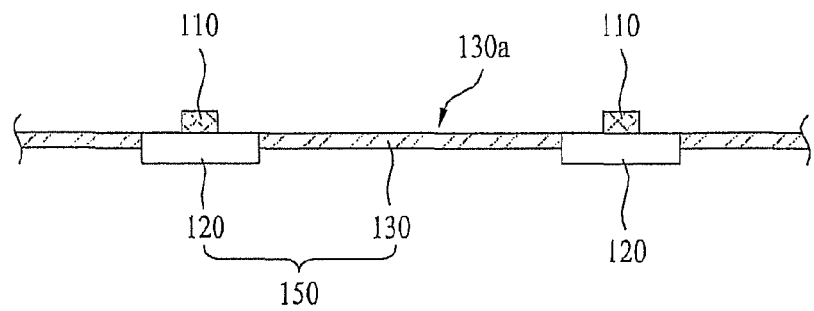
FIGS. 7A to 7D are sectional views showing connecting portions of a substrate.

As shown in FIG. 7A, a surface 130a of each connecting portion 130 disposed between neighboring supporting portions 120 may be a flat surface.

Figure 7B:
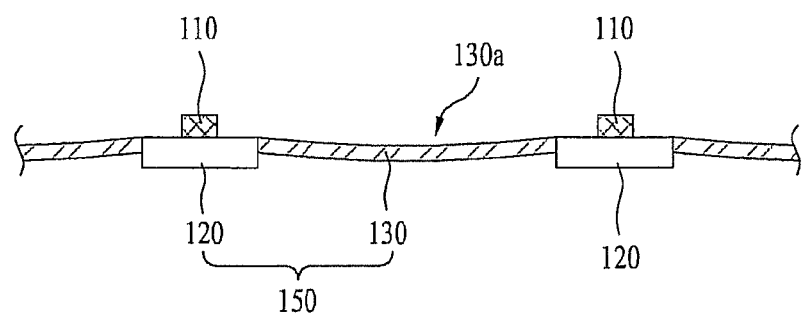
Figure 7C:
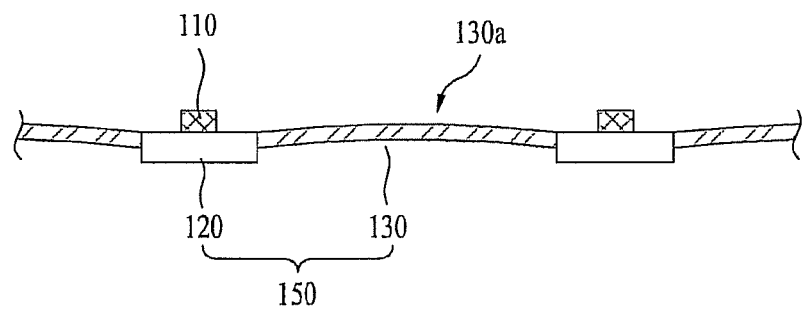

In certain embodiments, as shown in FIG. 7B, the surface 130a of each connecting portion 130 disposed between neighboring supporting portions 120 may be a concave surface. Alternatively, as shown in FIG. 7C, the surface 130a of each connecting portion 130 disposed between neighboring supporting portions 120 may be a convex surface.

Figure 7D:
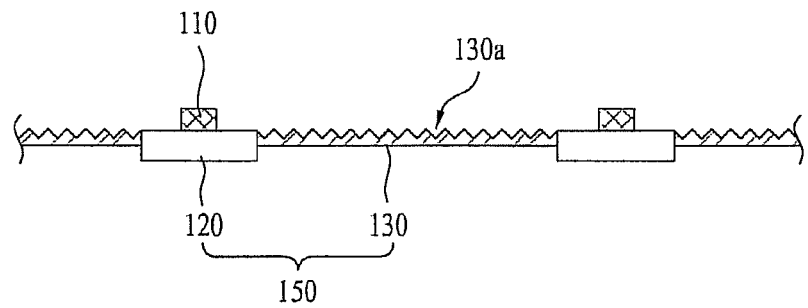

In another embodiment, as shown in FIG. 7D, the surface 130a of each connecting portion 130 disposed between neighboring supporting portions 120 may have an uneven pattern formed thereon.

In certain embodiments, a reflective coating film or reflective coating material layer may be formed at each connecting portion 130 of the substrate 150 to reflect light generated by the light sources 110 toward the optical member 600.

The reflective coating film or reflective coating material layer may contain a metal, such as, for example, chrome (Cr), aluminum (Al), silver (Ag), gold (Au), or other metal exhibiting high reflectance or a metal oxide, such as titanium oxide (TiO2), or other material exhibiting high reflectance.

As described above, the shape of the surface of each connecting portion 130 of the substrate 150 may be varied based on a design condition of the light source module required by an apparatus to which the light source module is mounted, to provide uniform brightness throughout. The connecting portions 130 may all be flat, or all concave, or all convex, or all patterned, or a combination thereof, as appropriate for a particular application. Further, the various types of supporting portions 120 shown in FIGS. 6A-6D may be combined with the various types of connecting portions 130 shown in FIGS. 7A-7D as appropriate for a particular application.

Figure 8A:
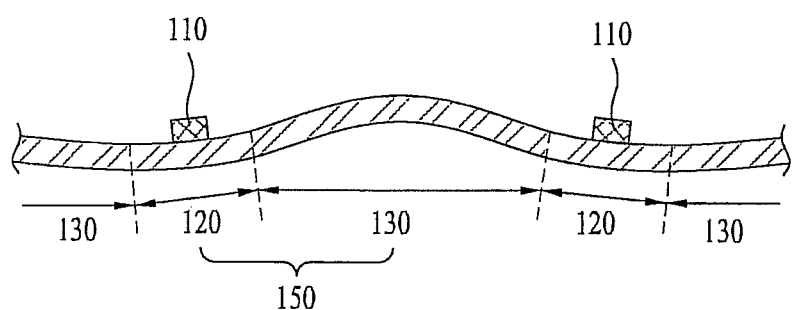
FIGS. 8A and 8B are sectional views showing types of connection between supporting portions and connecting portions of a substrate.
Figure 8B:
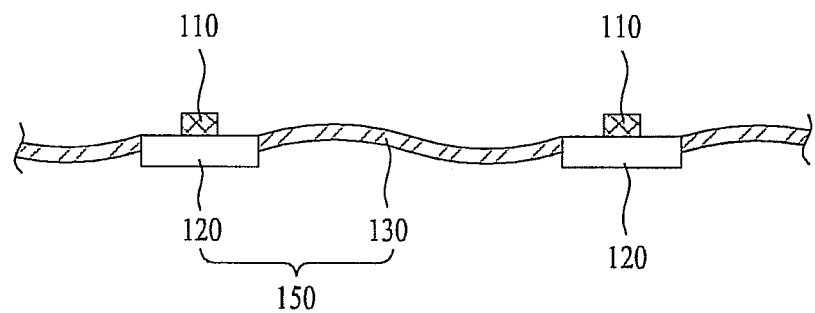

FIGS. 8A and 8B are sectional views of connection between supporting portions and connecting portions of a substrate, in accordance with embodiments as broadly described herein. FIG. 8A shows an integration type substrate in which supporting portions and connecting portions are integrated, and FIG. 8B shows a separation type substrate in which supporting portions and connecting portions are separated.

As shown in FIGS. 8A and 8B, a light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120.

As shown in FIG. 8A, the substrate 150 may be an integrated type in which the supporting portions 120 of the substrate 150 and the connecting portions 130 of the substrate 150 are formed of the same material.

For example, the supporting portions 120 and the connecting portions 130 of the substrate 150 may each include a base member and a circuit pattern disposed on at least one surface of the base member. The base member may be formed of a film, such as polyimide or epoxy (for example, FR-4), exhibiting flexibility and insulating characteristics.

Additionally, the supporting portions 120 and the connecting portions 130 of the substrate 150 may be formed of a soft material which is flexible, so that the substrate 150 may be applied to an object having curvature.

On the other hand, as shown in FIG. 8B, the substrate 150 may be a separation type in which the supporting portions 120 of the substrate 150 and the connecting portions 130 of the substrate 150 are formed of different materials.

For example, the supporting portions 120 of the substrate 150 may be conductors, and the connecting portions 130 of the substrate 150 may be nonconductors.

Additionally, the supporting portions 120 of the substrate 150 may be formed of a hard material which is not flexible to support the respective light sources 110, and the connecting portions 130 of the substrate 150 may be formed of a soft material which is flexible, so that the substrate 150 may be applied to an object having curvature.

In the separation type substrate 150, coupling members may be provided between respective supporting portions 120 and connecting portions 130 to electrically interconnect the supporting portions 120 and connecting portions 130.

A reflective coating film or reflective coating material layer may be formed at the supporting portions 120 and the connecting portions 130 of the integration or separation type substrates 150 to reflect light generated by the light sources 110 toward the optical member 600.

The reflective coating film or reflective coating material layer may contain a metal, such as, for example, chrome (Cr), aluminum (Al), silver (Ag), gold (Au), or other metal exhibiting high reflectance or a metal oxide, such as titanium oxide (TiO2), or other material exhibiting high reflectance.

Conductive patterns to apply current to drive the light sources 110 may be provided at the supporting portions 120 and the connecting portions 130 of the substrate 150. For example, the conductive patterns may be provided on substantially the entire area of the substrate 150 including the supporting portions 120 and the connecting portions 130, or only at the supporting portions 120 of the substrate 150 supporting the light sources 110.

In certain embodiments, the conductive patterns may be provided only at the connecting portions 130 of the substrate 150 interconnecting neighboring supporting portions 120 to electrically interconnect neighboring light sources 110.

As described above, the type of connection between the supporting portions 120 and the connecting portions 130 of the substrate 150 may be varied based on a design characteristics required by an apparatus to which the light source module is mounted, to provide uniform brightness throughout.

Figure 9A:
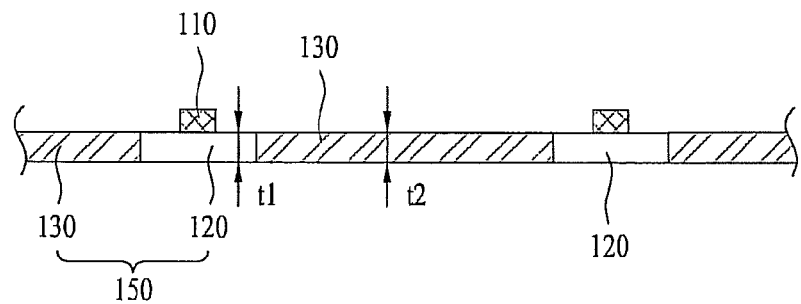
FIGS. 9A to 9C are sectional views showing thicknesses of supporting portions and connecting portions of a substrate.
Figure 9B:
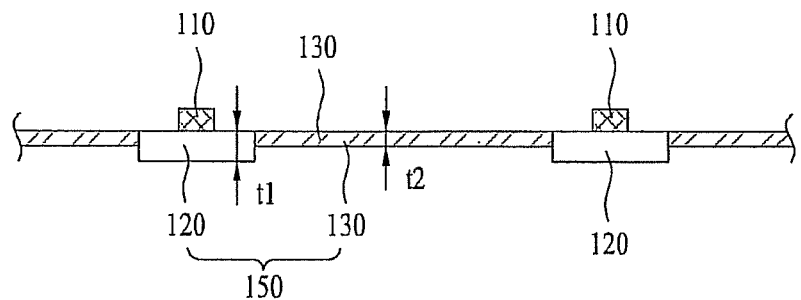
Figure 9C:
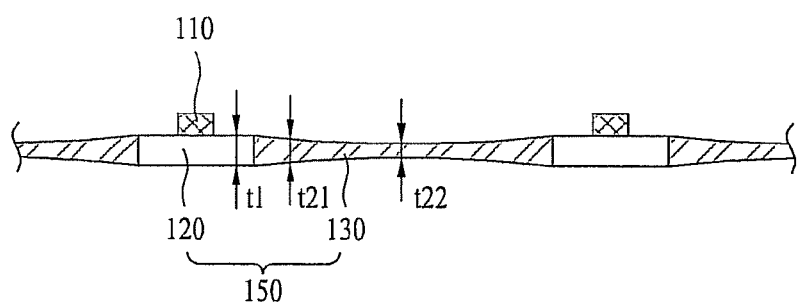

FIGS. 9A to 9C are sectional views of supporting portions and connecting portions of a substrate having varying thicknesses, in accordance with embodiments as broadly described herein.

As shown in FIGS. 9A to 9C, a light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120.

As shown in FIG. 9A, the supporting portions 120 of the substrate 150 may have a first thickness t1, the connecting portions 130 of the substrate 150 may have a second thickness t2, and the first thickness t1 and the second thickness t2 may be equal to each other.

Alternatively, as shown in FIG. 9B, the supporting portions 120 of the substrate 150 may have a first thickness t1, the connecting portions 130 of the substrate 150 may have a second thickness t2, and the first thickness t1 and the second thickness t2 may be different from each other.

In the embodiment shown in FIG. 9B, the first thickness t1 may be greater than the second thickness t2. For example, a ratio of the first thickness t1 to the second thickness t2 may be about 1.1:1 to 30:1. If the second thickness t2 is less than the first thickness t1 as shown in FIG. 9B, the substrate 150 may be easily curved.

In another embodiment, as shown in FIG. 9C, a thickness t22 of each connecting portion 130 of the substrate 150 at a portion thereof which is relatively distant from a corresponding one of the supporting portions 120 of the substrate 150 may be less than a thickness t21 of each connecting portion 130 of the substrate 150 at a portion thereof which is relatively adjacent to a corresponding one of the supporting portions 120 of the substrate 150.

That is, each connecting portion 130 of the substrate 150 may be become gradually thinner as it progresses away from a portion thereof adjacent to a corresponding one of the supporting portions 120 of the substrate 150 toward a portion thereof that is distant from a corresponding one of the supporting portions 120 of the substrate 150. The thickness of each connecting portion 130 of the substrate 150 may gradually decrease toward an intermediate portion thereof so that the substrate 150 may be easily curved.

As described above, the thicknesses of the supporting portions 120 and the connecting portions 130 of the substrate 150 may be varied based on a design characteristic required by an apparatus to which the light source module is mounted, to provide uniform brightness throughout.

Figure 10:
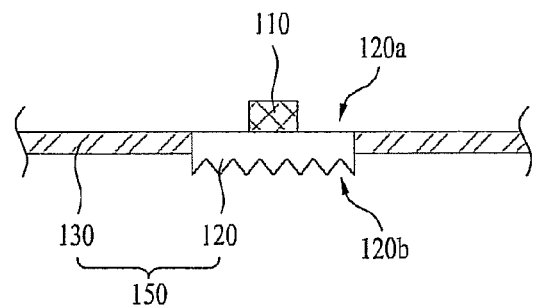
FIG. 10 is a sectional view showing the surface of a supporting portion of a substrate.

FIG. 10 is a sectional view of a supporting portion of a substrate, in accordance with an embodiment as broadly described herein.

As shown in FIG. 10, a light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. Each supporting portion 120 of the substrate 150 may include a first surface 120a facing a corresponding one of the light sources 110 mounted thereon and a second surface 120b opposite the first surface 120a. The first surface 120a may be a substantially flat surface, and the second surface 120b may have an uneven pattern formed thereon.

The first surface 120a of each supporting portion 120 is flat to reflect light generated by a corresponding one of the light sources 110 upward to improve brightness. The uneven pattern may be formed at the second surface 120b of the supporting portion 120 to facilitate dissipation of heat generated by a corresponding one of the light sources 110.

As described above, the surface of each supporting portion 120 of the substrate 150 may be varied based on a design characteristic of an apparatus to which the light source module is applied, to provide uniform brightness throughout.

Figure 11:
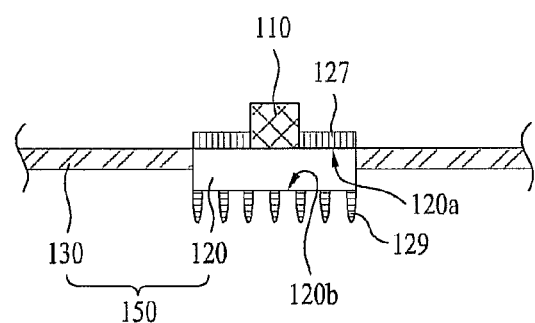
FIG. 11 is a sectional view showing a reflector and heat dissipation pins of a supporting portion of a substrate.

FIG. 11 is a sectional view showing a reflector and heat dissipation pins of a supporting portion of a substrate.

As shown in FIG. 11, a light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. Each supporting portion 120 of the substrate 150 may include a first surface 120a facing a corresponding one of the light sources 110 and a second surface 120b opposite the first surface 120a. A reflector 127 may be disposed on the first surface 120a, and a plurality of heat dissipation pins 129 may be disposed on the second surface 120b.

The reflector 127 may contain a metal, such as, for example, chrome (Cr), aluminum (Al), silver (Ag), gold (Au), or other metal exhibiting relatively high reflectance or a metal oxide, such as titanium oxide (TiO2), or other material exhibiting relatively high reflectance The heat dissipation pins 129 may be formed of a material exhibiting relatively high thermal conductivity, such as aluminum, an aluminum alloy, copper, or a copper alloy.

The reflector 127 may be formed at the first surface 120a of each supporting portion 120 to reflect light generated by the light source 110 upward to improve brightness.

The heat dissipation pins 129 may be formed at the second surface 120b of each supporting portion 120 to facilitate dissipation of heat generated by a corresponding one of the light sources 110.

As described above, the reflector 127 and the heat dissipation pins 129 of each supporting portion 120 of the substrate 150 may be varied based on a design characteristic required by an apparatus to which the light source module is applied, to provide uniform brightness throughout.

Figure 12A:
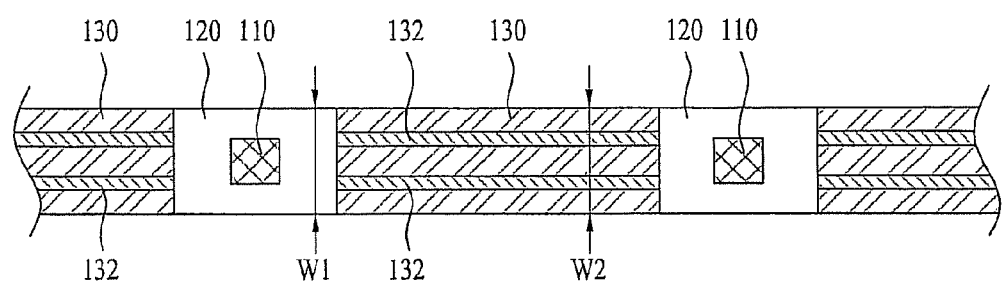
FIGS. 12A and 12B are plan views showing widths of connecting portions of a substrate.
Figure 12B:
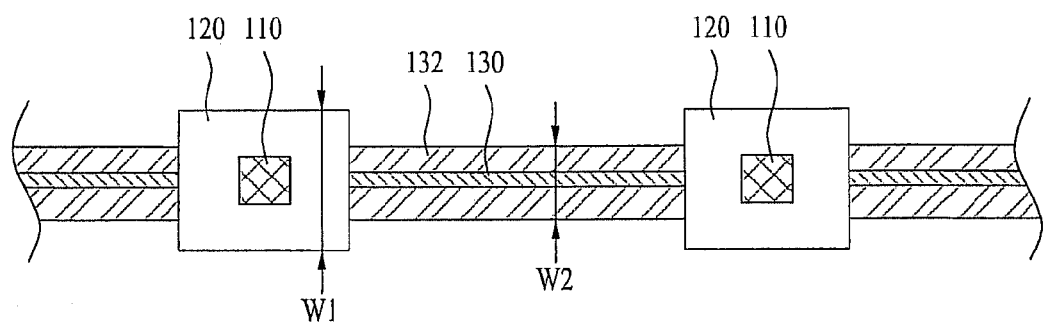

FIGS. 12A and 12B are plan views of connecting portions of a substrate, in accordance with embodiments as broadly described herein.

As shown in FIGS. 12A and 12B, a light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120.

Conductive patterns 132 to electrically interconnect neighboring light sources 110 may be disposed at each connecting portion 130 of the substrate 150.

As shown in FIG. 12A, a width W2 of each connecting portion 130 of the substrate 150 may be substantially equal to a width W1 of each supporting portion 120 of the substrate 150.

In a case in which the width W2 of each connecting portion 130 of the substrate 150 is equal to the width W1 of each supporting portion 120 of the substrate 150, it may be possible to secure a free space in which the conductive patterns 132 may be provided in various forms.

Alternatively, as shown in FIG. 12B, the width W2 of each connecting portion 130 of the substrate 150 may be less than the width W1 of each supporting portion 120 of the substrate 150. In a case in which the width W2 of each connecting portion 130 of the substrate 150 is less than the width W1 of each supporting portion 120 of the substrate 150, the substrate 150 may be easily curved so that the substrate 150 may be applied to an object having curvature.

As described above, the width of each connecting portion 130 of the substrate 150 may be varied based on a design characteristic required by an apparatus to which the light source module is applied, to provide uniform brightness throughout.

Figure 13:
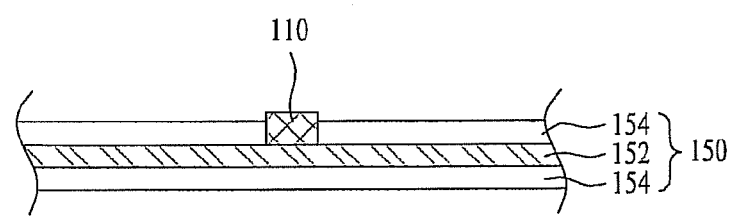
FIG. 13 is a sectional view showing a light source module according to an embodiment.

FIG. 13 is a sectional view of a light source module according to an embodiment as broadly described herein.

As shown in FIG. 13, the light source module may include a substrate 150 and at least one light source 110 arranged on the substrate 150. The substrate 150 may include a circuit pattern 152 electrically connected to the light source 110 and a film 154 exhibiting flexibility and insulating characteristics, disposed on and/or under the circuit pattern 152.

For example, the film 154 of the substrate 150 may be formed of, for example, photo solder resist (PSR), polyimide, epoxy (for example, FR-4), or a combination thereof.

In a case in which the films 154 of the substrate 150 are disposed above and below the circuit pattern 152 as shown in FIG. 13, the film disposed on one side of (above) the circuit pattern 152 may be different from that disposed on the other side of (below) the circuit pattern 152.

In another embodiment, the substrate 150 of the light source module may be a printed circuit board (PCB) made of, for example, polyethylene terephthalate (PET), glass, polycarbonate (PC), silicon (Si), polyimide, and epoxy. As an example, a single layer PCB, multi layer PCB, ceramic substrate, or metal core PCB may be selectively used as the substrate 150 of the light source module.

The light source 110 of the light source module may be a top view type light emitting diode. In certain embodiments, the light source 110 of the light source module may be a side view type light emitting diode.

The light source 110 of the light source module may be a light emitting diode (LED) chip. The LED chip may be a red LED chip, blue LED chip, or ultraviolet LED chip. Alternatively, the LED chip may be at least one of a red LED chip, green LED chip, blue LED chip, yellow LED chip, white LED chip, or a combination thereof.

For example, in a case in which a lamp unit is applied to a taillight of a vehicle, as shown in FIG. 34, the light source 110 of the light source module may be a vertical light emitting chip, such as a red lighting emitting chip. However, embodiments are not limited thereto.

Figure 14:
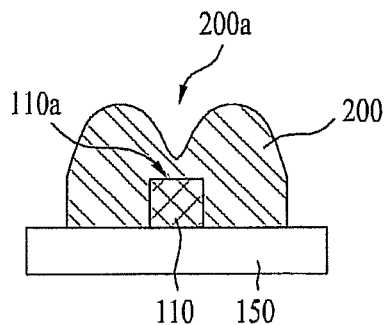
FIG. 14 is a sectional view showing a lens of the light source module.

FIG. 14 is a sectional view of a lens of the light source module, in accordance with embodiments as broadly described herein.

As shown in FIG. 14, the light source module may include a substrate 150 having an electrode pattern and a light source 110 arranged on the substrate 150. The light source 110 of the light source module may include a lens 200. The lens 200 may include a groove 200a provided at a position corresponding to a central area of a light emission surface 110a of the light source 110. The groove 200a may be formed in, for example, a conical or trapezoidal cross section having a wide top and a narrow bottom to widen an orientation angle of light emitted by the light source 110. However, embodiments are not limited thereto, and various types of lenses may be used.

Figure 15A:
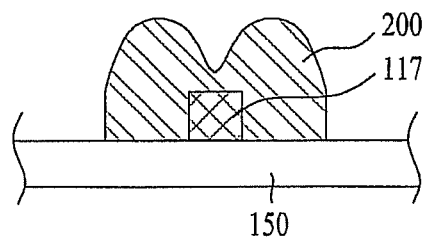
FIGS. 15A to 15C are sectional views showing types of the lens applied to the light source module.
Figure 15B:
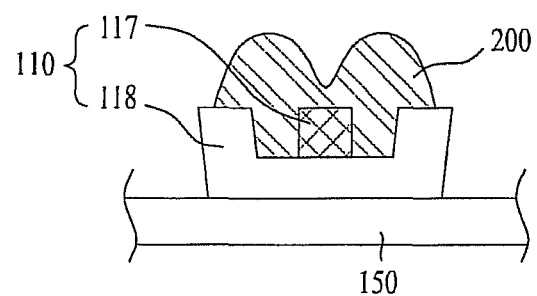
Figure 15C:
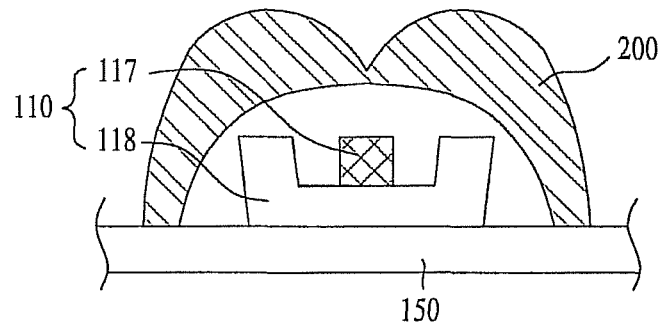

FIGS. 15A to 15C are sectional views of various lenses applied to the light source module, in accordance with embodiments as broadly described herein.

As shown in FIGS. 15A to 15C, the light source module may include a substrate 150, a light source 110, and a lens 200. The light source 110 may be an LED chip, as shown in FIG. 15A, or an LED package in which an LED chip 117 is disposed in a package body 118, as shown in FIGS. 15B and 15C. The lens 200 may cover the light source 110. Lenses 200 having various structures may be applied depending upon the type of light source 110.

For example, in a case in which the light source 110 is an LED chip 117 disposed on the substrate 150, as shown in FIG. 15A, the lens 200 may be disposed on the substrate 150 to cover the LED chip 117.

In a case in which the light source 110 is an LED chip 117 disposed in a package body 118, as shown in FIG. 15B, the lens 200 may be disposed on the package body 118 to cover the LED chip 117.

In a case in which the light source 110 is an LED package in which the LED chip 117 is disposed in the package body 118, as shown in FIG. 15C, the lens 200 may be disposed on the substrate 150 to cover the entirety of the package body 118 including the LED chip 117. The lens 200 may cover the LED package while being spaced apart from the package body 118 by a predetermined distance.

Figure 16:
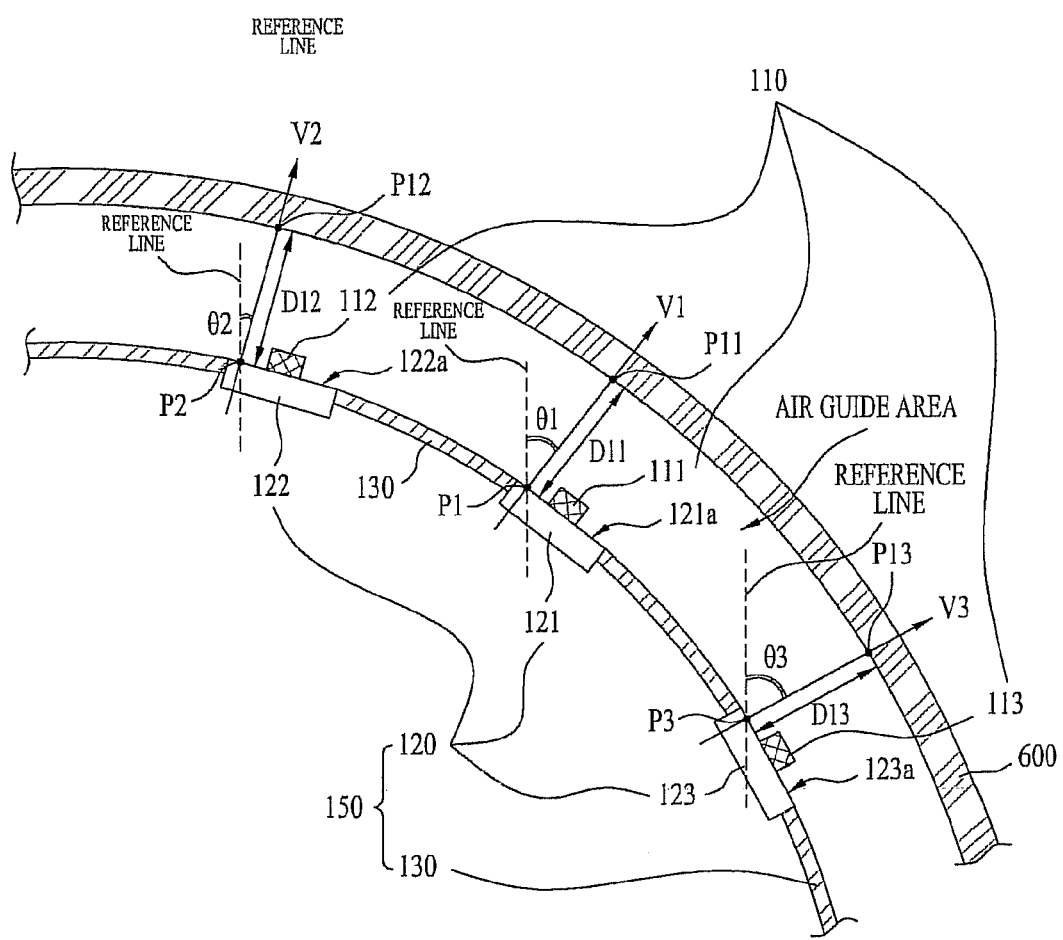
FIG. 16 is a sectional view showing arrangement of a light source module according to a fourth embodiment.

FIG. 16 is a sectional view t of a light source module according to a fourth embodiment.

As shown in FIG. 16, an optical member 600 may be spaced apart from a substrate 150 by a predetermined distance. A light mixing area, or air guide area, may be formed between the substrate 150 and the optical member 600. The light source module may include the substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. The supporting portions 120 may include a first supporting portion 121, second supporting portion 122, and third supporting portion 123. The second supporting portion 122 may be disposed at one side of the first supporting portion 121. The third supporting portion 123 may be disposed at the other side of the first supporting portion 121. The light sources 110 may include a first light source 111 supported by the first supporting portion 121, a second light source 112 supported by the second supporting portion 122, and a third light source 113 supported by the third supporting portion 123.

The first supporting portion 121 may be disposed such that a first perpendicular line V1 passing through a first point P1 of a surface 121a of the first supporting portion 121 facing the first light source 111 is at a first angle θ1 with respect to a reference line facing a predetermined reference direction. The predetermined reference direction may be a direction in which the amount or intensity of light generated from the light sources 110 is measured. The second supporting portion 122 may be disposed such that a second perpendicular line V2 passing through a second point P2 of a surface 122a of the second supporting portion 122 facing the second light source 112 is at a second angle θ2 with respect to the reference line. The third supporting portion 123 may be disposed such that a third perpendicular line V3 passing through a third point P3 of a surface 123a of the third supporting portion 123 facing the third light source 113 is at a third angle θ3 with respect to the reference line.

When the first perpendicular line V1 passing through the first point P1 of the surface 121a of the first supporting portion 121 facing the first light source 111 passes through a point P11 of the optical member 600, the second perpendicular line V2 passing through the second point P2 of the surface 122a of the second supporting portion 122 facing the second light source 112 passes through a point P12 of the optical member 600, and the third perpendicular line V3 passing through the third point P3 of the surface 123a of the third supporting portion 123 facing the third light source 113 passes through a point P13 of the optical member 600, a distance D11 between the point P11 of the optical member 600 and the surface 121a of the first supporting portion 121, a distance D12 between the point P12 of the optical member 600 and the surface 122a of the second supporting portion 122, and a distance D13 between the point P13 of the optical member 600 and the surface 123a of the third supporting portion 123 may be equal to one another.

In certain embodiments, at least one of the distance D11, the distance D12, and the distance D13 may be different from the others. The distance D11, the distance D12, and the distance D13 may be greater than or equal to about 10 mm.

For example, the distance D11, the distance D12, and the distance D13 may be about 10 mm to 50 cm.

If the distance between the surface of each supporting portion 120 and a corresponding point of the optical member 600 is less than about 10 mm, a lamp unit may not exhibit uniform brightness, and a hot spot phenomenon having a concentrated area of high brightness where each light source 110 is located may occur.

On the other hand, if the distance between the surface of each supporting portion 120 and a corresponding point of the optical member 600 is greater than about 50 cm, the brightness of the lamp unit may be relatively low, and therefore, the lamp unit may not provide the desired utility.

As described above, the supporting portions 120 of the substrate 150 may be disposed at predetermined angles with respect to the reference line facing the predetermined reference direction. The predetermined reference direction may be a direction in which the amount or intensity of light generated from the light sources 110 is measured. In a case in which a predetermined condition, such as the amount or intensity of light emitted in a specific direction, is required by an apparatus to which the lamp unit is applied, the light source module may be arranged to satisfy the required condition.

For example, in a case in which the lamp unit is applied to a taillight of a vehicle, certain safety standards may apply. For example, when viewed at a horizontal angle of an outer axle of the vehicle of 45 degrees from the central point of light, a projected area may be greater than or equal to about 12.5 cm2, and, for example, the brightness of a braking lamp may be about 40 to 420 candela (cd).

Consequently, substantially the entire light source module may be designed based on the predetermined reference direction, and therefore, the supporting portions 120 of the substrate 150 may be disposed at predetermined angles with respect to the reference line facing the predetermined reference direction.

Figure 17:
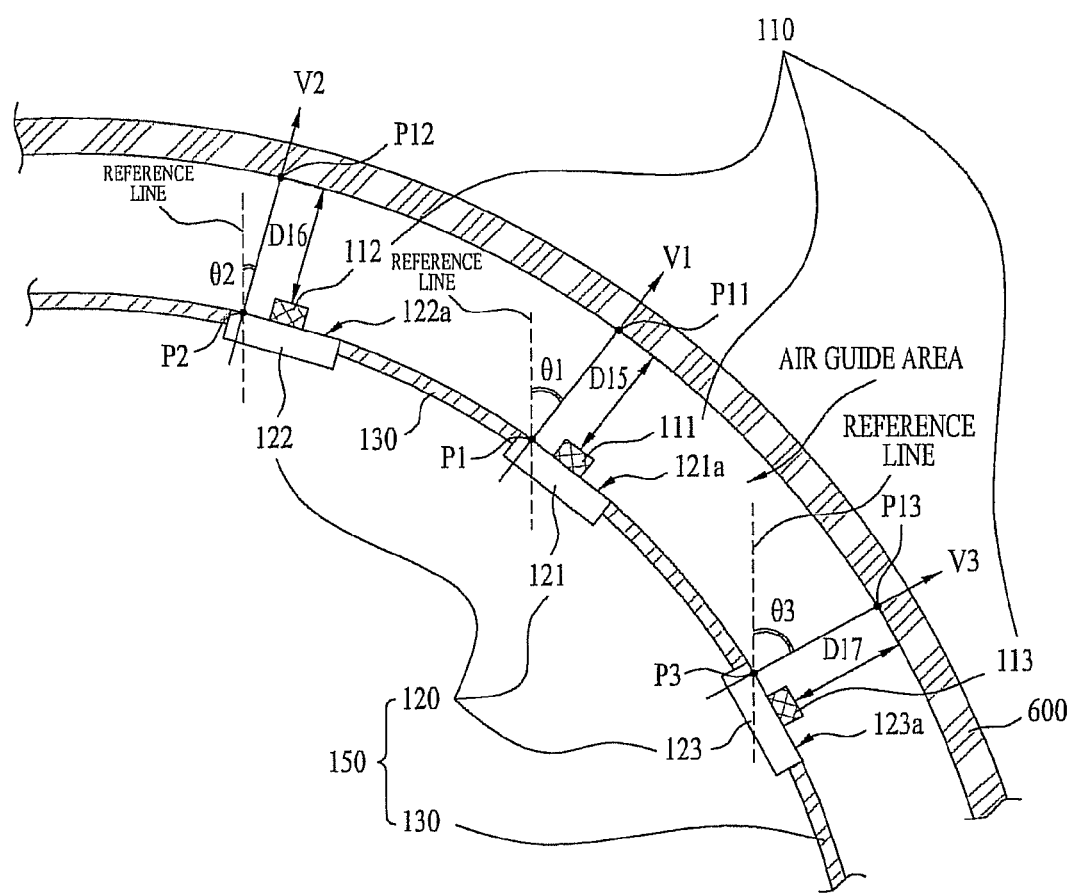
FIG. 17 is a sectional view showing arrangement of a light source module according to a fifth embodiment.

FIG. 17 is a sectional view of a light source module according to a fifth embodiment.

As shown in FIG. 17, an optical member 600 may be spaced apart from a substrate 150 by a predetermined distance. A light mixing area, or air guide area, may be formed between the substrate 150 and the optical member 600.

The light source module may include the substrate 150 and a plurality of light sources 110 arranged on the substrate 150. The light sources 110 may include a first light source 111, second light source 112, and third light source 113. The first light source 111 may be supported by a first supporting portion 121. The second light source 112 may be supported by a second supporting portion 122. The third light source 113 may be supported by a third supporting portion 123. The light sources 110 may be spaced apart from the optical member 600 by a predetermined distance. In certain embodiments, the light sources 110 may be spaced apart from the optical member 600 by the same distance.

For example, when the surface of the first light source 111 is opposite the surface of the optical member 600, the surface of the first light source 111 may be spaced apart from the surface of the optical member 600 by a distance D15. When the surface of the second light source 112 is opposite the surface of the optical member 600, the surface of the second light source 112 may be spaced apart from the surface of the optical member 600 by a distance D16. When the surface of the third light source 113 is opposite the surface of the optical member 600, the surface of the third light source 113 may be spaced apart from the surface of the optical member 600 by a distance D17. The distance D15, the distance D16, and the distance D17 may be equal to one another to provide uniform brightness throughout. In alternative embodiments, at least one of the distance D15, the distance D16, or the distance D17 may be different from the others.

Figure 18:
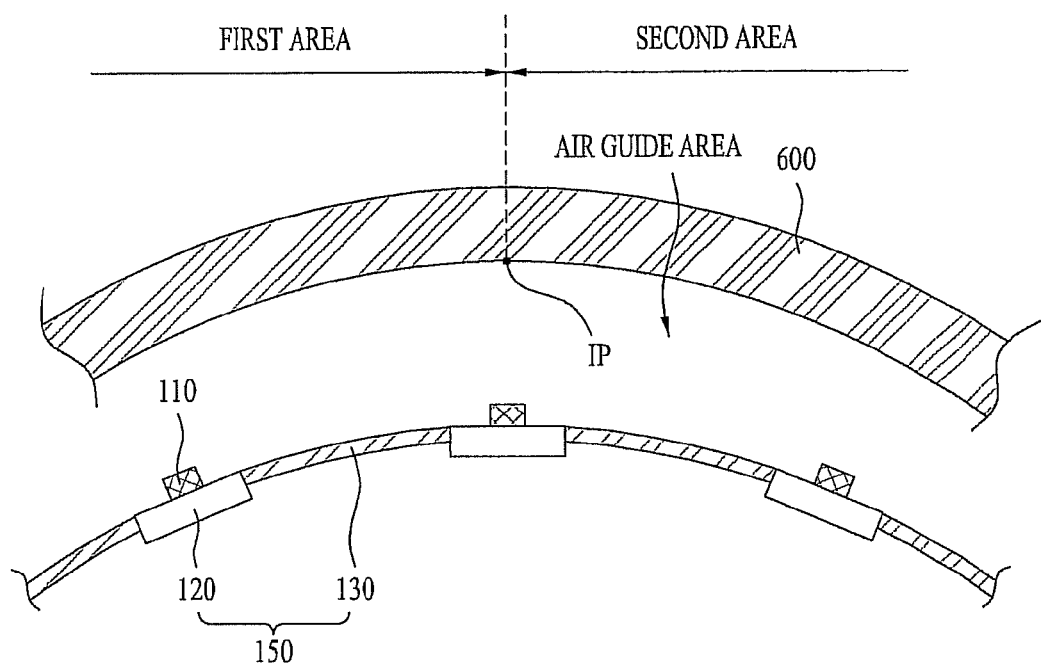
FIG. 18 is a sectional view showing the shape of an optical member.

FIG. 18 is a sectional view of an optical member.

As shown in FIG. 18, an optical member 600 may be spaced apart from a substrate 150 by a predetermined distance. A light mixing area, or air guide area, may be formed between the substrate 150 and the optical member 600. A light source module may include the substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120.

The optical member 600 may function as a cover member.

The optical member 600 may include at least two inclined surfaces having at least one inflection point IP. For example, the optical member 600 may be divided into a first area and second area based on the inflection point IP. The inclined surface of the first area of the optical member 600 may have a first radius of curvature, and the inclined surface of the second area of the optical member 600 may have a second radius of curvature. The first radius of curvature may be different from the second radius of curvature.

In certain embodiments, the optical member 600 may have a plurality of inflection points IP, and the inclined surfaces adjacent to each other on opposite sides of the inflection points IP may have different radii of curvature.

The optical member 600 may also include at least one of a diffusion sheet that diffuses light emitted from the light sources 110, a prism sheet that guides the diffused light to a light emission area, and/or a brightness enhancement sheet that enhances brightness.

For example, the diffusion sheet may be formed of an acryl resin, however, the diffusion sheet is not so limited. In addition, the diffusion sheet may be formed of a material having a light diffusion function, for example, high-transmissive plastic, such as polystyrene (PS), polymethyl methacrylate (PMMA), cyclic olefin copolymer (COC), polyethylene terephthalate (PET), or resin.

The optical member 600 may also have an uneven pattern formed on one or more surfaces thereof. The optical member 600 is provided to diffuse light emitted from the light source module to improve a diffusion effect of the optical member 600.

The optical member 600 may include a plurality of layers. The uneven pattern may be formed on a surface of the uppermost layer, or on a specific one of the layers.

The uneven pattern may have a stripe shape arranged in one direction.

The uneven pattern may have protrusions formed at the surface of the optical member 600. Each protrusion may include a first surface and second surface opposite to each other. The angle between the first surface and second surface may be an obtuse angle or acute angle.

In certain embodiments, the uneven pattern may have grooves formed at the surface of the optical member 600. Each groove may include a third surface and fourth surface opposite to each other. The angle between the third surface and fourth surface may be an obtuse angle or an acute angle.

FIGS. 19A to 19D are sectional views of exemplary patterns formed on the optical member.

As shown in FIGS. 19A to 19D, a pattern 610 may be formed on a surface of the optical member 600 to improve diffusion of light emitted by the light source module.

Figure 19A:
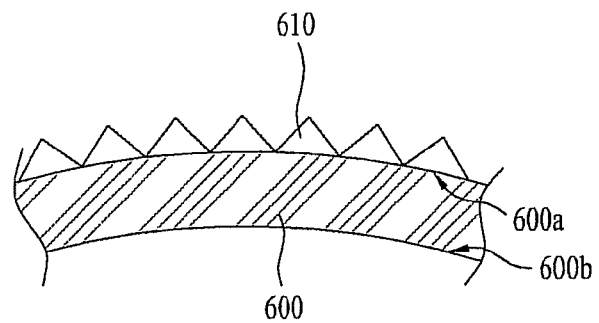
FIGS. 19A to 19D are sectional views showing uneven patterns of the optical member.

As shown in FIG. 19A, the pattern 610 of the optical member 600 may be provided on an upper (exterior facing) surface 600a of the optical member 600. The upper surface 600a of the optical member 600 may be positioned opposite a cover member. In a case in which the optical member 600 includes a plurality of layers, the pattern 610 may be provided on the surface of the uppermost layer.

Figure 19B:
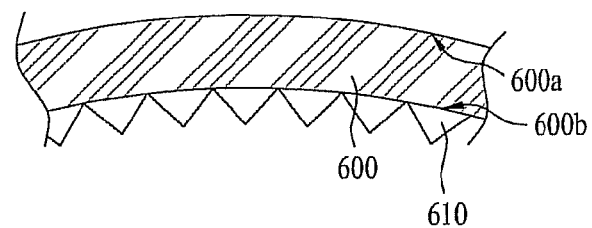

As shown in FIG. 19B, the uneven pattern 610 of the optical member 600 may be provided on a lower (interior facing) surface 600b of the optical member 600. The lower surface 600b of the optical member 600 may be positioned opposite a light source module. In a case in which the optical member 600 includes a plurality of layers, the pattern 610 may be disposed on the surface of the lowermost layer.

Figure 19C:
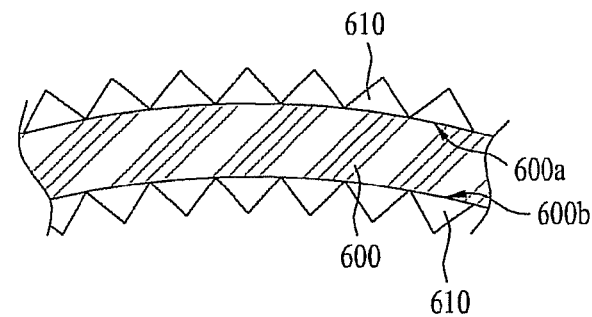

As shown in FIG. 19C, the patterns 610 of the optical member 600 may be disposed on the upper surface 600a of the optical member 600 and the lower surface 600b of the optical member 600. In a case in which the optical member 600 includes a plurality of layers, the patterns 610 may be disposed on the surface of the uppermost layer and the surface of the lowermost layer.

Figure 19D:
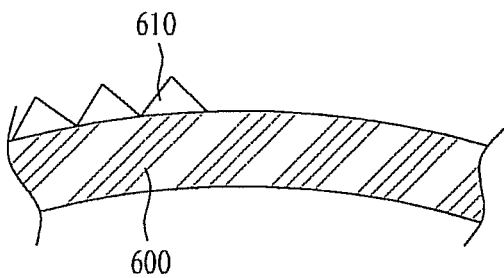

As shown in FIG. 19D, the pattern 610 of the optical member 600 may be disposed on a portion of the upper surface 600a of the optical member 600 or a portion of the lower surface 600b of the optical member 600.

The pattern 610 may include protrusions formed at the surface of the optical member 600 that form an uneven surface or contour on the optical member 600. Each protrusion may include a first surface and second surface opposite to each other. The angle between the first surface and second surface may be an obtuse angle or acute angle.

In certain embodiments, the uneven pattern may have grooves formed at the surface of the optical member 600. Each groove may include a third surface and fourth surface opposite to each other. The angle between the third surface and fourth surface may be an obtuse angle or an acute angle. In alternative embodiments, the pattern 610 may be formed by a combination of the shapes described above.

As described above, the pattern 610 of the optical member 600 may be varied based on a design characteristic required by an apparatus to which the light source module is applied, to provide uniform brightness throughout. The pattern 610 may form a substantially uniform pattern of protrusions and grooves, or an irregular pattern of protrusions and grooves, as appropriate for a particular application.

Figure 20:
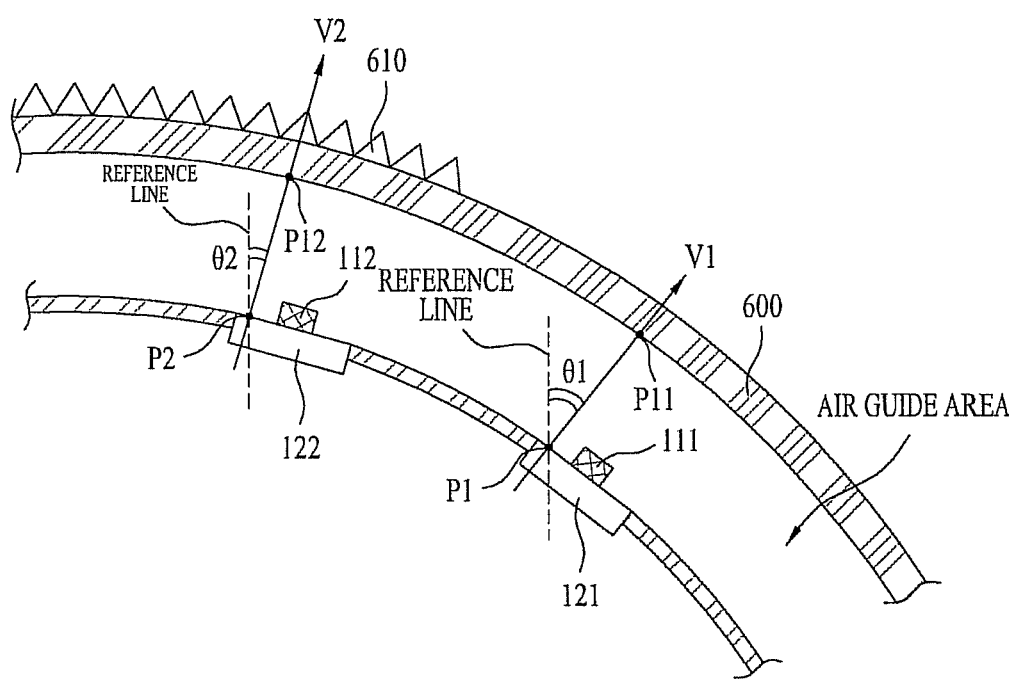
FIG. 20 is a sectional view showing the position of the uneven pattern of the optical member.

FIG. 20 is a sectional view showing the position of the pattern on the optical member.

As shown in FIG. 20, the pattern 610 of the optical member 600 may be disposed on a portion of the upper surface 600a of the optical member 600 or, alternatively or additionally, on a portion of the lower surface 600b of the optical member 600. The pattern 610 of the optical member 600 may be disposed on the surface of the optical member 600 corresponding to the supporting portions having an angle between a perpendicular line passing through a point on the surface of each supporting portion facing a corresponding one of the light sources and a reference line facing a predetermined reference direction of 0 to 45 degrees.

The pattern 610 of the optical member 600 is not typically provided on the surface of the optical member 600 corresponding to the supporting portions having an angle between a perpendicular line passing through a point on the surface of each supporting portion facing a corresponding one of the light sources and the reference line facing the predetermined reference direction of 45.1 to 90 degrees.

As described above, the pattern 610 of the optical member 600 may be disposed only on the surface of the optical member 600 corresponding to the supporting portions having an angle between a perpendicular line passing through a point on the surface of each supporting portion facing a corresponding one of the light sources and a reference line facing a predetermined reference direction of 0 to 45 degrees to provide uniform brightness in the predetermined reference direction in which the amount or intensity of light generated from the light sources 110 is measured.

For example, when a first supporting portion 121 is disposed such that a first perpendicular line V1 passing through a first point P1 of a surface 121a of the first supporting portion 121 facing a first light source 111 is at a first angle $\theta 1$ with respect to a reference line facing a predetermined reference direction, and a second supporting portion 122 is disposed such that a second perpendicular line V2 passing through a second point P2 of a surface 122a of the second supporting portion 122 facing a second light source 112 is at a second angle $\theta 2$ with respect to the reference line, if the second angle $\theta 2$ is less than the first angle $\theta 1$, the uneven pattern 610 of the optical member 600 may be disposed so as to correspond to the second supporting portion 122.

As described above, the position of the uneven pattern 610 of the optical member 600 may be varied based on a design requirement of an apparatus to which the light source module is applied, to provide uniform brightness throughout.

Figure 21A:
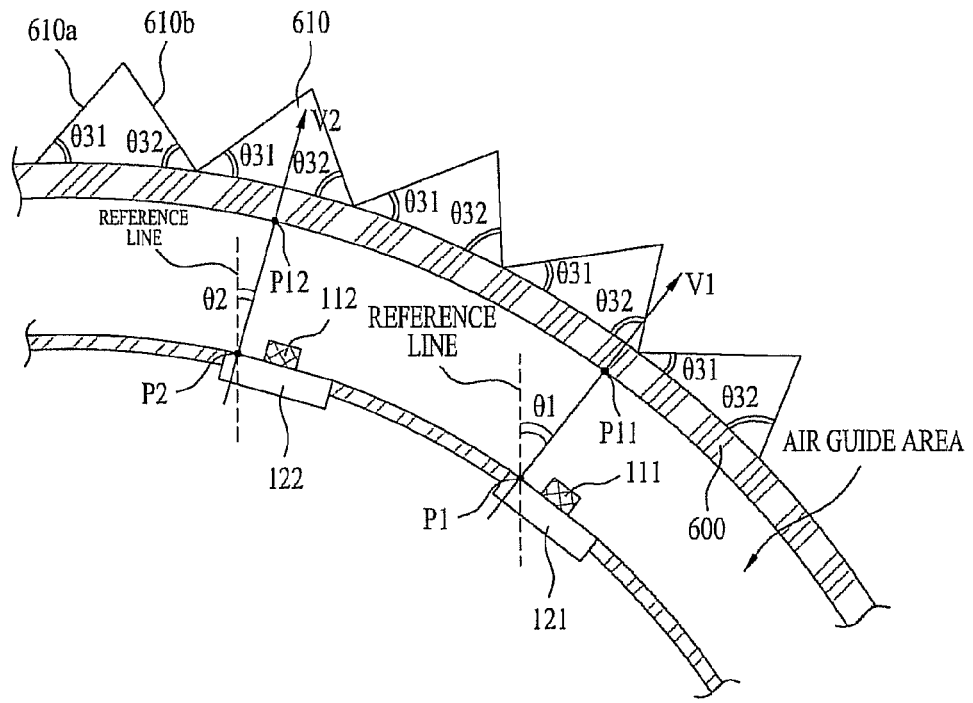
FIGS. 21A and 21B are sectional views showing the change in shape of the uneven pattern of the optical member depending upon the position thereof.
Figure 21B:
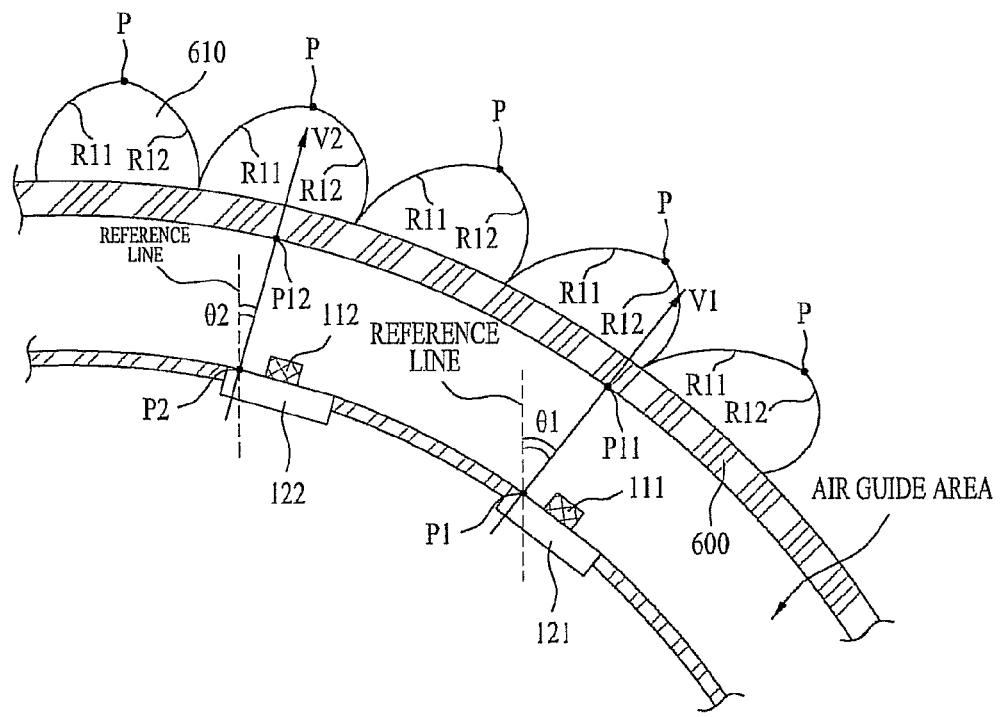

FIGS. 21A and 21B are sectional views of patterns provided on the optical member depending upon a position thereof.

As shown in FIGS. 21A and 21B, the pattern 610 of the optical member 600 may be disposed on the upper surface 600a of the optical member 600 or, alternatively, on the lower surface 600b of the optical member 600. The pattern 610 may be formed by protrusions on the surface of the optical member 600. Each protrusion may be formed in, for example, a triangular cross-sectional shape as shown in FIG. 21A or a semicircular cross-sectional shape as shown in FIG. 21B, or other cross-sectional shape as appropriate.

In certain embodiments, the pattern 610 of the optical member 600 may have grooves formed at the surface of the optical member 600. Each groove may be formed in, for example, a triangular shape or a semicircular cross-sectional shape, or other cross-sectional shape as appropriate.

For example, in a case in which the shape of the pattern 610 is triangular, as shown in FIG. 21A, the pattern 610 may include a first surface 610a and second surface 610b opposite each other.

An angle $\theta 31$ between the first surface 610a of the pattern 610 and the surface of the optical member 600 may be equal to or different from an angle θ32 between the second surface 610b of the uneven pattern 610 and the surface of the optical member 600.

For example, the greater an angle between a perpendicular line passing through a point on the surface of each supporting portion facing a corresponding one of the light sources and a reference line facing a predetermined reference direction is, the less the angle θ31 between the first surface 610a of the uneven pattern 610 and the surface of the optical member 600 may be.

On the other hand, the greater an angle between a perpendicular line passing through a point on the surface of each supporting portion facing a corresponding one of the light sources and the reference line facing the predetermined reference direction is, the greater the angle θ32 between the second surface 610b of the uneven pattern 610 and the surface of the optical member 600 may be.

As described above, the greater an angle between a perpendicular line passing through a point on the surface of each supporting portion facing a corresponding one of the light sources and the reference line facing the predetermined reference direction is, the less the angle θ31 between the first surface 610a of the uneven pattern 610 and the surface of the optical member 600 is, whereas the greater the angle θ32 between the second surface 610b of the uneven pattern 610 and the surface of the optical member 600 is, to provide uniform brightness in the predetermined reference direction in which the amount or intensity of light generated from the light sources 110 is measured.

For example, when a first supporting portion 121 is disposed such that a first perpendicular line V1 passing through a first point P1 of a surface 121a of the first supporting portion 121 facing a first light source 111 is at a first angle θ1 to a reference line facing a predetermined reference direction, and a second supporting portion 122 is disposed such that a second perpendicular line V2 passing through a second point P2 of a surface 122a of the second supporting portion 122 facing a second light source 112 is at a second angle θ2 to the reference line, if the second angle θ2 is less than the first angle θ1, the angle θ31 of the uneven pattern 610 corresponding to the first supporting portion 121 may be less than the angle θ31 of the uneven pattern 610 corresponding to the second supporting portion 122, and the angle θ32 of the pattern 610 corresponding to the first supporting portion 121 may be greater than the angle θ32 of the pattern 610 corresponding to the second supporting portion 122.

Also, in a case in which the cross-sectional shape of the pattern 610 is semicircular, as shown in FIG. 21B, the pattern 610 may include an inclined surface having a radius of curvature R11 and an inclined surface having a radius of curvature R12 disposed at opposite sides of each inflection point.

The radius of curvature R11 may be equal to or different from the radius of curvature R12 of the pattern 610.

For example, the greater an angle between a perpendicular line passing through a point on the surface of each supporting portion facing a corresponding one of the light sources and a reference line facing a predetermined reference direction is, the greater the radius of curvature R11 of the inclined surface of the pattern 610 may be.

On the other hand, the greater an angle between a perpendicular line passing through a point on the surface of each supporting portion facing a corresponding one of the light sources and the reference line facing the predetermined reference direction is, the less the radius of curvature R12 of the inclined surface of the pattern 610 may be.

As described above, the greater an angle between a perpendicular line passing through a point on the surface of each supporting portion facing a corresponding one of the light sources and a reference line facing a predetermined reference direction is, the greater the radius of curvature R11 of the inclined surface of the pattern 610 is, whereas the less the radius of curvature R12 of the inclined surface of the pattern 610 is, to provide uniform brightness in the predetermined reference direction in which the amount or intensity of light generated from the light sources 110 is measured.

For example, when the first supporting portion 121 is disposed such that a first perpendicular line V1 passing through a first point P1 of a surface 121a of the first supporting portion 121 facing the first light source 111 is at a first angle θ1 to a reference line facing a predetermined reference direction, and the second supporting portion 122 is disposed such that a second perpendicular line V2 passing through a second point P2 of a surface 122a of the second supporting portion 122 facing the second light source 112 is at a second angle θ2 to the reference line, if the second angle θ2 is less than the first angle θ1, the radius of curvature R11 of the inclined surface corresponding to the first supporting portion 121 may be greater than the radius of curvature R11 of the inclined surface corresponding to the second supporting portion 122, and the radius of curvature R12 of the inclined surface corresponding to the first supporting portion 121 may be less than the radius of curvature R12 of the inclined surface corresponding to the second supporting portion 122.

As described above, the shape of the pattern 610 of the optical member 600 may be varied based on a design requirement of an apparatus to which the light source module is applied, to provide uniform brightness throughout.

Figure 22A:
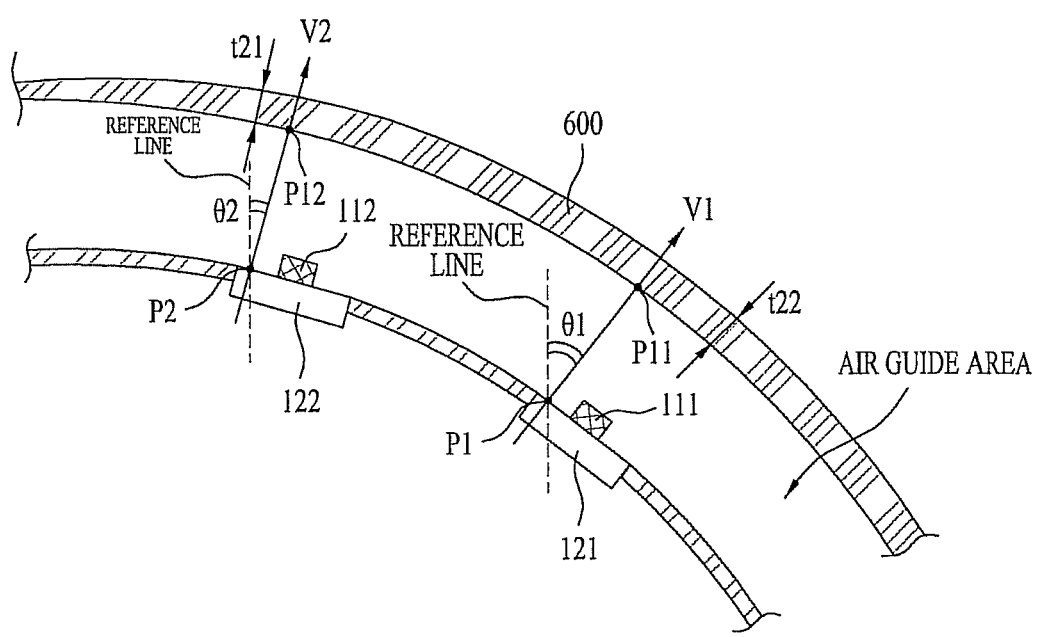
FIGS. 22A and 22B are sectional views showing thicknesses of an optical member.
Figure 22B:
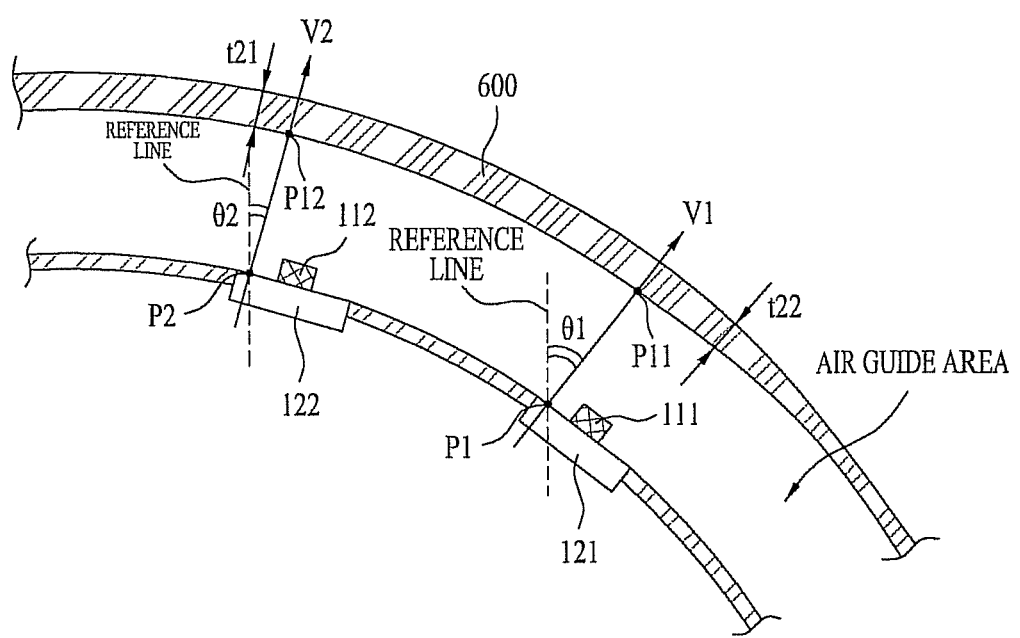

FIGS. 22A and 22B are sectional views of an optical member, in accordance with embodiments as broadly described herein.

As shown in FIGS. 22A and 22B, an optical member 600 may be spaced apart from a substrate 150 by a predetermined distance. A light mixing area, or air guide area, may be formed between the substrate 150 and the optical member 600. A light source module may include the substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120.

As shown in FIG. 22A, a thickness t21 of an area of the optical member 600 corresponding to the supporting portions having an angle between a perpendicular line passing through a point on the surface of each supporting portion facing a corresponding one of the light sources and a reference line facing a predetermined reference direction of 0 to 45 degrees may be less than a thickness t22 of an area of the optical member 600 corresponding to the supporting portions having an angle between a perpendicular line passing through a point on the surface of each supporting portion facing a corresponding one of the light sources and the reference line facing the predetermined reference direction of 45.1 to 90 degrees.

As described above, the thickness of the optical member 600 is changed to provide a larger amount of light in the predetermined reference direction in which the amount or intensity of light generated from the light sources 110 is measured.

For example, when a first supporting portion 121 is disposed such that a first perpendicular line V1 passing through a first point P1 of a surface 121a of the first supporting portion 121 facing a first light source 111 is at a first angle θ1 with respect to a reference line facing a predetermined reference direction, and a second supporting portion 122 is disposed such that a second perpendicular line V2 passing through a second point P2 of a surface 122a of the second supporting portion 122 facing a second light source 112 is at a second angle θ2 with respect to the reference line, if the second angle θ2 is less than the first angle θ1, the thickness t21 of the optical member 600 corresponding to the second supporting portion 122 may be less than the thickness t22 of the optical member 600 corresponding to the first supporting portion 121.

In certain embodiments, as shown in FIG. 22B, the thickness t21 of an area of the optical member 600 corresponding to the supporting portions having an angle between a perpendicular line passing through a point on the surface of each supporting portion facing a corresponding one of the light sources and the reference line facing the predetermined reference direction of 0 to 45 degrees may be greater than the thickness t22 of an area of the optical member 600 corresponding to the supporting portions having an angle between a perpendicular line passing through a point on the surface of each supporting portion facing a corresponding one of the light sources and the reference line facing the predetermined reference direction of 45.1 to 90 degrees.

For example, when the first supporting portion 121 is disposed such that a first perpendicular line V1 passing through a first point P1 of a surface 121a of the first supporting portion 121 facing a first light source 111 is at a first angle θ1 with respect to a reference line facing a predetermined reference direction, and the second supporting portion 122 is disposed such that a second perpendicular line V2 passing through a second point P2 of a surface 122a of the second supporting portion 122 facing a second light source 112 is at a second angle θ2 with respect to the reference line, if the second angle θ2 is less than the first angle θ1, the thickness t21 of the optical member 600 corresponding to the second supporting portion 122 may be greater than the thickness t22 of the optical member 600 corresponding to the first supporting portion 121.

As described above, the thickness of the optical member 600 may be varied based on a design requirement of an apparatus to which the light source module is applied, to provide uniform brightness throughout and to increase the amount of light in the predetermined reference direction.

Figure 23:
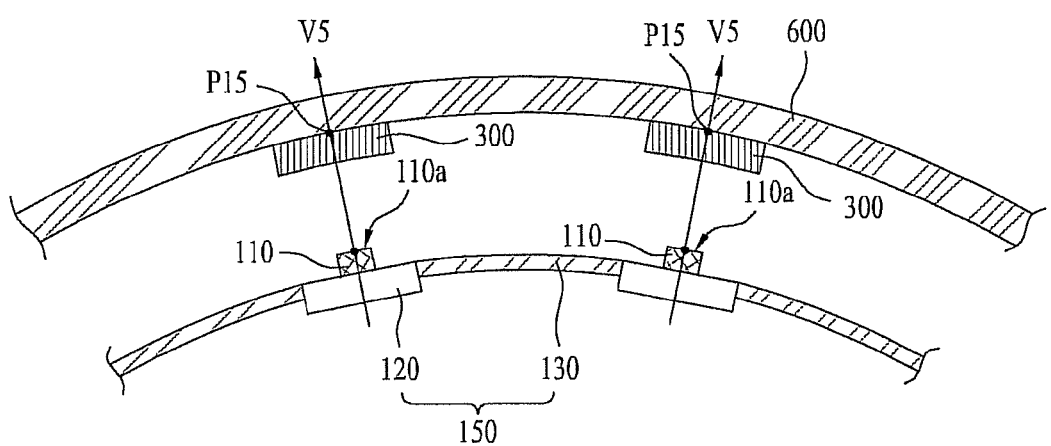
FIG. 23 is a sectional view showing reflectors of the optical member.

FIG. 23 is a sectional view of the optical member including reflectors.

As shown in FIG. 23, the optical member 600 may be spaced apart from a substrate 150 by a predetermined distance. A light mixing area, or air guide area, may be formed between the substrate 150 and the optical member 600. A light source module may include the substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120.

When a perpendicular line V5 passing through a point of a light emission surface 110a of each light source 110 passes through a point P15 of the optical member 600, a reflector 300 may be disposed on the point P15 of the optical member 600.

The reflector 300 may be formed at an area of the optical member 600 corresponding to the light emission surface 110a of each light source 110 because of a hot spot phenomenon having high brightness at the area at which each light source 110 is located that may occur.

The reflector 300 of the optical member 600 may contain a metal, such as, for example, chrome (Cr), aluminum (Al), silver (Ag), gold (Au), or other metal exhibiting high reflectance or a metal oxide, such as titanium oxide (TiO2), or other material exhibiting high reflectance.

As described above, the reflector of the optical member 600 may be varied based on a design requirement of an apparatus to which the light source module is applied, to provide uniform brightness throughout.

Figure 24A:
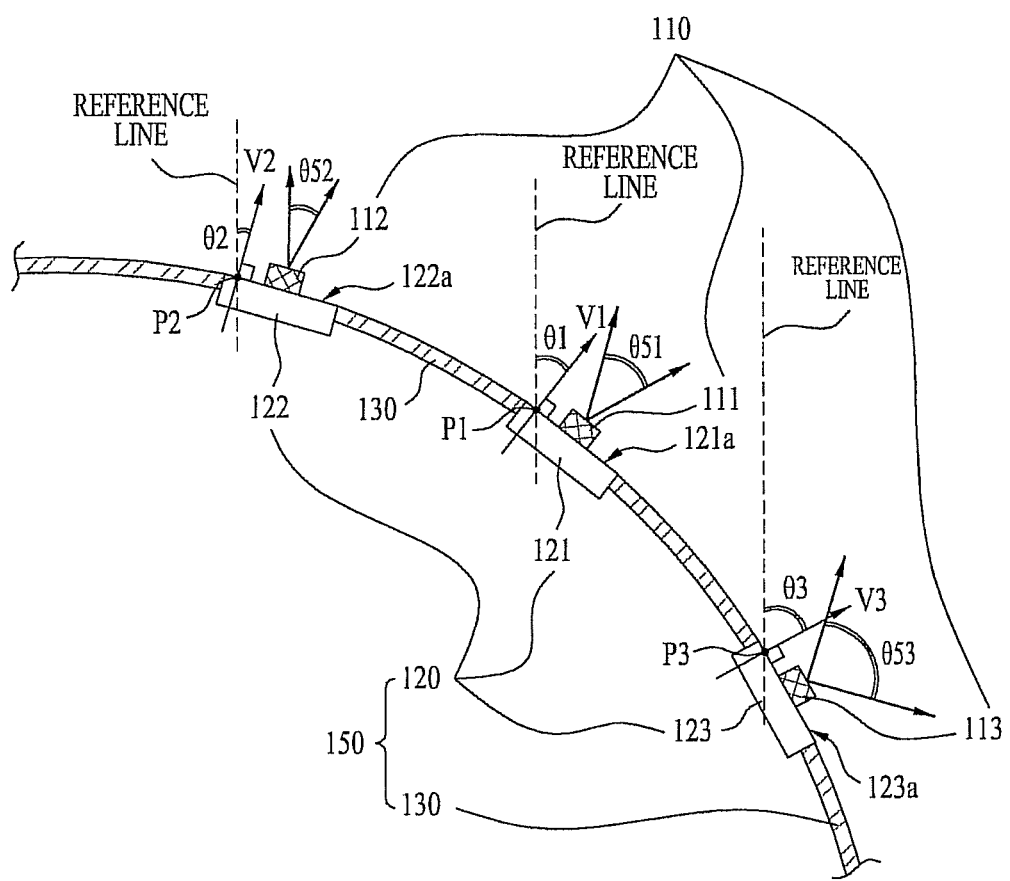
FIGS. 24A and 24B are sectional views showing arrangement of a light source module according to a sixth embodiment.
Figure 24B:
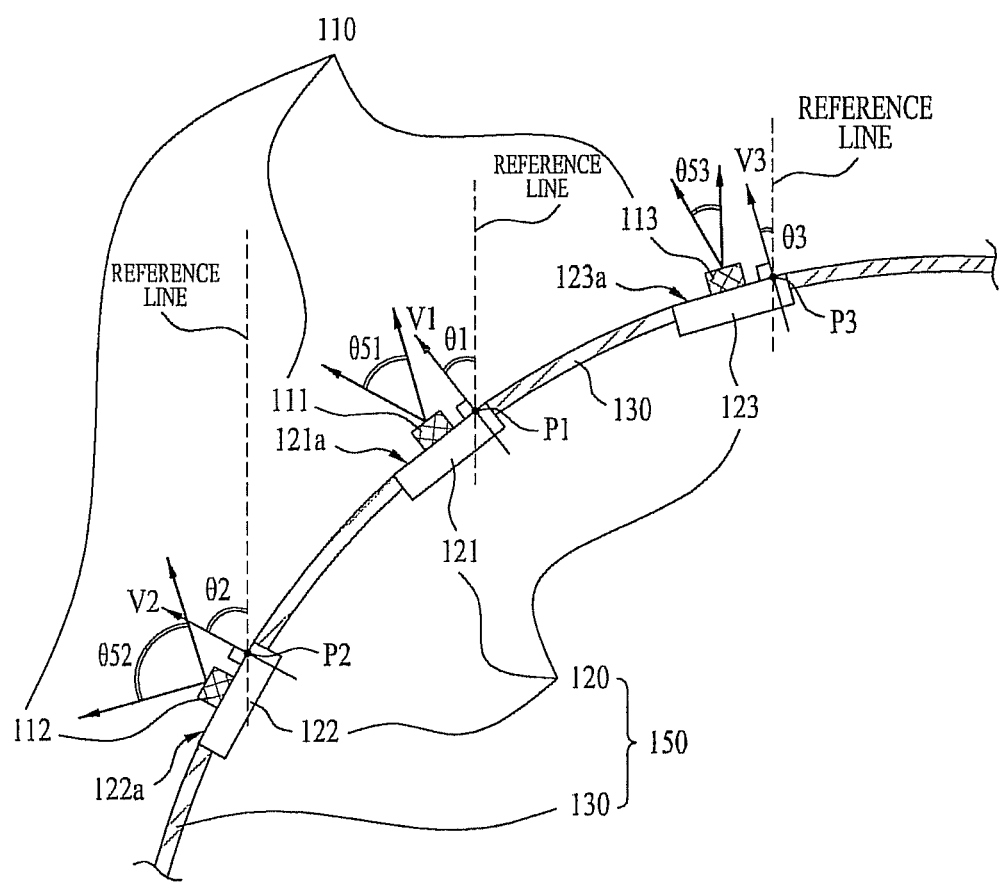

FIGS. 24A and 24B are sectional views of a light source module according to a sixth embodiment.

As shown in FIGS. 24A and 24B, the light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. The supporting portions 120 may include a first supporting portion 121, second supporting portion 122, and third supporting portion 123. The second supporting portion 122 may be disposed at one side of the first supporting portion 121. The third supporting portion 123 may be disposed at the other side of the first supporting portion 121. The light sources 110 may include a first light source 111 supported by the first supporting portion 121, a second light source 112 supported by the second supporting portion 122, and a third light source 113 may be supported by the third supporting portion 123.

The first supporting portion 121 may be disposed such that a first perpendicular line V1 passing through a first point P1 of a surface 121a of the first supporting portion 121 facing the first light source 111 is at a first angle θ1 with respect to a reference line facing a predetermined reference direction. The predetermined reference direction may be a direction in which the amount or intensity of light generated from the light sources 110 is measured. The second supporting portion 122 may be disposed such that a second perpendicular line V2 passing through a second point P2 of a surface 122a of the second supporting portion 122 facing the second light source 112 is at a second angle θ2 with respect to the reference line. The third supporting portion 123 may be disposed such that a third perpendicular line V3 passing through a third point P3 of a surface 123a of the third supporting portion 123 facing the third light source 113 is at a third angle θ3 with respect to the reference line.

When the second angle θ2 of the second supporting portion 122 is less than the first angle θ1 of the first supporting portion 121 and the third angle θ3 of the third supporting portion 123, as shown in FIG. 24A, an orientation angle θ52 of light from the second light source 112 supported by the second supporting portion 122 may be less than an orientation angle θ51 of light from the first light source 111 and an orientation angle θ53 of light from the third light source 113.

On the other hand, when the second angle θ2 of the second supporting portion 122 is greater than the first angle θ1 of the first supporting portion 121 and the third angle θ3 of the third supporting portion 123, as shown in FIG. 24B, the orientation angle θ52 of light from the second light source 112 supported by the second supporting portion 122 may be greater than the orientation angle θ51 of light from the first light source 111 and the orientation angle θ53 of light from the third light source 113.

For example, the orientation angle of light from the light sources disposed at the supporting portions having an angle between a perpendicular line passing through a point on the surface of each supporting portion facing a corresponding one of the light sources and the reference line facing the predetermined reference direction of about 0 to 45 degrees may be less than that of light from the light sources disposed at the supporting portions having an angle between a perpendicular line passing through a point on the surface of each supporting portion opposite a corresponding one of the light sources and the reference line facing the predetermined reference direction of about 45.1 to 90 degrees.

As described above, the orientation angle of light from the light sources is changed depending upon the position of the light sources which may be changed based on a design requirement of an apparatus to which the light source module is applied, to provide uniform brightness throughout and to increase the amount of light in the predetermined reference direction.

Figure 25A:
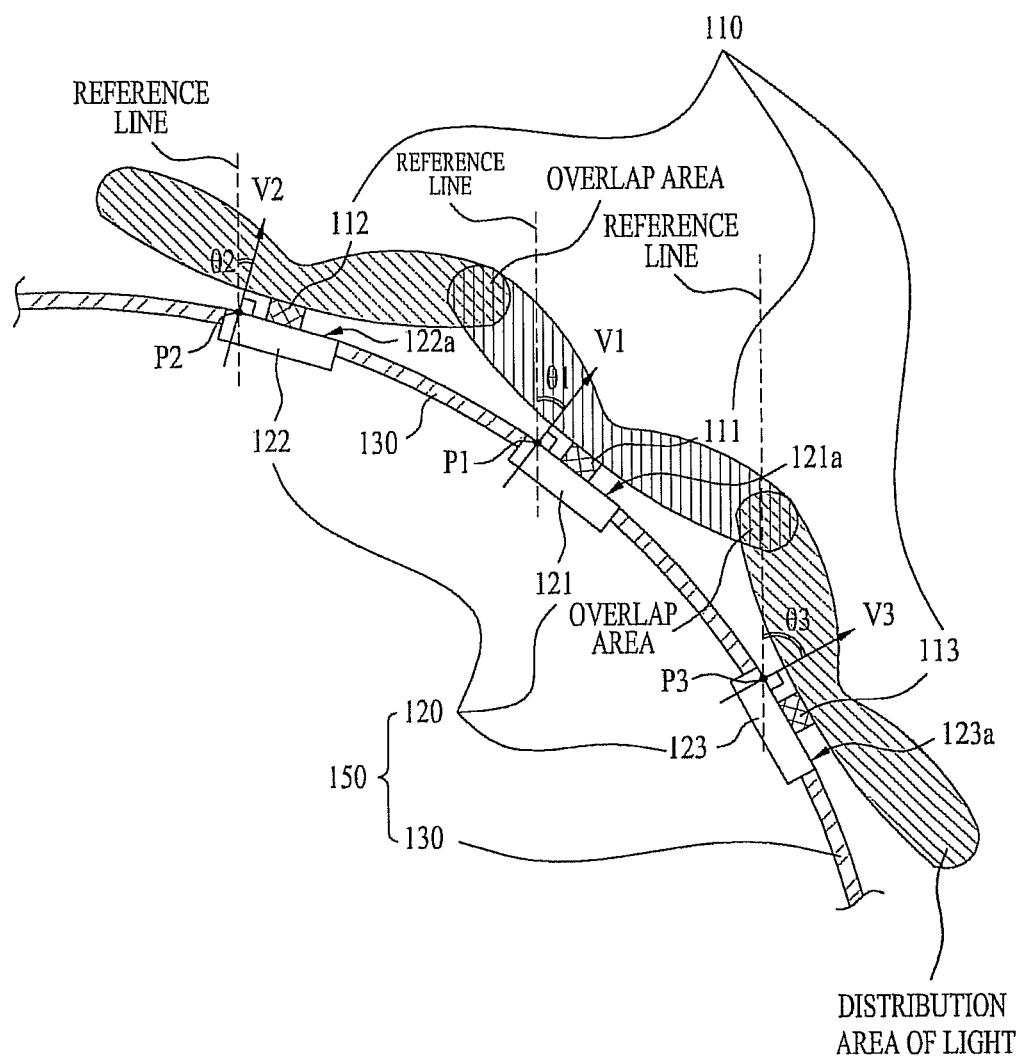
FIGS. 25A and 25B are sectional views showing arrangement of a light source module according to a seventh embodiment.
Figure 25B:
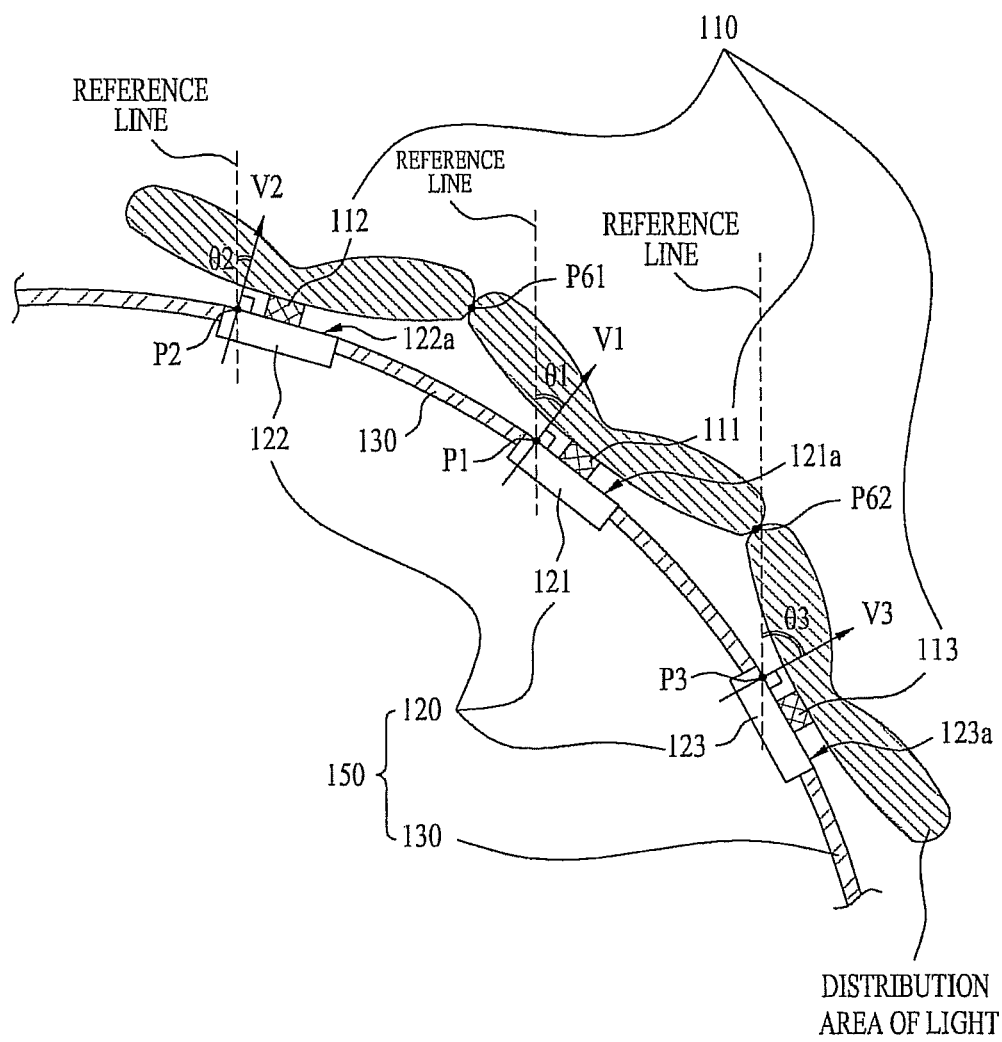

FIGS. 25A and 25B are sectional views of a light source module according to a seventh embodiment.

As shown in FIGS. 25A and 25B, the light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. The supporting portions 120 may include a first supporting portion 121, second supporting portion 122, and third supporting portion 123. The second supporting portion 122 may be disposed at one side of the first supporting portion 121. The third supporting portion 123 may be disposed at the other side of the first supporting portion 121. The light sources 110 may include a first light source 111, second light source 112, and third light source 113. The first light source 111 may be supported by the first supporting portion 121. The second light source 112 may be supported by the second supporting portion 122. The third light source 113 may be supported by the third supporting portion 123.

The first supporting portion 121 may be disposed such that a first perpendicular line V1 passing through a first point P1 of a surface 121a of the first supporting portion 121 facing the first light source 111 is at a first angle θ1 with respect to a reference line facing a predetermined reference direction. The predetermined reference direction may be a direction in which the amount or intensity of light generated from the light sources 110 is measured. The second supporting portion 122 may be disposed such that a second perpendicular line V2 passing through a second point P2 of a surface 122a of the second supporting portion 122 facing the second light source 112 is at a second angle θ2 with respect to the reference line. The third supporting portion 123 may be disposed such that a third perpendicular line V3 passing through a third point P3 of a surface 123a of the third supporting portion 123 facing the third light source 113 is at a third angle θ3 with respect to the reference line.

As shown in FIG. 25A, a distribution area of light emitted from the first light source 111 may partially overlap with that of light emitted from the second light source 112 or the third light source 113.

The In certain embodiments, the overlap area may be about 20% or less of the entire distribution area of light emitted from the first light source 111. If the overlap area exceeds about 20% of the entire distribution area of light emitted from the first light source 111, a hot spot phenomenon having high brightness at the overlap area may occur.

On the other hand, as shown in FIG. 25B, in certain embodiments, the distribution area of light emitted from the first light source 111 may partially contact that of light emitted from the second light source 112 or the third light source 113.

The distribution area of light emitted from the first light source 111 may include a first contact point P61 contacting the distribution area of light emitted from the second light source 112 and a second contact point P62 contacting the distribution area of light emitted from the third light source 113.

As described above, the distribution area of light from the light source module may be changed based on the structure of the light sources and the lenses to provide uniform brightness throughout without the occurrence of a hot spot phenomenon.

Also, the distribution area of light from the light source module may be changed based on a design requirement of an apparatus to which the light source module is applied.

Figure 26:
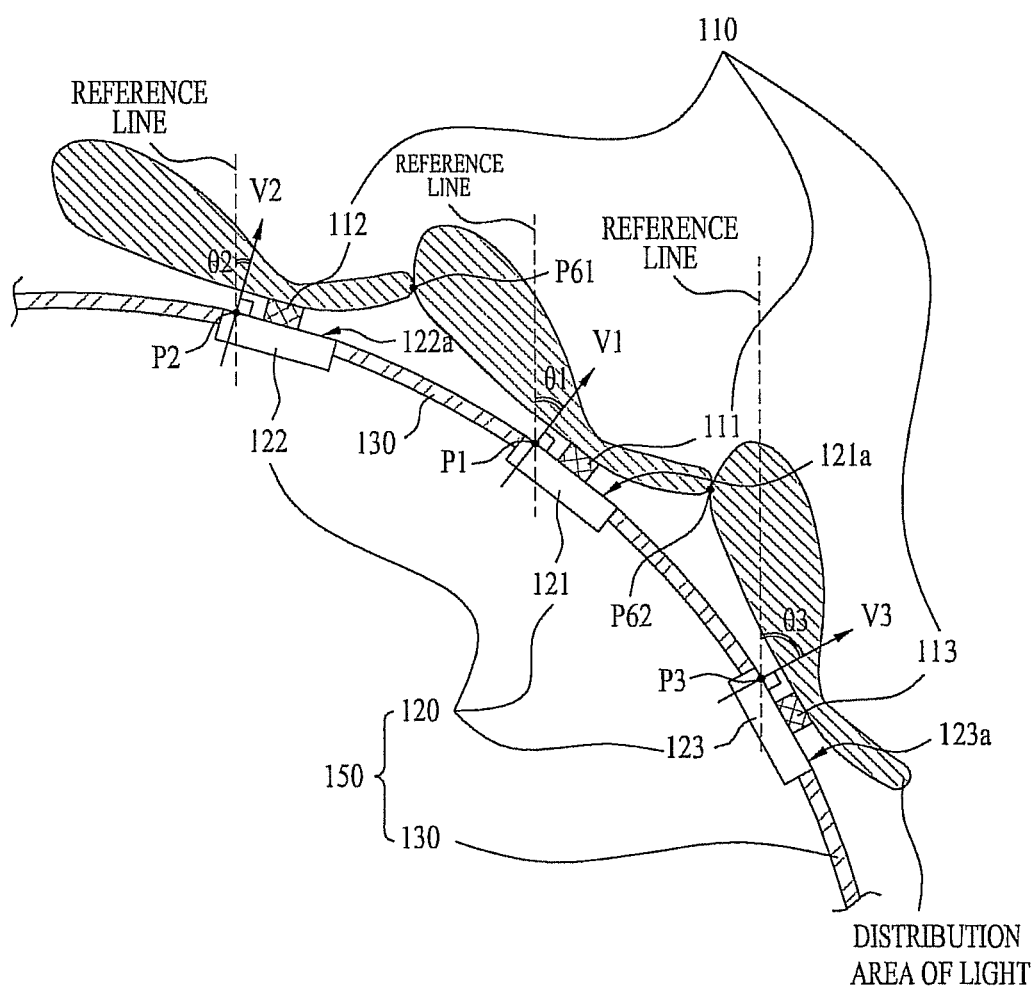
FIG. 26 is a sectional view showing arrangement of a light source module according to an eighth embodiment.

FIG. 26 is a sectional view showing arrangement of a light source module according to an eighth embodiment.

As shown in FIG. 26, the light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. The supporting portions 120 may include a first supporting portion 121, second supporting portion 122, and third supporting portion 123. The second supporting portion 122 may be disposed at one side of the first supporting portion 121. The third supporting portion 123 may be disposed at the other side of the first supporting portion 121. The light sources 110 may include a first light source 111 supported by the first supporting portion 121, a second light source 112 supported by the second supporting portion 122, and a third light source 113 supported by the third supporting portion 123.

The first supporting portion 121 may be disposed such that a first perpendicular line V1 passing through a first point P1 of a surface 121a of the first supporting portion 121 facing the first light source 111 is at a first angle θ1 with respect to a reference line facing a predetermined reference direction. The predetermined reference direction may be a direction in which the amount or intensity of light generated from the light sources 110 is measured. The second supporting portion 122 may be disposed such that a second perpendicular line V2 passing through a second point P2 of a surface 122a of the second supporting portion 122 facing the second light source 112 is at a second angle θ2 with respect to the reference line. The third supporting portion 123 may be disposed such that a third perpendicular line V3 passing through a third point P3 of a surface 123a of the third supporting portion 123 facing the third light source 113 is at a third angle θ3 with respect to the reference line.

As shown in FIG. 26, a distribution area of light emitted from the first light source 111 may partially contact that of light emitted from the second light source 112 or the third light source 113.

The distribution area of light emitted from the first light source 111 may include a first contact point P61 contacting the distribution area of light emitted from the second light source 112 and a second contact point P62 contacting the distribution area of light emitted from the third light source 113.

When the first angle θ1 of the first supporting portion 121 is greater than the second angle θ2 of the second supporting portion 122 and less than the third angle θ3 of the third supporting portion 123, the intensity of light at an area where the first contact point P61 is located may be greater than that of light at an area where the second contact point P62 is located.

The light source module having such distribution areas of light is disposed as described above to transmit a large amount of light in the predetermined reference direction.

The predetermined reference direction may be a direction in which the amount or intensity of light generated from the light sources 110 is measured. In a case in which a predetermined condition, such as the amount or intensity of light emitted in a specific direction, is required by an apparatus to which the lamp unit is applied, the distribution areas of light from the light sources 110 may be adjusted according to the required condition.

For example, in a case in which a lamp unit is applied to a taillight of a vehicle, as shown in FIG. 34, certain safety standards may apply. That is, when viewed at a horizontal angle of an outer axle of the vehicle of 45 degrees from the central point of light, a projected area may be greater than or equal to about 12.5 cm2, and, for example, the brightness of a braking lamp may be about 40 to 420 candela (cd).

Consequently, the distribution areas of light from the light sources 110 may be adjusted such that the intensity of light at the distribution area of light emitted from the first light source 111 adjacent to the distribution area of light emitted from the second light source 112 is greater than that of light at the distribution area of light emitted from the first light source 111 adjacent to the distribution area of light emitted from the third light source 113, and therefore, the light source module satisfies the predetermined condition, such as the amount or intensity of light, in the predetermined reference direction.

Figure 27:
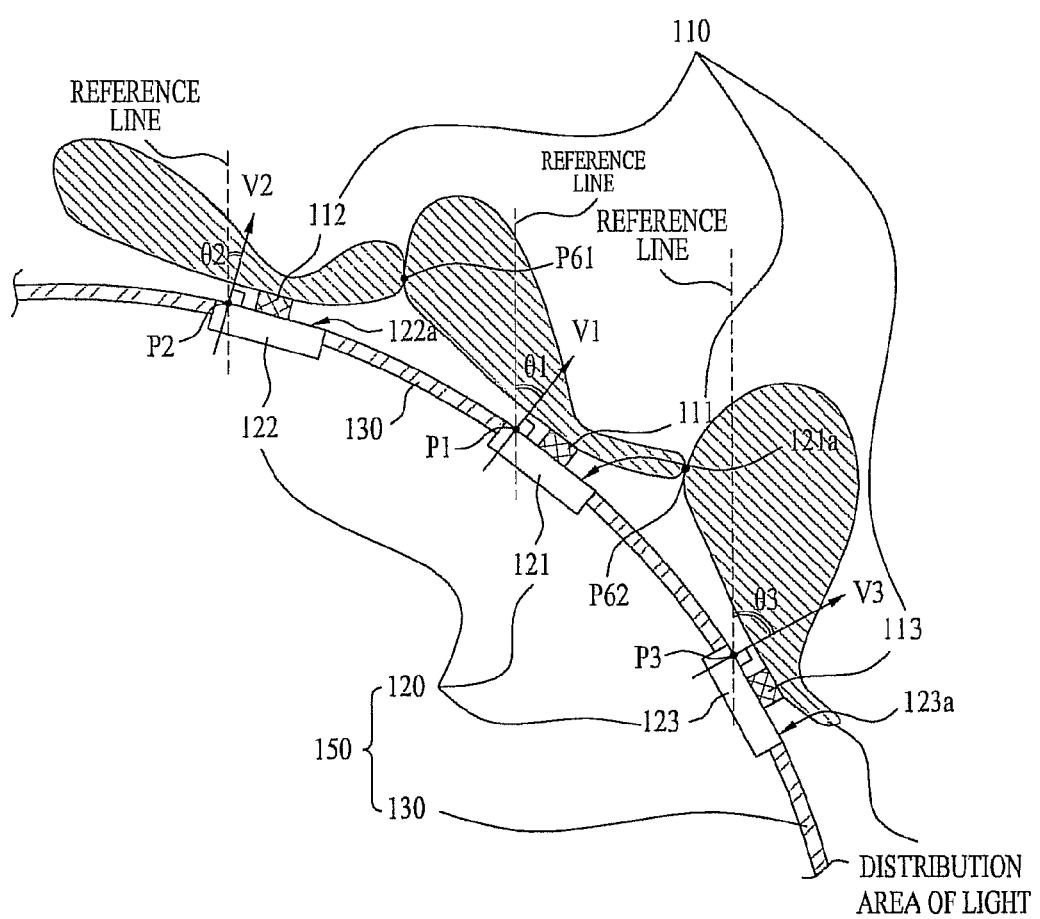
FIG. 27 is a sectional view showing arrangement of a light source module according to a ninth embodiment.

FIG. 27 is a sectional view of a light source module according to a ninth embodiment.

As shown in FIG. 27, the light source module may include a substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. The supporting portions 120 may include a first supporting portion 121, second supporting portion 122, and third supporting portion 123. The second supporting portion 122 may be disposed at one side of the first supporting portion 121. The third supporting portion 123 may be disposed at the other side of the first supporting portion 121. The light sources 110 may include a first light source 111 supported by the first supporting portion 121, a second light source 112 supported by the second supporting portion 122, and a third light source 113 supported by the third supporting portion 123.

The first supporting portion 121 may be disposed such that a first perpendicular line V1 passing through a first point P1 of a surface 121a of the first supporting portion 121 facing the first light source 111 is at a first angle θ1 with respect to a reference line facing a predetermined reference direction. The predetermined reference direction may be a direction in which the amount or intensity of light generated from the light sources 110 is measured. The second supporting portion 122 may be disposed such that a second perpendicular line V2 passing through a second point P2 of a surface 122a of the second supporting portion 122 facing the second light source 112 is at a second angle θ2 with respect to the reference line. The third supporting portion 123 may be disposed such that a third perpendicular line V3 passing through a third point P3 of a surface 123a of the third supporting portion 123 facing the third light source 113 is at a third angle θ3 with respect to the reference line.

As shown in FIG. 27, a distribution area of light emitted from each light source may include a first distribution area of light adjacent to the reference line and a second distribution area of light distant from the reference line.

The amount or intensity of light at the first distribution area of light adjacent to the reference line may be greater than that of light at the second distribution area of light distant from the reference line. The greater an angle between a perpendicular line passing through a point on the surface of each supporting portion facing a corresponding one of the light sources and the reference line facing the predetermined reference direction is, the greater the amount or intensity of light at the first distribution area of light adjacent to the reference line may be.

On the other hand, the greater an angle between a perpendicular line passing through a point on the surface of each supporting portion facing a corresponding one of the light sources and the reference line facing the predetermined reference direction is, the less the amount or intensity of light at the second distribution area of light distant from the reference line may be.

As described above, the greater an angle between a perpendicular line passing through a point on the surface of each supporting portion facing a corresponding one of the light sources and the reference line facing the predetermined reference direction is, the greater the amount or intensity of light at the first distribution area of light adjacent to the reference line is, whereas the less the amount or intensity of light at the second distribution area of light distant from the reference line is, to provide uniform brightness in the predetermined reference direction in which the amount or intensity of light generated from the light sources 110 is measured.

For example, when the first supporting portion 121 is disposed such that the first perpendicular line V1 passing through the first point P1 of the surface 121a of the first supporting portion 121 facing the first light source 111 is at the first angle θ1 with respect to a reference line facing a predetermined reference direction, and the second supporting portion 122 is disposed such that the second perpendicular line V2 passing through the second point P2 of the surface 122a of the second supporting portion 122 facing the second light source 112 is at the second angle θ2 with respect to the reference line, if the second angle θ2 is less than the first angle θ1, the amount or intensity of light at the first distribution area of light corresponding to the first light source 111 may be greater than that of light at the first distribution area of light corresponding to the second light source 112, and the amount or intensity of light at the second distribution area of light corresponding to the first light source 111 may be less than that of light at the second distribution area of light corresponding to the second light source 112.

Figure 28:
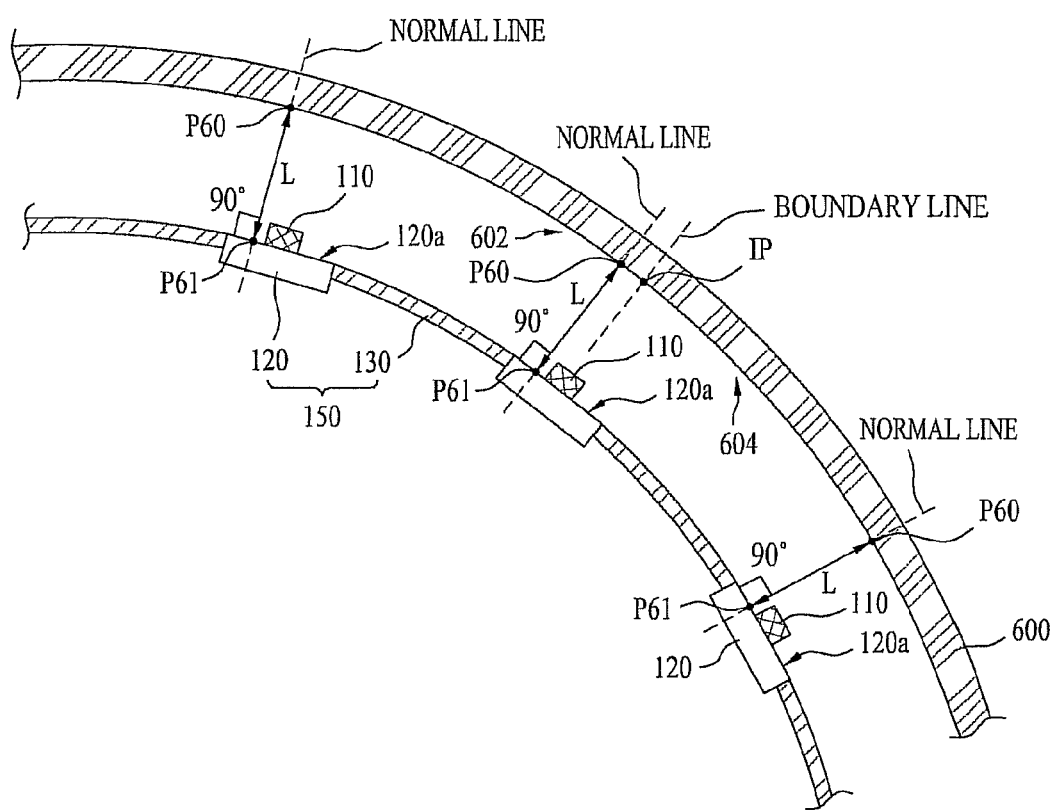
FIG. 28 is a sectional view showing arrangement of a light source module according to a tenth embodiment.

FIG. 28 is a sectional view of a light source module according to a tenth embodiment.

As shown in FIG. 28, an optical member 600 may be spaced apart from a substrate 150 by a predetermined distance. A light mixing area may be formed between the substrate 150 and the optical member 600. The optical member 600 may include at least two inclined surfaces having at least one inflection point IP.

For example, the optical member 600 may be divided into a first inclined surface 602 and second inclined surface 604 on opposite sides of the inflection point IP.

The first inclined surface 602 of the optical member 600 may have a first radius of curvature, and the second inclined surface 604 of the optical member 600 may have a second radius of curvature. The first radius of curvature may be different from the second radius of curvature.

The light source module may include the substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120.

Each supporting portion 120 of the substrate 150 may have a surface perpendicular to a normal line connected to a point on the surface of the optical member 600, and the normal lines corresponding to the respective supporting portions 120 of the substrate 150 may have the same length L.

In certain embodiments, at least one of the normal lines corresponding to the respective supporting portions 120 of the substrate 150 may be different in length from the others. That is, a normal line connected a point P60 on the surface of the optical member 600 may pass through a point P61 on a surface 120a of each supporting portion 120 of the substrate 150 and may be perpendicular to the surface 120a of each supporting portion 120 of the substrate 150.

The length L of the normal line between the point P60 on the surface of the optical member 600 and the point P61 on the surface 120a of each supporting portion 120 of the substrate 150 may be, for example, greater than or equal to about 10 mm.

For example, the length L of the normal line between the point P60 on the surface of the optical member 600 and the point P61 on the surface 120a of each supporting portion 120 of the substrate 150 may be about 10 mm to 50 cm.

If the length L of the normal line between the point P60 on the surface of the optical member 600 and the point P61 on the surface 120a of each supporting portion 120 of the substrate 150 is less than about 10 mm, a lamp unit may not exhibit uniform brightness, and a hot spot phenomenon having high brightness at the area at which each light source 110 is located may occur.

On the other hand, if the length L of the normal line between the point P60 on the surface of the optical member 600 and the point P61 on the surface 120a of each supporting portion 120 of the substrate 150 is greater than about 50 cm, the brightness of the lamp unit may be relatively low, and therefore, a desired function of the lamp unit may not be performed.

Figure 29:
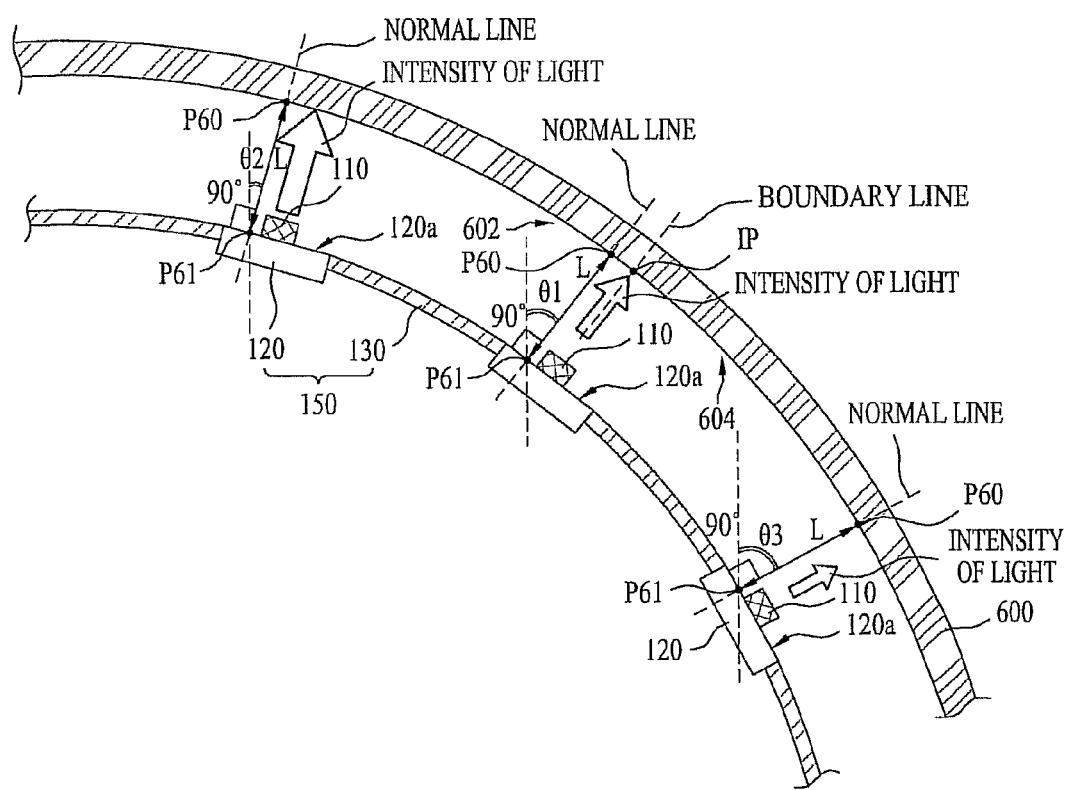
FIG. 29 is a sectional view showing arrangement of a light source module according to an eleventh embodiment.

FIG. 29 is a sectional view of a light source module according to an eleventh embodiment.

As shown in FIG. 29, an optical member 600 may be spaced apart from a substrate 150 by a predetermined distance. A light mixing area may be formed between the substrate 150 and the optical member 600. The optical member 600 may include at least two inclined surfaces having at least one inflection point IP. For example, the optical member 600 may be divided into a first inclined surface 602 and second inclined surface 604, with the inflection point IP as a boundary line.

The first inclined surface 602 of the optical member 600 may have a first radius of curvature, and the second inclined surface 604 of the optical member 600 may have a second radius of curvature. The first radius of curvature may be different from the second radius of curvature.

The light source module may include the substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. Each supporting portion 120 of the substrate 150 may have a surface perpendicular to a normal line connected to a point on the surface of the optical member 600, and the normal lines corresponding to the respective supporting portions 120 of the substrate 150 may have the same length L.

That is, a normal line connected a point P60 on the surface of the optical member 600 may pass through a point P61 on a surface 120a of each supporting portion 120 of the substrate 150 and may be perpendicular to the surface 120a of each supporting portion 120 of the substrate 150.

The length L of the normal line between the point P60 on the surface of the optical member 600 and the point P61 on the surface 120a of each supporting portion 120 of the substrate 150 may be, for example, greater than or equal to about 10 mm.

The normal line corresponding to each supporting portion 120 of the substrate 150 may be at a predetermined angle to a reference line facing a predetermined reference direction. The intensity of light from the light sources 110 disposed at the supporting portions 120 of the substrate 150 having the minimum angle between the normal line and the reference line may be greater than that of light from the light sources 110 disposed at the supporting portions 120 of the substrate 150 having the maximum angle between the normal line and the reference line.

The light source module is disposed as described above to transmit a large amount of light in the predetermined reference direction. The predetermined reference direction may be a direction in which the amount or intensity of light generated from the light sources 110 is measured. In a case in which a predetermined condition, such as the amount or intensity of light emitted in a specific direction, is required by an apparatus to which the light source module is applied, light sources 110 having different intensities of light may be disposed according to the required condition.

For example, in a case in which a lamp unit is applied to a taillight of a vehicle, as shown in FIG. 34, certain safety standards may apply. That is, when viewed at a horizontal angle of an outer axle of the vehicle of 45 degrees from the central point of light, a projected area may be greater than or equal to about 12.5 cm2, and, for example, the brightness of a braking lamp may be about 40 to 420 candela (cd).

Consequently, light sources 110 having high intensity of light may be disposed at the supporting portions 120 having the minimum angle between the normal line and the reference line, and light sources 110 having low intensity of light may be disposed at the supporting portions 120 having the maximum angle between the normal line and the reference line so that the light source module satisfies the predetermined condition, such as the amount or intensity of light, in the predetermined reference direction.

Figure 30:
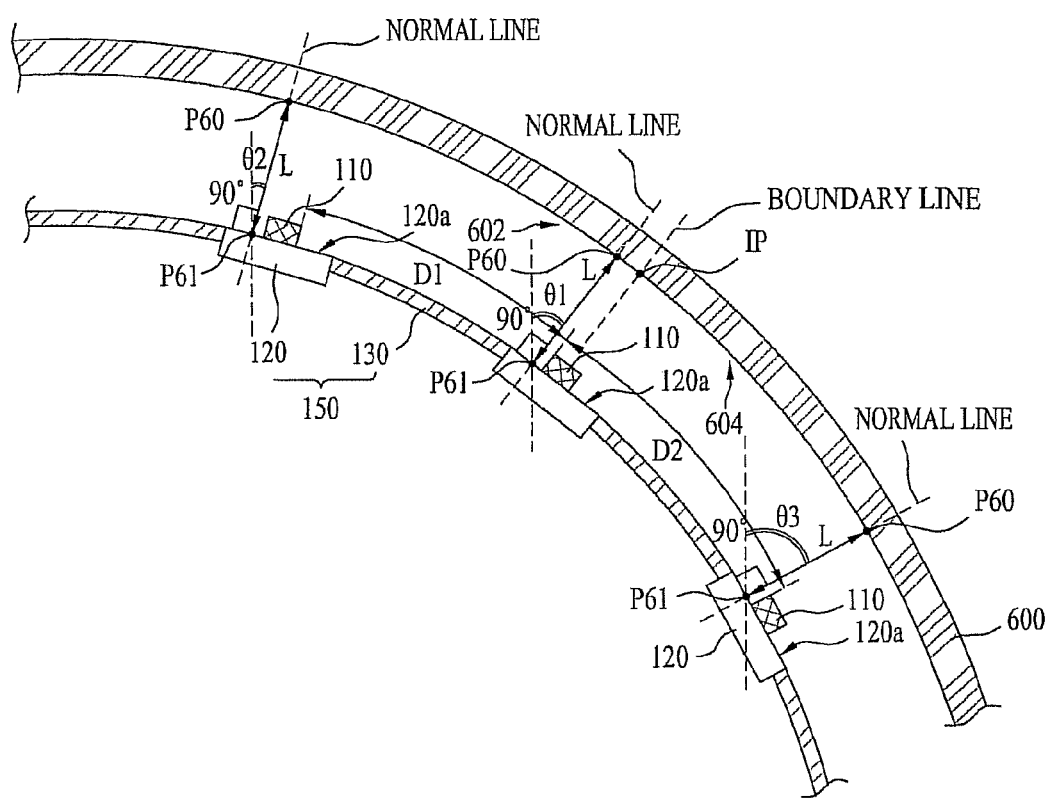
FIG. 30 is a sectional view showing arrangement of a light source module according to a twelfth embodiment.

FIG. 30 is a sectional view of a light source module according to a twelfth embodiment.

As shown in FIG. 30, an optical member 600 may be spaced apart from a substrate 150 by a predetermined distance. A light mixing area, or air guide area, may be formed between the substrate 150 and the optical member 600. The optical member 600 may include at least two inclined surfaces having at least one inflection point IP.

For example, the optical member 600 may be divided into a first inclined surface 602 and second inclined surface 604, with the inflection point IP as a boundary line. The first inclined surface 602 of the optical member 600 may have a first radius of curvature, and the second inclined surface 604 of the optical member 600 may have a second radius of curvature. The first radius of curvature may be different from the second radius of curvature.

The light source module may include the substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. Each supporting portion 120 of the substrate 150 may have a surface perpendicular to a normal line connected to a point on the surface of the optical member 600, and the normal lines corresponding to the respective supporting portions 120 of the substrate 150 may have the same length L.

That is, a normal line connected a point P60 on the surface of the optical member 600 may pass through a point P61 on a surface 120a of each supporting portion 120 of the substrate 150 and may be perpendicular to the surface 120a of each supporting portion 120 of the substrate 150.

The length L of the normal line between the point P60 on the surface of the optical member 600 and the point P61 on the surface 120a of each supporting portion 120 of the substrate 150 may be, for example, greater than or equal to about 10 mm.

The normal line corresponding to each supporting portion 120 of the substrate 150 may be at a predetermined angle to a reference line facing a predetermined reference direction. A distance D1 between the light sources 110 disposed at the supporting portions 120 of the substrate 150 having an angle between the normal line and the reference line of about 0 to 45 degrees may be less than a distance D2 between the light sources 110 disposed at the supporting portions 120 of the substrate 150 having an angle between the normal line and the reference line of about 45.1 to 90 degrees.

The light source module is disposed as described above to transmit a large amount of light in the predetermined reference direction.

The predetermined reference direction may be a direction in which the amount or intensity of light generated from the light sources 110 is measured. In a case in which a predetermined condition, such as the amount or intensity of light emitted in a specific direction, is required by an apparatus to which the light source module is applied, light sources 110 having different intensities of light may be disposed according to the required condition.

For example, in a case in which a lamp unit is applied to a taillight of a vehicle, as shown in FIG. 34, certain safety standards may apply. That is, when viewed at a horizontal angle of an outer axle of the vehicle of 45 degrees from the central point of light, a projected area may be greater than or equal to about 12.5 cm2, and, for example, the brightness of a braking lamp may be about 40 to 420 candela (cd).

Consequently, the arrangement density of light sources 110 disposed at the supporting portions 120 having an angle between the normal line and the reference line of about 0 to 45 degrees may be increased, and the arrangement density of light sources 110 disposed at the supporting portions 120 having an angle between the normal line and the reference line of about 45.1 to 90 degrees may be decreased so that the light source module satisfies the predetermined condition, such as the amount or intensity of light, in the predetermined reference direction.

Figure 31:
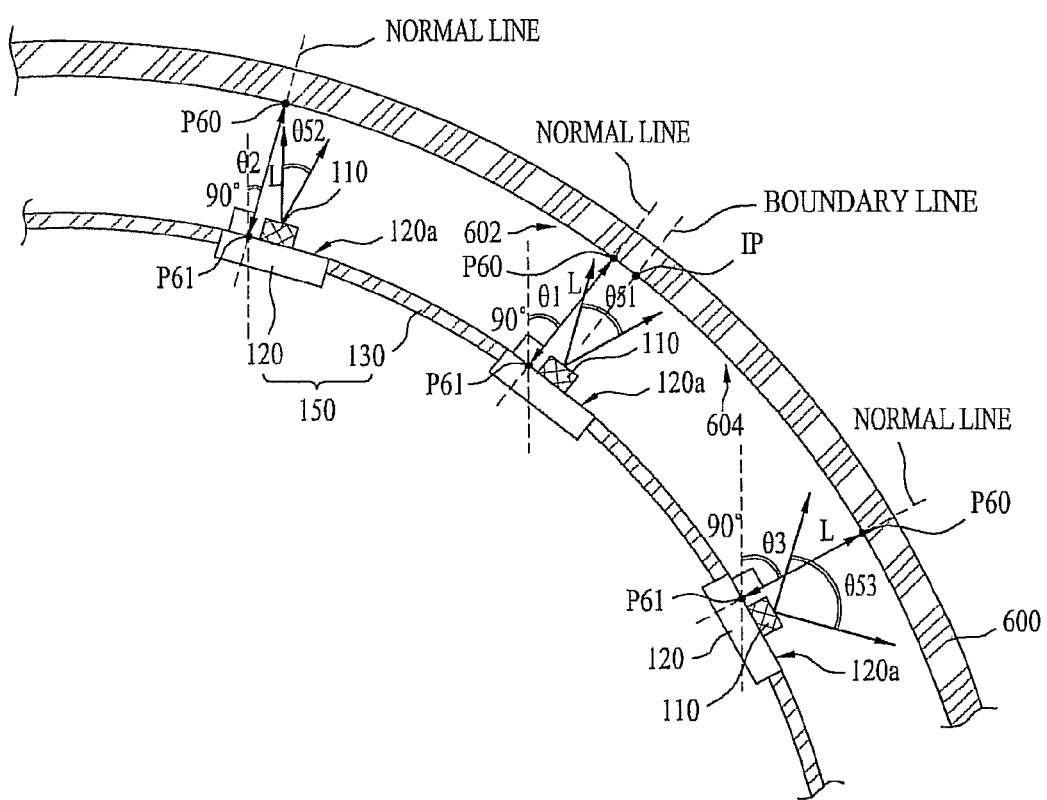
FIG. 31 is a sectional view showing arrangement of a light source module according to a thirteenth embodiment.

FIG. 31 is a sectional view of a light source module according to a thirteenth embodiment.

As shown in FIG. 31, an optical member 600 may be spaced apart from a substrate 150 by a predetermined distance. A light mixing area, or air guide area, may be formed between the substrate 150 and the optical member 600. The optical member 600 may include at least two inclined surfaces having at least one inflection point IP.

For example, the optical member 600 may be divided into a first inclined surface 602 and second inclined surface 604, with the inflection point IP as a boundary line. The first inclined surface 602 of the optical member 600 may have a first radius of curvature, and the second inclined surface 604 of the optical member 600 may have a second radius of curvature. The first radius of curvature may be different from the second radius of curvature.

The light source module may include the substrate 150 and a plurality of light sources 110 arranged on the substrate 150. The substrate 150 may include a plurality of supporting portions 120 and a plurality of connecting portions 130. The supporting portions 120 may be disposed so as to correspond to the respective light sources 110, and the connecting portions 130 may be disposed between neighboring supporting portions 120. Each supporting portion 120 of the substrate 150 may have a surface perpendicular to a normal line connected to a point on the surface of the optical member 600, and the normal lines corresponding to the respective supporting portions 120 of the substrate 150 may have the same length L.

That is, a normal line connected a point P60 on the surface of the optical member 600 may pass through a point P61 on a surface 120a of each supporting portion 120 of the substrate 150 and may be perpendicular to the surface 120a of each supporting portion 120 of the substrate 150.

The length L of the normal line between the point P60 on the surface of the optical member 600 and the point P61 on the surface 120a of each supporting portion 120 of the substrate 150 may be greater than or equal to about 10 mm.

The normal line corresponding to each supporting portion 120 of the substrate 150 may be at a predetermined angle to a reference line facing a predetermined reference direction.

An orientation angle of light from the light sources 110 disposed at the supporting portions 120 of the substrate 150 having the minimum angle between the normal line and the reference line may be less than that of light from the light sources 110 disposed at the supporting portions 120 of the substrate 150 having the maximum angle between the normal line and the reference line.

As described above, the disposition of the light source module may be changed based on a design requirement of an apparatus to which the light source module is applied, to provide uniform brightness throughout and to increase the amount of light in the predetermined reference direction.

Figure 32:
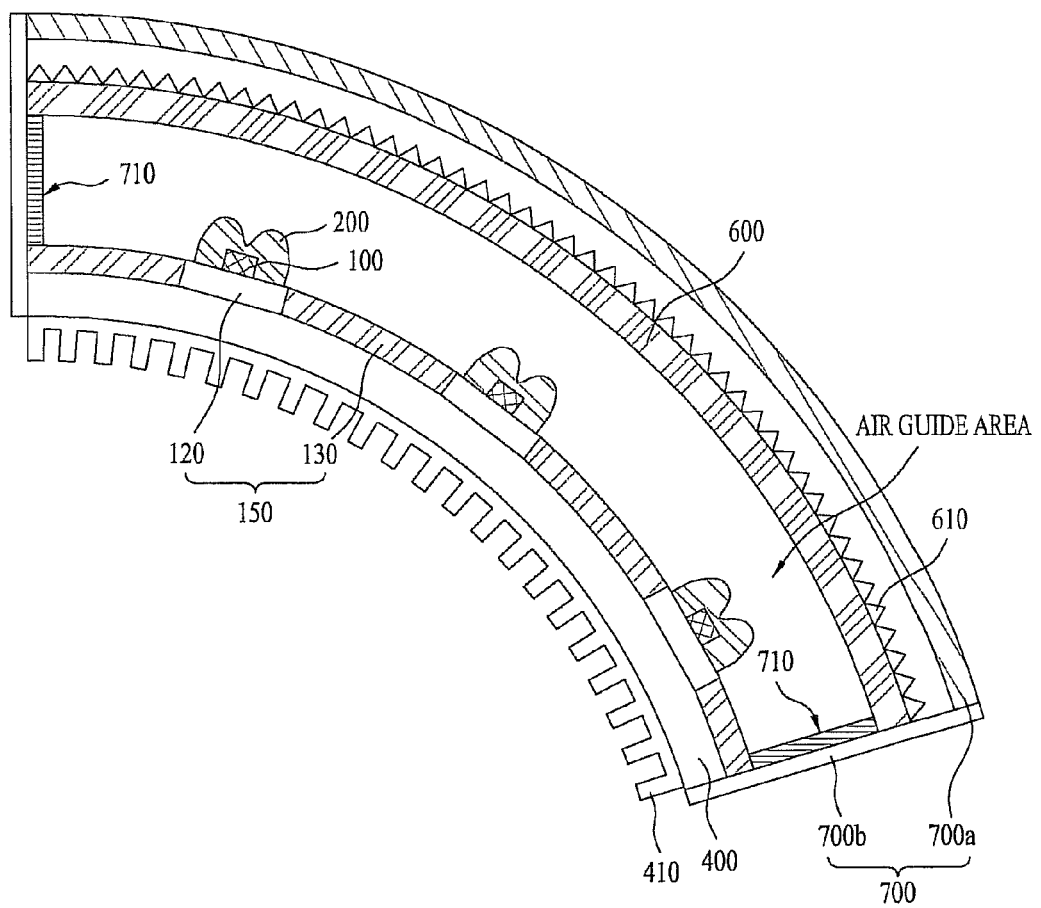
FIG. 32 is a sectional view showing a lamp unit for vehicles according to an embodiment as broadly described herein.

FIG. 32 is a sectional view of a lamp unit for vehicles, according to an embodiment as broadly described herein.

As shown in FIG. 32, the lamp unit may include a light source module including a substrate 150 and light sources 110, a heat dissipation member 400, an optical member 600, and a cover member 700.

The light source module may include a substrate 150 having an electrode pattern and a plurality of light sources 110 arranged on the substrate 150. The substrate 150 of the light source module may include a plurality of supporting portions 120 disposed so as to correspond to the respective light sources 110 and a plurality of connecting portions 130 disposed between neighboring supporting portions 120.

The substrate 150 may be an integrated type in which the supporting portions 120 and the connecting portions 130 of the substrate 150 are formed of a soft material. Alternatively, the substrate 150 may be a separation type in which the supporting portions 120 of the substrate 150 are formed of a relatively hard material which is not flexible to support the respective light sources 110, and the connecting portions 130 of the substrate 150 are formed of a soft material which is flexible. Consequently, the substrate 150 of the light source module may be manufactured so as to be applied to a light, such as, for example, a vehicle light having some amount of curvature.

In certain embodiments, the supporting portions 120 of the substrate 150 may have a first thickness, and the connecting portions 130 of the substrate 150 may have a second thickness. The first thickness may be different from the second thickness so that the substrate 150 may be curved.

For example, if the second thickness of the connecting portions 130 of the substrate 150 is less than the first thickness of the supporting portions 120 of the substrate 150, the substrate 150 may be curved due to the connecting portions 130 of the substrate 150, and therefore, the substrate 150 of the light source module may be applied to a vehicle light having curvature.

The predetermined reference direction may be a direction in which the amount or intensity of light generated from the light sources 110 is measured. That is, in a case in which the lamp unit is applied to a taillight of a vehicle, certain safety standards may apply. That is, as shown in FIG. 34, when viewed at a horizontal angle of an outer axle of the vehicle of 45 degrees from the central point of light, a projected area may be greater than or equal to about 12.5 cm2, and, for example, the brightness of a braking lamp may be about 40 to 420 candela (cd). In such a lamp unit, therefore, the brightness of the braking lamp in the predetermined reference direction may be about 40 to 420 candela (cd).

For this reason, the supporting portions 120 of the substrate 150 may be designed such that each supporting portion 120 of the substrate 150 has a surface perpendicular to a normal line connected to a point on the surface of the optical member 600, and the normal lines corresponding to the respective supporting portions 120 of the substrate 150 have the same length.

In certain embodiments, the supporting portions 120 of the substrate 150 may be designed such that a perpendicular line passing through a point on the surface of each supporting portion 120 facing a corresponding one of the light sources 110 is at a predetermined angle to the reference line facing the predetermined reference direction, and the intensity of light from the light sources 110 disposed at the supporting portions 120 having an angle between a perpendicular line passing through a point on the surface of each supporting portion 120 facing a corresponding one of the light sources 110 and the reference line facing the predetermined reference direction of 0 to 45 degrees is greater than that of light from the light sources 110 disposed at the supporting portions 120 having an angle between a perpendicular line passing through a point on the surface of each supporting portion 120 opposite a corresponding one of the light sources 110 and the reference line facing the predetermined reference direction of 45.1 to 90 degrees.

In another case, the supporting portions 120 of the substrate 150 may be designed such that a perpendicular line passing through a point on the surface of each supporting portion 120 opposite a corresponding one of the light sources 110 is at a predetermined angle with respect to the reference line facing the predetermined reference direction, and the density of the light sources 110 disposed at the supporting portions 120 having an angle between a perpendicular line passing through a point on the surface of each supporting portion 120 opposite a corresponding one of the light sources 110 and the reference line facing the predetermined reference direction of 0 to 45 degrees is greater than that of the light sources 110 disposed at the supporting portions 120 having an angle between a perpendicular line passing through a point on the surface of each supporting portion 120 opposite a corresponding one of the light sources 110 and the reference line facing the predetermined reference direction of 45.1 to 90 degrees.

In a further case, the supporting portions 120 of the substrate 150 may be designed such that a perpendicular line passing through a point on the surface of each supporting portion 120 opposite a corresponding one of the light sources 110 is at a predetermined angle to the reference line facing the predetermined reference direction, and an orientation angle of light from the light sources 110 disposed at the supporting portions 120 having an angle between a perpendicular line passing through a point on the surface of each supporting portion 120 opposite a corresponding one of the light sources 110 and the reference line facing the predetermined reference direction of 0 to 45 degrees is less than that of the light sources 110 disposed at the supporting portions 120 having an angle between a perpendicular line passing through a point on the surface of each supporting portion 120 opposite a corresponding one of the light sources 110 and the reference line facing the predetermined reference direction of 45.1 to 90 degrees.

Each light source 110 of the light source module may include a lens 200. The lens 200 may include a groove disposed at a position corresponding to the central area of a light emission surface of each light source 110.

The groove may have a conical or trapezoidal cross-section having a wide top and a narrow bottom.

The groove may be formed at the lens 200 to widen an orientation angle of light emitted from each light source 110. However, embodiments are not limited thereto, and various types of lenses may be used.

The optical member 600 may be spaced apart from the substrate 150 by a predetermined distance. A light mixing area, or air guide area, may be formed between the substrate 150 and the optical member 600.

In certain embodiments, the cover member 700 may be omitted, and the optical member 600 may also function as a cover member 700.

In alternative embodiments, the optical member 600 may be omitted, and only the cover member 700 may be provided.

The optical member 600 may include at least one of a diffusion sheet that diffuses light emitted from the light sources 110, a prism sheet that guides the diffused light to a light emission area, and/or a brightness enhancement sheet that enhances brightness.

Also, the optical member 600 may have an uneven pattern 610 formed at the upper surface thereof.

The optical member 600 may diffuse light emitted from the light source module. To improve a diffusion effect, the uneven pattern 610 may be formed at the upper surface of the optical member 600.

The optical member 600 may include a plurality of layers. The uneven pattern 610 may be formed at the surface of the uppermost layer or a specific one of the layers.

In certain embodiments, the pattern 610 may have a stripe shape arranged in one direction.

The optical member 600 may include at least two inclined surfaces having at least one inflection point IP so that the optical member 600 is suitable for the shape of a vehicle lamp having curvature A normal line connected to a point on the surface of the optical member 600 may be perpendicular to the surface of each supporting portion 120 of the substrate 150, and all of the normal lines corresponding to the respective supporting portions 120 of the substrate 150 may have the same length.

For example, when a perpendicular line passing through a point on the surface of each supporting portion 120 of the substrate 150 passes through a point of the optical member 600, the distance between the point of the optical member 600 and the surface of each supporting portion 120 may be greater than or equal to about 10 mm.

If the distance between the point of the optical member 600 and the surface of each supporting portion 120 is less than about 10 mm, the lamp unit may not exhibit uniform brightness, and a hot spot phenomenon having high brightness at the area at which each light source 110 is located may occur.

The heat dissipation member 400 may to dissipate heat generated from the light sources 110.

When the heat dissipation member 400 is disposed at the bottom of the substrate 150 of the light source module, heat generated from each light source 110 may be efficiently dissipated, and therefore, the increase in temperature of each light source 110 is suppressed, thereby preventing the luminous intensity of each light source 110 from being decreased and the waveform of generated light from being shifted.

The cover member 700 may include a top cover 700a and a side cover 700b. The top cover 700a may be formed of a light transmissive material, and the side cover 700b may be formed of a light non-transmissive material.

In certain embodiments, both the top cover 700a and side cover 700b may be formed of a light transmissive material.

The cover member 700 may be formed of a material (for example, acryl) protecting the light source module including the substrate 150 and the light sources 110 from external impact and transmitting light emitted from the light source module.

The cover member 700 may also include a curved portion in terms of design. The substrate 150 of the light source module may be flexible and thus may be easily received in the curved cover member 700.

A reflector 710 may be disposed at the inside of the side cover 700b of the cover member 700.

A reflective coating film or reflective coating material layer may be formed at the reflector 710. The reflector 710 may reflect light generated by the light sources 110 toward the optical member 600.

The cover member 700 may be disposed in contact with the optical member 600. Only a portion of the cover member 700 may contact the optical member 600, and the remaining portion of the cover member 700 may be spaced apart from the optical member 600 by a predetermined distance.

In certain embodiments, the entire surface of the cover member 700 opposite the optical member 600 may contact the optical member 600.

Also, the entire surface of the cover member 700 opposite the optical member 600 may be spaced apart from the optical member 600 by a predetermined distance.

The distance between the cover member 700 and the optical member 600 may be varied based on safety conditions and design considerations of the vehicle lamp to provide uniform brightness throughout.

In this embodiment, as described above, a plurality of light sources having different arrangement directions with respect to the predetermined reference direction is provided, and a light mixing area, or air guide area, is formed between the light sources and the optical member, thereby realizing a surface light source using a small number of light sources so that the lamp unit may be applied to a vehicle lamp.

A surface light source is a light source that diffuses light in a particular surface shape. In this embodiment, a lamp unit for vehicles that satisfies a particular condition, such as the amount of light emitted in a specific direction, and realizes a surface light source using a small number of light sources, is provided.

Also, in this embodiment, a plurality of light sources is disposed on a flexible substrate, and therefore, the lamp unit may be applied to a vehicle lamp having curvature.

In this embodiment, therefore, it is possible to improve economy of the lamp unit for vehicles and a degree of freedom in product design.

FIG. 33 is a view of a taillight 800 for vehicles including the lamp unit, as embodied and broadly described herein.

As shown in FIG. 33, the taillight 800 may include a first lamp unit 812, second lamp unit 814, third lamp unit 816, and housing 810.

In this exemplary embodiment, the first lamp unit 812 may be a light source functioning as a direction indicating light, the second lamp unit 814 may be a light source functioning as a breadth indicating light, and the third lamp unit 816 may be a light source functioning as a stopping, or braking light. However, the functions of the first lamp unit 812, second lamp unit 814, third lamp unit 816 are not limited thereto. For example, the functions of the first lamp unit 812, second lamp unit 814, third lamp unit 816 may be changed.

The housing 810 may receive the first, second, and third lamp units 812, 824, and 816. The housing 810 may be formed of a light transmissive material.

The housing 810 may be curved according to the design of a vehicle body. The first, second, and third lamp units 812, 824, and 816 may realize surface light sources that can be curved according to the shape of the housing 810.

In this embodiment, as described above, a plurality of light sources having different arrangement directions with respect to the predetermined reference direction may be provided, and a light mixing area, or air guide area, may be formed between the light sources and the optical member, thereby realizing a surface light source using a small number of light sources. Furthermore, an amount of intensity of light suitable for safety conditions of a vehicle lamp may be provided. Consequently, it may be possible to improve economy of the lamp unit and a degree of freedom in product design.

FIG. 34 is a plan view of a vehicle including the lamp unit shown in FIG. 33, in accordance with embodiments as broadly described herein.

In a case in which the lamp unit is applied to a taillight of the vehicle, as shown in FIG. 34, certain safety standards of the lamp unit provided in the taillight of the vehicle may apply. That is, when viewed at a horizontal angle of an outer axle of the vehicle of 45 degrees from the central point of light, a projected area may be greater than or equal to about 12.5 cm2, and, for example, the brightness of a braking lamp may be about 40 to 420 candela (cd).

When the amount of light is measured in a light amount measurement direction, therefore, the taillight of the vehicle is expected to provide an amount of light greater than or equal to a reference value.

The lamp unit according to this embodiment realizes a surface light source that is capable of providing an amount of light greater than or equal to the reference value in the light amount measurement direction, i.e. a predetermined reference direction, using a small number of light sources, thereby improving economy of the lamp unit and a degree of freedom in product design. That is, in this embodiment, a plurality of light sources having different arrangement directions with respect to the predetermined reference direction is used, thereby realizing a surface light source using a small number of light sources.

Further, no light guide panel is provided between the light sources and the optical member, and a light mixing area is formed between the light sources and the optical member, thereby reducing the weight of the lamp unit and the manufacturing cost of the lamp unit. Additionally, a plurality of light sources is provided on a flexible substrate, and therefore, it is possible to apply the lamp unit to an object having curvature. Consequently, it is possible to improve economy of the lamp unit and a degree of freedom in product design.

Embodiments provide a lamp unit that is capable of realizing a surface light source using a small number of light sources having different arrangement directions with respect to a reference direction and a vehicle lamp apparatus using the same.

Further, embodiments provide a lamp unit in which a plurality of light sources is disposed on a flexible substrate so that the lamp unit is applied to an object having curvature and a vehicle lamp apparatus using the same.

In one embodiment, a lamp unit as embodied and broadly described herein may include a substrate and a plurality of light sources arranged on the substrate, wherein the substrate includes a plurality of supporting portions disposed so as to correspond to the respective light sources and connecting portions disposed between neighboring supporting portions, the supporting portions include a first supporting portion to support a first light source, a second supporting portion disposed at one side of the first supporting portion to support a second light source, and a third supporting portion disposed at the other side of the first supporting portion to support a third light source, the first supporting portion is disposed such that a first perpendicular line passing through a point of a surface of the first supporting portion and perpendicular to the surface of the first supporting portion is at a first angle to a reference line facing a predetermined reference direction, the second supporting portion is disposed such that a second perpendicular line passing through a point of a surface of the second supporting portion and perpendicular to the surface of the second supporting portion is at a second angle to the reference line, the third supporting portion is disposed such that a third perpendicular line passing through a point of a surface of the third supporting portion and perpendicular to the surface of the third supporting portion is at a third angle to the reference line, and the first angle is different from the second angle and/or the third angle.

The surface of each supporting portion opposite a corresponding one of the light sources may be a flat surface.

Each connecting portion disposed between the neighboring supporting portions may have at least one selected from a flat surface, convex surface, and concave surface.

The supporting portions of the substrate may be conductors, and the connecting portions of the substrate may be nonconductors.

Also, the supporting portions and the connecting portions of the substrate may be formed of at least two kinds of the same conductors and nonconductors.

The supporting portions of the substrate may have a first thickness, and the connecting portions of the substrate may have a second thickness, and the first thickness may be different from the second thickness.

A ratio of the first thickness to the second thickness may be 1.1:1 to 30:1.

Each supporting portion of the substrate may include a first surface contacting a corresponding one of the light sources and a second surface opposite to the first surface, and the first surface may be a flat surface, and the second surface may have an uneven pattern.

Each supporting portion of the substrate may include a first surface contacting a corresponding one of the light sources and a second surface opposite to the first surface, and a reflector may be disposed on the first surface.

Each supporting portion of the substrate may include a first surface contacting a corresponding one of the light sources and a second surface opposite to the first surface, and a plurality of heat dissipation pins may be disposed on the second surface.

Each connecting portion of the substrate may include conductive patterns to electrically interconnect the neighboring light sources.

Each light source may include a lens, the lens may include a groove disposed at a position corresponding to a central area of a light emission surface of each light source, and the groove may be formed in a conical or trapezoidal shape having a wide top and a narrow bottom in section.

The lamp unit may further include an optical member spaced apart from the substrate by a predetermined distance.

The optical member may include a curved surface having at least one curvature.

When the first perpendicular line passing through the point of the surface of the first supporting portion passes through an eleventh point of the optical member, the second perpendicular line passing through the point of the surface of the second supporting portion passes through a twelfth point of the optical member, and the third perpendicular line passing through the point of the surface of the third supporting portion passes through a thirteenth point of the optical member, at least one selected from among an eleventh distance between the eleventh point of the optical member and the surface of the first supporting portion, a twelfth distance between the twelfth point of the optical member and the surface of the second supporting portion, and a thirteenth distance between the thirteenth point of the optical member and the surface of the third supporting portion may be different from the others.

The eleventh, twelfth, and thirteenth distances may be 10 mm or more.

At least a portion of the optical member may include an uneven pattern.

When a fifth perpendicular line passing through a point of a light emission surface of each light source passes through a fifteenth point of the optical member, a reflector may be disposed on the fifteenth point of the optical member.

In another embodiment, a lamp unit includes an optical member including a curved surface having at least one curvature and a light source module spaced apart from the optical member by a predetermined distance, wherein the light source module includes a substrate including a plurality of supporting portions and connecting portions connected between neighboring supporting portions and a plurality of light sources disposed on supporting portions of the substrate, each supporting portion of the substrate has a surface perpendicular to a normal line connected to a point on a surface of the optical member, and at least one of the normal lines corresponding to the respective supporting portions of the substrate is different in length from the others.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lamp, comprising:
a first supporter to support a first light source;
a second supporter to support a second light source;
a third supporter to support a third light source;
a first connector provided between the first supporter and the second supporter; and
a second connector provided between the second supporter and the third supporter, wherein
the first supporter is disposed such that a first axis line perpendicular to a first surface of the first supporter on which the first light source is mounted forms a first angle with respect to a reference direction,
the second supporter is disposed such that a second axis line perpendicular to a second surface of the second supporter on which the second light source is mounted forms a second angle with respect to the reference direction, and
the third supporter is disposed such that a third axis line perpendicular to a third surface of the third supporter on which the third light source is mounted forms a third angle with respect to the reference direction, wherein
the second angle is greater than the first angle,
the third angle is greater than the second angle,
a first intensity of the first light source is greater than a second intensity of the second light source, and
the second intensity is greater than a third intensity of the third light source, and wherein
a distribution area of light emitted from each of the first light source, the second light source and the third light source includes a first distribution area adjacent to the reference line and a second distribution area distant from the reference line,
an intensity of light at the first distribution area is greater than an intensity of light at the second distribution area,
an intensity of the first distribution area of the second light source is greater than an intensity of the first distribution area of the first light source, and
an intensity of the second distribution area of the second light source is less than an intensity of the second distribution area of the first light source.

2. The lamp according to claim 1, wherein at least one of the first connector or the second connector has a concave shape or a convex shape.

3. The lamp of claim 1, wherein the surface of at least one of the first connector or the second connector has an uneven surface.

4. The lamp according to claim 1, wherein at least one of the first supporter, second supporter or third supporter has a first thickness, and at least one of the first connector or second connector has a second thickness, and wherein the first thickness is different from the second thickness.

5. The lamp according to claim 4, wherein a ratio of the first thickness to the second thickness is 1.1:1 to 30:1.

6. The lamp according to claim 1, wherein at least one of the first supporter, second supporter or third supporter has a first width, and at least one of the first connector or second connector has a second width, and wherein the first width is different from the second width.

7. The lamp according to claim 1, wherein an opposite surface of at least one of the first, second or third supporter opposite the surface thereof to which its respective light source is mounted has an uneven contour.

8. The lamp according to claim 1, further comprising:
a reflector disposed on the surface of at least one of the first, second or third supporter to which its respective light source is mounted, adjacent to its respective light source.

9. The lamp according to claim 1, further comprising a plurality of heat dissipation fins provided on an opposite surface opposite the surface to which the first light source, second light source or third light source is mounted.

10. The lamp according to claim 1, wherein at least one of the first connector or second connector is a flexible printed circuit board.

11. The lamp according to claim 1, wherein each of the first, second and third light sources includes a lens, a top surface of each lens including a recess having a conical or trapezoidal cross-section.

12. The lamp according to claim 1, further comprising an optical member spaced apart from the first, second and third light sources.

13. The lamp according to claim 12, wherein the optical member comprises a curved surface having at least one radius of curvature.

14. The lamp according to claim 12, wherein a first distance between the first surface and the optical member along the first axis line, a second distance between the second surface and the optical member along the second axis line and/or a third distance between the third surface and the optical member along the third axis line is greater than or equal to 10 mm.

15. The lamp according to claim 12, wherein at least a portion of the optical member comprises an uneven pattern.

16. The lamp according to claim 12, further comprising a reflector provided on the optical member, facing at least one of the first light source, second light source or third light source.

17. A lamp, comprising:
a first supporter to support a first light source;
a second supporter to support a second light source;
a third supporter to support a third light source;
a first connector provided between the first supporter and the second supporter;
a second connector provided between the second supporter and the third supporter; and
an optical member spaced apart from the first, second and third light sources, wherein
the first supporter is disposed such that a first axis line perpendicular to a first surface of the first supporter to which the first light source is mounted forms a first angle with respect to a reference direction,
the second supporter is disposed such that a second axis line perpendicular to a second surface of the second supporter to which the second light source is mounted forms a second angle with respect to the reference direction, and
the third supporter is disposed such that a third axis line perpendicular to a third surface of the third supporter to which the third light source is mounted forms a third angle with respect to the reference direction, wherein the second angle is greater than the first angle, the third angle is greater than the second angle, and a first distance between the first light source and the second light source is less than a second distance between the second light source and the third light source, and wherein a distribution area of light emitted from each of the first light source, the second light source and the third light source includes a first distribution area adjacent to the reference line and a second distribution area distant from the reference line, an intensity of light at the first distribution area is greater than an intensity of light at the second distribution area, an intensity of the first distribution area of the second light source is greater than an intensity of the first distribution area of the first light source, and an intensity of the second distribution area of the second light source is less than an intensity of the second distribution area of the first light source.

18. A lamp, comprising:

a first supporter to support a first light source;

a second supporter to support a second light source;

a third supporter to support a third light source a first connector provided between the first supporter and the second supporter; and a second connector provided between the second supporter and the third supporter, wherein the first supporter is disposed such that a first axis line perpendicular line to a first surface of the first supporter on which the first light source is mounted forms a first angle with respect to a reference direction, the second supporter is disposed such that a second axis line perpendicular to a second surface of the second supporter on which the second light source is mounted forms a second angle with respect to the reference direction, and the third supporter is disposed such that a third axis line perpendicular to a third surface of the third supporter on which the third light source is mounted forms a third angle with respect to the reference direction, wherein the second angle is greater than the first angle, the third angle is greater than the second angle, a first orientation angle of the first light source is narrower than a second orientation angle of the second light source, and the second orientation angle is narrower than a third orientation angle of the third light source, and wherein a distribution area of light emitted from each of the first light source, the second light source and the third light source includes a first distribution area adjacent to the reference line and a second distribution area distant from the reference line, an intensity of light at the first distribution area is greater than an intensity of light at the second distribution area, an intensity of the first distribution area of the second light source is greater than an intensity of the first distribution area of the first light source, and an intensity of the second distribution area of the second light source is less than an intensity of the second distribution area of the first light source.

19. A lamp, comprising:

a first supporter to support a first light source;

a second supporter to support a second light source;

a third supporter to support a third light source a first connector provided between the first supporter and the second supporter; and a second connector provided between the second supporter and the third supporter, wherein the first supporter is disposed such that a first axis line perpendicular line to a first surface of the first supporter on which the first light source is mounted forms a first angle with respect to a reference direction, the second supporter is disposed such that a second axis line perpendicular to a second surface of the second supporter on which the second light source is mounted forms a second angle with respect to the reference direction, and the third supporter is disposed such that a third axis line perpendicular to a third surface of the third supporter on which the third light source is mounted forms a third angle with respect to the reference direction, and wherein the second angle is greater than the first angle, the third angle is greater than the second angle, a distribution area of light emitted from each of the first light source, the second light source and the third light source includes a first distribution area adjacent to the reference line and a second distribution area distant from the reference line, an intensity of light at the first distribution area is greater than an intensity of light at the second distribution area, an intensity of the first distribution area of the second light source is greater than an intensity of the first distribution area of the first light source, and an intensity of the second distribution area of the second light source is less than an intensity of the second distribution area of the first light source.

* * * * *